US011975584B2

(12) United States Patent
Graus et al.

(10) Patent No.: US 11,975,584 B2
(45) Date of Patent: May 7, 2024

(54) VEHICLE HAVING ADJUSTABLE COMPRESSION AND REBOUND DAMPING

(71) Applicant: Polaris Industries Inc., Medina, MN (US)

(72) Inventors: Jonathon P. Graus, Stacy, MN (US); David D. Helgeson, Vadnais Heights, MN (US); Alex R. Scheuerell, Wyoming, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 17/888,938

(22) Filed: Aug. 16, 2022

(65) Prior Publication Data
US 2022/0388362 A1 Dec. 8, 2022

Related U.S. Application Data

(60) Continuation of application No. 17/175,888, filed on Feb. 15, 2021, now Pat. No. 11,884,117, which is a
(Continued)

(51) Int. Cl.
*B60G 17/016* (2006.01)
*B60G 17/0165* (2006.01)
*B60G 17/019* (2006.01)

(52) U.S. Cl.
CPC ..... *B60G 17/0162* (2013.01); *B60G 17/0164* (2013.01); *B60G 17/0165* (2013.01);
(Continued)

(58) Field of Classification Search
CPC ............ B60G 17/0162; B60G 17/0164; B60G 17/0165; B60G 17/01908; B60G 2300/07;
(Continued)

(56) References Cited

U.S. PATENT DOCUMENTS 3,013,442 A 12/1961 Fox et al.
3,623,565 A 11/1971 Ward et al.
(Continued)

FOREIGN PATENT DOCUMENTS

AU 2012323853 A1 5/2014
AU 2015328248 A1 5/2017
(Continued)

OTHER PUBLICATIONS

3Drive Compact Throttle Controller, Blitz Power USA, <http://pivotjp.com/product/thf_c/the.html>; earliest known archive via Internet Archive Wayback Machine Aug. 27, 2009; <http://web.archive.org/web/20090827154111/http://pivotjp.com/product/thf_c/the.html>; see appended screenshot retrieved from the Internet Nov. 30, 2015; 2 pages.
(Continued)

*Primary Examiner* — Toan C To
(74) *Attorney, Agent, or Firm* — Faegre Drinker Biddle & Reath LLP

(57) ABSTRACT

A damping control system for a vehicle having a suspension located between a plurality of ground engaging members and a vehicle frame are disclosed. The vehicle including at least one adjustable shock absorber having an adjustable damping characteristic.

20 Claims, 31 Drawing Sheets

Related U.S. Application Data division of application No. 16/198,280, filed on Nov. 21, 2018, now Pat. No. 10,987,987.

(52) U.S. Cl.
CPC .... *B60G 17/01908* (2013.01); *B60G 2300/07* (2013.01); *B60G 2400/1042* (2013.01); *B60G 2400/1062* (2013.01); *B60G 2400/412* (2013.01); *B60G 2400/44* (2013.01); *B60G 2400/82* (2013.01); *B60G 2400/90* (2013.01); *B60G 2500/10* (2013.01); *B60G 2800/016* (2013.01); *B60G 2800/212* (2013.01); *B60G 2800/22* (2013.01); *B60G 2800/24* (2013.01)

(58) Field of Classification Search
CPC .... B60G 2400/1042; B60G 2400/1062; B60G 2400/44; B60G 2400/82; B60G 2400/90; B60G 2500/10; B60G 2800/016; B60G 2800/212; B60G 2800/22; B60G 2800/24
See application file for complete search history.

(56) References Cited

U.S. PATENT DOCUMENTS

| | | | |
|---|---|---|---|
| 3,737,001 | A | 6/1973 | Rasenberger |
| 3,760,246 | A | 9/1973 | Wright et al. |
| 3,861,229 | A | 1/1975 | Domaas |
| 3,933,213 | A | 1/1976 | Trowbridge |
| 3,952,829 | A | 4/1976 | Gray |
| 3,982,446 | A | 9/1976 | Van Dyken |
| 4,075,841 | A | 2/1978 | Hamma et al. |
| 4,112,885 | A | 9/1978 | Iwata et al. |
| 4,116,006 | A | 9/1978 | Wallis |
| 4,319,658 | A | 3/1982 | Collonia et al. |
| 4,327,948 | A | 5/1982 | Beck et al. |
| 4,340,126 | A | 7/1982 | Larson |
| 4,453,516 | A | 6/1984 | Filsinger |
| 4,462,480 | A | 7/1984 | Yasui et al. |
| 4,508,078 | A | 4/1985 | Takeuchi et al. |
| 4,580,537 | A | 4/1986 | Uchiyama |
| 4,600,215 | A | 7/1986 | Kuroki et al. |
| 4,620,602 | A | 11/1986 | Capriotti |
| 4,658,662 | A | 4/1987 | Rundle |
| 4,671,235 | A | 6/1987 | Hosaka |
| 4,688,533 | A | 8/1987 | Otobe |
| 4,691,676 | A | 9/1987 | Kikuchi |
| 4,691,677 | A | 9/1987 | Hotate et al. |
| 4,722,548 | A | 2/1988 | Hamilton et al. |
| 4,741,554 | A | 5/1988 | Okamoto |
| 4,749,210 | A | 6/1988 | Sugasawa |
| 4,759,329 | A | 7/1988 | Nobuo et al. |
| 4,765,296 | A | 8/1988 | Ishikawa et al. |
| 4,779,895 | A | 10/1988 | Rubel |
| 4,781,162 | A | 11/1988 | Ishikawa et al. |
| 4,785,782 | A | 11/1988 | Tanaka et al. |
| 4,787,353 | A | 11/1988 | Ishikawa et al. |
| 4,805,923 | A | 2/1989 | Soltis |
| 4,809,179 | A | 2/1989 | Klingler et al. |
| 4,809,659 | A | 3/1989 | Tamaki et al. |
| 4,817,466 | A | 4/1989 | Kawamura et al. |
| 4,819,174 | A | 4/1989 | Furuno et al. |
| 4,826,205 | A | 5/1989 | Kouda et al. |
| 4,827,416 | A | 5/1989 | Kawagoe et al. |
| 4,831,533 | A | 5/1989 | Per-Harald |
| 4,838,780 | A | 6/1989 | Yamagata et al. |
| 4,856,477 | A | 8/1989 | Hanaoka et al. |
| 4,860,708 | A | 8/1989 | Yamaguchi et al. |
| 4,862,854 | A | 9/1989 | Oda et al. |
| 4,867,474 | A | 9/1989 | Smith |
| 4,881,428 | A | 11/1989 | Ishikawa et al. |
| 4,893,501 | A | 1/1990 | Sogawa |
| 4,895,343 | A | 1/1990 | Sato |
| 4,898,137 | A | 2/1990 | Fujita et al. |
| 4,898,138 | A | 2/1990 | Nishimura et al. |
| 4,901,695 | A | 2/1990 | Kabasin et al. |
| 4,903,983 | A | 2/1990 | Fukushima et al. |
| 4,905,783 | A | 3/1990 | Bober |
| 4,913,006 | A | 4/1990 | Tsuyama et al. |
| 4,919,097 | A | 4/1990 | Mitui et al. |
| 4,926,636 | A | 5/1990 | Tadokoro et al. |
| 4,927,170 | A | 5/1990 | Wada |
| 4,930,082 | A | 5/1990 | Harara et al. |
| 4,934,667 | A | 6/1990 | Pees et al. |
| 4,949,262 | A | 8/1990 | Buma et al. |
| 4,949,989 | A | 8/1990 | Kakizaki et al. |
| 4,961,146 | A | 10/1990 | Kajiwara |
| 4,966,247 | A | 10/1990 | Masuda |
| 4,969,695 | A | 11/1990 | Maehata et al. |
| 5,000,278 | A | 3/1991 | Morishita |
| 5,002,028 | A | 3/1991 | Arai et al. |
| 5,002,148 | A | 3/1991 | Miyake et al. |
| 5,015,009 | A | 5/1991 | Ohyama et al. |
| 5,018,408 | A | 5/1991 | Bota et al. |
| 5,024,460 | A | 6/1991 | Hanson et al. |
| 5,029,328 | A | 7/1991 | Kamimura et al. |
| 5,033,328 | A | 7/1991 | Shimanaka |
| 5,036,939 | A | 8/1991 | Johnson et al. |
| 5,037,128 | A | 8/1991 | Okuyama et al. |
| 5,040,114 | A | 8/1991 | Ishikawa et al. |
| 5,054,813 | A | 10/1991 | Kakizaki |
| 5,060,744 | A | 10/1991 | Katoh et al. |
| 5,062,657 | A | 11/1991 | Majeed |
| 5,071,157 | A | 12/1991 | Majeed |
| 5,071,158 | A | 12/1991 | Yonekawa et al. |
| 5,076,385 | A | 12/1991 | Terazawa et al. |
| 5,078,109 | A | 1/1992 | Yoshida et al. |
| 5,080,392 | A | 1/1992 | Bazergui |
| 5,083,811 | A | 1/1992 | Sato et al. |
| 5,088,464 | A | 2/1992 | Meaney |
| 5,092,298 | A | 3/1992 | Suzuki et al. |
| 5,092,624 | A | 3/1992 | Fukuyama et al. |
| 5,096,219 | A | 3/1992 | Hanson et al. |
| 5,105,923 | A | 4/1992 | Iizuka |
| 5,113,345 | A | 5/1992 | Mine et al. |
| 5,113,821 | A | 5/1992 | Fukui et al. |
| 5,114,177 | A | 5/1992 | Fukunaga et al. |
| 5,129,475 | A | 7/1992 | Kawano et al. |
| 5,144,559 | A | 9/1992 | Kamimura et al. |
| 5,150,635 | A | 9/1992 | Minowa et al. |
| 5,163,538 | A | 11/1992 | Derr et al. |
| 5,170,343 | A | 12/1992 | Matsuda |
| 5,174,263 | A | 12/1992 | Meaney |
| 5,189,615 | A | 2/1993 | Rubel et al. |
| 5,218,540 | A | 6/1993 | Ishikawa et al. |
| 5,233,530 | A | 8/1993 | Shimada et al. |
| 5,253,728 | A | 10/1993 | Matsuno et al. |
| 5,265,693 | A | 11/1993 | Rees et al. |
| 5,307,777 | A | 5/1994 | Sasajima et al. |
| 5,314,362 | A | 5/1994 | Nagahora |
| 5,315,295 | A | 5/1994 | Fujii |
| 5,337,239 | A | 8/1994 | Okuda |
| 5,342,023 | A | 8/1994 | Kuriki et al. |
| 5,343,396 | A | 8/1994 | Youngblood |
| 5,343,780 | A | 9/1994 | McDaniel et al. |
| 5,350,187 | A | 9/1994 | Shinozaki |
| 5,361,209 | A | 11/1994 | Tsutsumi |
| 5,361,213 | A | 11/1994 | Fujieda et al. |
| 5,362,094 | A * | 11/1994 | Jensen ............... B60G 21/0555 280/5.511 |
| 5,366,236 | A | 11/1994 | Kuriki et al. |
| 5,375,872 | A | 12/1994 | Ohtagaki et al. |
| 5,377,107 | A | 12/1994 | Shimizu et al. |
| 5,383,680 | A | 1/1995 | Bock et al. |
| 5,384,705 | A | 1/1995 | Inagaki et al. |
| 5,390,121 | A | 2/1995 | Wolfe |
| 5,391,127 | A | 2/1995 | Nishimura |
| RE34,906 | E | 4/1995 | Tamaki et al. |
| 5,406,920 | A | 4/1995 | Murata et al. |
| 5,413,540 | A | 5/1995 | Streib et al. |
| 5,443,558 | A | 8/1995 | Baraki et al. |
| 5,444,621 | A | 8/1995 | Matsunaga et al. |
| 5,446,663 | A | 8/1995 | Sasaki et al. |
| 5,467,751 | A | 11/1995 | Kumagai |

(56) References Cited

U.S. PATENT DOCUMENTS

| | | |
|---|---|---|
| 5,475,593 A | 12/1995 | Townend |
| 5,475,596 A | 12/1995 | Henry et al. |
| 5,483,448 A | 1/1996 | Liubakka et al. |
| 5,485,161 A | 1/1996 | Vaughn |
| 5,490,487 A | 2/1996 | Kato et al. |
| 5,510,985 A | 4/1996 | Yamaoka et al. |
| 5,514,049 A | 5/1996 | Kamio et al. |
| 5,515,273 A | 5/1996 | Sasaki et al. |
| 5,521,825 A | 5/1996 | Unuvar et al. |
| 5,524,724 A | 6/1996 | Nishigaki et al. |
| 5,550,739 A | 8/1996 | Hoffmann et al. |
| 5,555,499 A | 9/1996 | Yamashita et al. |
| 5,575,737 A | 11/1996 | Weiss |
| 5,586,032 A | 12/1996 | Kallenbach et al. |
| 5,611,309 A | 3/1997 | Kumagai et al. |
| 5,632,503 A | 5/1997 | Raad et al. |
| 5,645,033 A | 7/1997 | Person et al. |
| 5,678,847 A | 10/1997 | Izawa et al. |
| 5,713,428 A | 2/1998 | Linden et al. |
| 5,749,596 A | 5/1998 | Jensen et al. |
| 5,774,820 A | 6/1998 | Linden et al. |
| 5,832,398 A | 11/1998 | Sasaki et al. |
| 5,845,726 A | 12/1998 | Kikkawa et al. |
| 5,873,802 A | 2/1999 | Tabata et al. |
| 5,880,532 A | 3/1999 | Stopher |
| 5,890,870 A | 4/1999 | Berger et al. |
| 5,897,287 A | 4/1999 | Berger et al. |
| 5,921,889 A | 7/1999 | Nozaki et al. |
| 5,922,038 A | 7/1999 | Horiuchi et al. |
| 5,938,556 A | 8/1999 | Lowell |
| 5,957,992 A | 9/1999 | Kiyono |
| 5,992,558 A | 11/1999 | Noro et al. |
| 6,000,702 A | 12/1999 | Streiter |
| 6,002,975 A | 12/1999 | Schiffmann et al. |
| 6,016,795 A | 1/2000 | Ohki |
| 6,019,085 A | 2/2000 | Sato et al. |
| 6,032,752 A | 3/2000 | Karpik et al. |
| 6,038,500 A | 3/2000 | Weiss |
| 6,070,681 A | 6/2000 | Catanzarite et al. |
| 6,073,072 A | 6/2000 | Ishii et al. |
| 6,073,074 A | 6/2000 | Saito et al. |
| 6,076,027 A | 6/2000 | Raad et al. |
| 6,078,252 A | 6/2000 | Kulczycki et al. |
| 6,086,510 A | 7/2000 | Kadota |
| 6,094,614 A | 7/2000 | Hiwatashi |
| 6,112,866 A | 9/2000 | Boichot et al. |
| 6,120,399 A | 9/2000 | Okeson et al. |
| 6,122,568 A | 9/2000 | Madau et al. |
| 6,124,826 A | 9/2000 | Garthwaite et al. |
| 6,125,326 A | 9/2000 | Ohmura et al. |
| 6,125,782 A | 10/2000 | Takashima et al. |
| 6,134,499 A | 10/2000 | Goode et al. |
| 6,138,069 A | 10/2000 | Ellertson et al. |
| 6,148,252 A | 11/2000 | Iwasaki et al. |
| 6,154,703 A | 11/2000 | Nakai et al. |
| 6,155,545 A | 12/2000 | Noro et al. |
| 6,157,297 A | 12/2000 | Nakai |
| 6,157,890 A | 12/2000 | Nakai et al. |
| 6,161,908 A | 12/2000 | Takayama et al. |
| 6,167,341 A | 12/2000 | Gourmelen et al. |
| 6,170,923 B1 | 1/2001 | Iguchi et al. |
| 6,176,796 B1 | 1/2001 | Lislegard |
| 6,178,371 B1 | 1/2001 | Light et al. |
| 6,181,997 B1 | 1/2001 | Badenoch et al. |
| 6,192,305 B1 | 2/2001 | Schiffmann |
| 6,206,124 B1 | 3/2001 | Mallette et al. |
| 6,217,480 B1 | 4/2001 | Iwata et al. |
| 6,226,389 B1 | 5/2001 | Lemelson et al. |
| 6,240,365 B1 | 5/2001 | Bunn |
| 6,244,398 B1 | 6/2001 | Girvin et al. |
| 6,244,986 B1 | 6/2001 | Mori et al. |
| 6,249,728 B1 | 6/2001 | Streiter |
| 6,249,744 B1 | 6/2001 | Morita |
| 6,254,108 B1 | 7/2001 | Germain et al. |
| 6,260,650 B1 | 7/2001 | Gustavsson |
| 6,263,858 B1 | 7/2001 | Pursifull et al. |
| 6,275,763 B1 | 8/2001 | Lotito et al. |
| 6,276,333 B1 | 8/2001 | Kazama et al. |
| 6,288,534 B1 | 9/2001 | Starkweather et al. |
| 6,290,034 B1 | 9/2001 | Ichimaru |
| 6,318,337 B1 | 11/2001 | Pursifull |
| 6,318,490 B1 | 11/2001 | Laning |
| 6,343,248 B1 | 1/2002 | Rizzotto et al. |
| 6,351,704 B1 | 2/2002 | Koerner |
| 6,352,142 B1 | 3/2002 | Kim |
| 6,370,458 B1 | 4/2002 | Shal et al. |
| 6,370,472 B1 | 4/2002 | Fosseen |
| 6,371,884 B1 | 4/2002 | Channing |
| 6,379,114 B1 | 4/2002 | Schott et al. |
| 6,427,115 B1 | 7/2002 | Sekiyama |
| 6,456,908 B1 | 9/2002 | Kumar |
| 6,463,385 B1 | 10/2002 | Fry |
| 6,470,852 B1 | 10/2002 | Kanno |
| 6,476,714 B2 | 11/2002 | Mizuta |
| 6,483,201 B1 | 11/2002 | Klarer |
| 6,483,467 B2 | 11/2002 | Kushida et al. |
| 6,485,340 B1 | 11/2002 | Kolb et al. |
| 6,488,609 B1 | 12/2002 | Morimoto et al. |
| 6,502,025 B1 | 12/2002 | Kempen |
| 6,507,778 B2 | 1/2003 | Koh |
| 6,513,611 B2 | 2/2003 | Ito et al. |
| 6,526,342 B1 | 2/2003 | Burdock et al. |
| 6,551,153 B1 | 4/2003 | Hattori |
| 6,573,827 B1 | 6/2003 | McKenzie |
| 6,581,710 B2 | 6/2003 | Sprinkle et al. |
| 6,604,034 B1 | 8/2003 | Speck et al. |
| 6,644,318 B1 | 11/2003 | Adams et al. |
| 6,647,328 B2 | 11/2003 | Walker |
| 6,655,233 B2 | 12/2003 | Evans et al. |
| 6,657,539 B2 | 12/2003 | Yamamoto et al. |
| 6,675,577 B2 | 1/2004 | Evans |
| 6,684,140 B2 | 1/2004 | Lu |
| 6,685,174 B2 | 2/2004 | Behmenburg et al. |
| 6,699,085 B2 | 3/2004 | Hattori |
| 6,704,643 B1 | 3/2004 | Suhre et al. |
| 6,738,705 B2 | 5/2004 | Kojima et al. |
| 6,738,708 B2 | 5/2004 | Suzuki et al. |
| 6,752,401 B2 | 6/2004 | Burdock |
| 6,757,606 B1 | 6/2004 | Gonring |
| 6,761,145 B2 | 7/2004 | Matsuda et al. |
| 6,772,061 B1 | 8/2004 | Berthiaume et al. |
| 6,795,764 B2 | 9/2004 | Schmitz et al. |
| 6,820,712 B2 | 11/2004 | Nakamura |
| 6,834,736 B2 | 12/2004 | Kramer et al. |
| 6,839,630 B2 | 1/2005 | Sakamoto |
| 6,845,314 B2 | 1/2005 | Fosseen |
| 6,845,829 B2 | 1/2005 | Hafendorfer |
| 6,848,420 B2 | 2/2005 | Ishiguro et al. |
| 6,848,956 B2 | 2/2005 | Ozawa |
| 6,851,495 B2 | 2/2005 | Sprinkle et al. |
| 6,851,679 B2 | 2/2005 | Downey et al. |
| 6,860,826 B1 | 3/2005 | Johnson |
| 6,874,467 B2 | 4/2005 | Hunt et al. |
| 6,876,924 B2 | 4/2005 | Morita et al. |
| 6,880,532 B1 | 4/2005 | Kerns et al. |
| 6,886,529 B2 | 5/2005 | Suzuki et al. |
| 6,887,182 B2 | 5/2005 | Nakatani et al. |
| 6,889,654 B2 | 5/2005 | Ito |
| 6,895,318 B1 | 5/2005 | Barton et al. |
| 6,895,518 B2 | 5/2005 | Wingen |
| 6,897,629 B2 | 5/2005 | Wilton et al. |
| 6,938,508 B1 | 9/2005 | Saagge |
| 6,941,209 B2 | 9/2005 | Liu |
| 6,942,050 B1 | 9/2005 | Honkala et al. |
| 6,945,541 B2 | 9/2005 | Brown |
| 6,964,259 B1 | 11/2005 | Raetzman |
| 6,964,260 B1 | 11/2005 | Samoto et al. |
| 6,976,689 B2 | 12/2005 | Hibbert |
| 6,990,401 B2 | 1/2006 | Neiss et al. |
| 7,005,976 B2 | 2/2006 | Hagenbuch |
| 7,011,174 B1 | 3/2006 | James |
| 7,032,895 B2 | 4/2006 | Folchert |
| 7,035,836 B2 | 4/2006 | Caponetto et al. |
| 7,036,485 B1 | 5/2006 | Koerner |

(56) References Cited

U.S. PATENT DOCUMENTS

| | | |
|---|---|---|
| 7,044,260 B2 | 5/2006 | Schaedler et al. |
| 7,055,454 B1 | 6/2006 | Whiting et al. |
| 7,055,497 B2 | 6/2006 | Maehara et al. |
| 7,055,545 B2 | 6/2006 | Mascari et al. |
| 7,058,490 B2 | 6/2006 | Kim |
| 7,058,506 B2 | 6/2006 | Kawase et al. |
| 7,066,142 B2 | 6/2006 | Hanasato |
| 7,070,012 B2 | 7/2006 | Fecteau |
| 7,076,351 B2 | 7/2006 | Hamilton et al. |
| 7,077,713 B2 | 7/2006 | Watabe et al. |
| 7,077,784 B2 | 7/2006 | Banta et al. |
| 7,086,379 B2 | 8/2006 | Blomenberg et al. |
| 7,092,808 B2 | 8/2006 | Lu et al. |
| 7,096,851 B2 | 8/2006 | Matsuda et al. |
| 7,097,166 B2 | 8/2006 | Folchert |
| 7,104,352 B2 | 9/2006 | Weinzierl |
| 7,123,189 B2 | 10/2006 | Lalik et al. |
| 7,124,865 B2 | 10/2006 | Turner et al. |
| 7,136,729 B2 | 11/2006 | Salman et al. |
| 7,140,619 B2 | 11/2006 | Hrovat et al. |
| 7,163,000 B2 | 1/2007 | Ishida et al. |
| 7,168,709 B2 | 1/2007 | Niwa et al. |
| 7,171,945 B2 | 2/2007 | Matsuda et al. |
| 7,171,947 B2 | 2/2007 | Fukushima et al. |
| 7,182,063 B2 | 2/2007 | Keefover et al. |
| 7,184,873 B1 | 2/2007 | Idsinga et al. |
| 7,185,630 B2 | 3/2007 | Takahashi et al. |
| 7,220,153 B2 | 5/2007 | Okuyama |
| 7,233,846 B2 | 6/2007 | Kawauchi et al. |
| 7,234,707 B2 | 6/2007 | Green et al. |
| 7,235,963 B2 | 6/2007 | Wayama |
| 7,249,986 B2 | 7/2007 | Otobe et al. |
| 7,259,357 B2 | 8/2007 | Walker |
| 7,260,319 B2 | 8/2007 | Watanabe et al. |
| 7,260,471 B2 | 8/2007 | Matsuda et al. |
| 7,270,335 B2 | 9/2007 | Hio et al. |
| 7,280,904 B2 | 10/2007 | Kaji |
| 7,286,919 B2 | 10/2007 | Nordgren et al. |
| 7,287,511 B2 | 10/2007 | Matsuda |
| 7,305,295 B2 | 12/2007 | Bauerle et al. |
| 7,311,082 B2 | 12/2007 | Yokoi |
| 7,315,779 B1 | 1/2008 | Rioux et al. |
| 7,316,288 B1 | 1/2008 | Bennett et al. |
| 7,318,410 B2 | 1/2008 | Yokoi |
| 7,322,435 B2 | 1/2008 | Lillbacka et al. |
| 7,325,533 B2 | 2/2008 | Matsuda |
| 7,331,326 B2 | 2/2008 | Arai et al. |
| 7,354,321 B2 | 4/2008 | Takada et al. |
| 7,359,787 B2 | 4/2008 | Ono et al. |
| 7,367,247 B2 | 5/2008 | Horiuchi et al. |
| 7,367,316 B2 | 5/2008 | Russell et al. |
| 7,367,854 B2 | 5/2008 | Arvidsson |
| 7,380,538 B1 | 6/2008 | Gagnon et al. |
| 7,386,378 B2 | 6/2008 | Lauwerys et al. |
| 7,399,210 B2 | 7/2008 | Yoshimasa |
| 7,401,794 B2 | 7/2008 | Laurent et al. |
| 7,413,196 B2 | 8/2008 | Borowski |
| 7,416,458 B2 | 8/2008 | Suemori et al. |
| 7,421,954 B2 | 9/2008 | Bose |
| 7,422,495 B2 | 9/2008 | Kinoshita et al. |
| 7,427,072 B2 | 9/2008 | Brown |
| 7,431,013 B2 | 10/2008 | Hotta et al. |
| 7,433,774 B2 | 10/2008 | Sen et al. |
| 7,441,789 B2 | 10/2008 | Geiger et al. |
| 7,445,071 B2 | 11/2008 | Yamazaki et al. |
| 7,454,282 B2 | 11/2008 | Mizuguchi |
| 7,454,284 B2 | 11/2008 | Fosseen |
| 7,458,360 B2 | 12/2008 | Irihune et al. |
| 7,461,630 B2 | 12/2008 | Maruo et al. |
| 7,475,746 B2 | 1/2009 | Tsukada et al. |
| 7,478,689 B1 | 1/2009 | Sugden et al. |
| 7,483,775 B2 | 1/2009 | Karaba et al. |
| 7,486,199 B2 | 2/2009 | Tengler et al. |
| 7,505,836 B2 | 3/2009 | Okuyama et al. |
| 7,506,633 B2 | 3/2009 | Cowan |
| 7,510,060 B2 | 3/2009 | Izawa et al. |
| 7,523,737 B2 | 4/2009 | Deguchi et al. |
| 7,526,665 B2 | 4/2009 | Kim et al. |
| 7,529,609 B2 | 5/2009 | Braunberger et al. |
| 7,530,345 B1 | 5/2009 | Plante et al. |
| 7,533,750 B2 | 5/2009 | Simmons et al. |
| 7,533,890 B2 | 5/2009 | Chiao |
| 7,571,039 B2 | 8/2009 | Chen et al. |
| 7,571,073 B2 | 8/2009 | Gamberini et al. |
| 7,598,849 B2 | 10/2009 | Gallant et al. |
| 7,600,762 B2 | 10/2009 | Yasui et al. |
| 7,611,154 B2 | 11/2009 | Delaney |
| 7,630,807 B2 | 12/2009 | Yoshimura et al. |
| 7,641,208 B1 | 1/2010 | Barron et al. |
| 7,644,934 B2 | 1/2010 | Mizuta |
| 7,647,143 B2 | 1/2010 | Ito et al. |
| 7,684,911 B2 | 3/2010 | Seifert et al. |
| 7,707,012 B2 | 4/2010 | Stephens |
| 7,711,468 B1 | 5/2010 | Levy |
| 7,740,256 B2 | 6/2010 | Davis |
| 7,751,959 B2 | 7/2010 | Boon et al. |
| 7,771,313 B2 | 8/2010 | Cullen et al. |
| 7,778,741 B2 | 8/2010 | Rao et al. |
| 7,810,818 B2 | 10/2010 | Bushko |
| 7,815,205 B2 | 10/2010 | Barth et al. |
| 7,822,514 B1 | 10/2010 | Erickson |
| 7,823,106 B2 | 10/2010 | Baker et al. |
| 7,823,891 B2 | 11/2010 | Bushko et al. |
| 7,826,959 B2 | 11/2010 | Namari et al. |
| 7,862,061 B2 | 1/2011 | Jung |
| 7,885,750 B2 | 2/2011 | Lu |
| 7,899,594 B2 | 3/2011 | Messih et al. |
| 7,912,610 B2 | 3/2011 | Saito et al. |
| 7,926,822 B2 | 4/2011 | Ohletz et al. |
| 7,940,383 B2 | 5/2011 | Noguchi et al. |
| 7,942,427 B2 | 5/2011 | Lloyd |
| 7,950,486 B2 | 5/2011 | Van et al. |
| 7,959,163 B2 | 6/2011 | Beno et al. |
| 7,962,261 B2 | 6/2011 | Bushko et al. |
| 7,963,529 B2 | 6/2011 | Oteman et al. |
| 7,970,512 B2 | 6/2011 | Lu et al. |
| 7,975,794 B2 | 7/2011 | Simmons |
| 7,984,915 B2 | 7/2011 | Post et al. |
| 8,005,596 B2 | 8/2011 | Lu et al. |
| 8,027,775 B2 | 9/2011 | Takenaka et al. |
| 8,032,281 B2 | 10/2011 | Bujak et al. |
| 8,050,818 B2 | 11/2011 | Mizuta |
| 8,050,857 B2 | 11/2011 | Lu et al. |
| 8,056,392 B2 | 11/2011 | Ryan et al. |
| 8,065,054 B2 | 11/2011 | Tarasinski et al. |
| 8,075,002 B1 | 12/2011 | Pionke et al. |
| 8,086,371 B2 | 12/2011 | Furuichi et al. |
| 8,087,676 B2 | 1/2012 | McIntyre |
| 8,095,268 B2 | 1/2012 | Parison et al. |
| 8,108,104 B2 | 1/2012 | Hrovat et al. |
| 8,113,521 B2 | 2/2012 | Lin et al. |
| 8,116,938 B2 | 2/2012 | Itagaki et al. |
| 8,121,757 B2 | 2/2012 | Song et al. |
| 8,170,749 B2 | 5/2012 | Mizuta |
| 8,190,327 B2 | 5/2012 | Poilbout |
| 8,195,361 B2 | 6/2012 | Kajino et al. |
| 8,204,666 B2 | 6/2012 | Takeuchi et al. |
| 8,209,087 B2 | 6/2012 | Haegglund et al. |
| 8,214,106 B2 | 7/2012 | Ghoneim et al. |
| 8,219,262 B2 | 7/2012 | Stiller |
| 8,229,642 B2 | 7/2012 | Post et al. |
| 8,260,496 B2 | 9/2012 | Gagliano |
| 8,271,175 B2 | 9/2012 | Takenaka et al. |
| 8,296,010 B2 | 10/2012 | Hirao et al. |
| 8,308,170 B2 | 11/2012 | Van et al. |
| 8,315,764 B2 | 11/2012 | Chen et al. |
| 8,315,769 B2 | 11/2012 | Braunberger et al. |
| 8,321,088 B2 | 11/2012 | Brown et al. |
| 8,322,497 B2 | 12/2012 | Marjoram et al. |
| 8,352,143 B2 | 1/2013 | Lu et al. |
| 8,355,840 B2 | 1/2013 | Ammon et al. |
| 8,359,149 B2 | 1/2013 | Shin |
| 8,374,748 B2 | 2/2013 | Jolly |
| 8,376,373 B2 | 2/2013 | Conradie |

(56) References Cited

U.S. PATENT DOCUMENTS

| | | |
|---|---|---|
| 8,396,627 B2 | 3/2013 | Jung et al. |
| 8,417,417 B2 | 4/2013 | Chen et al. |
| 8,424,832 B2 | 4/2013 | Robbins et al. |
| 8,428,839 B2 | 4/2013 | Braunberger et al. |
| 8,434,774 B2 | 5/2013 | Leclerc et al. |
| 8,437,935 B2 | 5/2013 | Braunberger et al. |
| 8,442,720 B2 | 5/2013 | Lu et al. |
| 8,444,161 B2 | 5/2013 | Leclerc et al. |
| 8,447,489 B2 | 5/2013 | Murata et al. |
| 8,457,841 B2 | 6/2013 | Knoll et al. |
| 8,473,157 B2 | 6/2013 | Savaresi et al. |
| 8,517,395 B2 | 8/2013 | Knox et al. |
| 8,532,896 B2 | 9/2013 | Braunberger et al. |
| 8,534,397 B2 | 9/2013 | Grajkowski et al. |
| 8,534,413 B2 | 9/2013 | Nelson et al. |
| 8,548,678 B2 | 10/2013 | Ummethala et al. |
| 8,550,221 B2 | 10/2013 | Paulides et al. |
| 8,571,776 B2 | 10/2013 | Braunberger et al. |
| 8,573,605 B2 | 11/2013 | Di Maria |
| 8,626,388 B2 | 1/2014 | Oikawa |
| 8,626,389 B2 | 1/2014 | Sidlosky |
| 8,641,052 B2 | 2/2014 | Kondo et al. |
| 8,645,024 B2 | 2/2014 | Daniels |
| 8,666,596 B2 | 3/2014 | Arenz |
| 8,672,106 B2 | 3/2014 | Laird et al. |
| 8,672,337 B2 | 3/2014 | Van et al. |
| 8,676,440 B2 | 3/2014 | Watson |
| 8,682,530 B2 | 3/2014 | Nakamura |
| 8,682,550 B2 | 3/2014 | Nelson et al. |
| 8,682,558 B2 | 3/2014 | Braunberger et al. |
| 8,684,887 B2 | 4/2014 | Krosschell |
| 8,700,260 B2 | 4/2014 | Jolly et al. |
| 8,712,599 B1 | 4/2014 | Westpfahl |
| 8,712,639 B2 | 4/2014 | Lu et al. |
| 8,718,872 B2 | 5/2014 | Hirao et al. |
| 8,725,351 B1 | 5/2014 | Selden et al. |
| 8,725,380 B2 | 5/2014 | Braunberger et al. |
| 8,731,774 B2 | 5/2014 | Yang |
| 8,770,594 B2 | 7/2014 | Tominaga et al. |
| 8,827,019 B2 | 9/2014 | Deckard et al. |
| 8,903,617 B2 | 12/2014 | Braunberger et al. |
| 8,954,251 B2 | 2/2015 | Braunberger et al. |
| 8,972,712 B2 | 3/2015 | Braunberger |
| 8,994,494 B2 | 3/2015 | Koenig et al. |
| 8,997,952 B2 | 4/2015 | Goetz |
| 9,010,768 B2 | 4/2015 | Kinsman et al. |
| 9,027,937 B2 | 5/2015 | Ryan et al. |
| 9,038,791 B2 | 5/2015 | Marking |
| 9,123,249 B2 | 9/2015 | Braunberger et al. |
| 9,151,384 B2 | 10/2015 | Kohler et al. |
| 9,162,573 B2 | 10/2015 | Grajkowski et al. |
| 9,205,717 B2 | 12/2015 | Brady et al. |
| 9,211,924 B2 | 12/2015 | Safranski et al. |
| 9,327,726 B2 | 5/2016 | Braunberger et al. |
| 9,365,251 B2 | 6/2016 | Safranski et al. |
| 9,371,002 B2 | 6/2016 | Braunberger |
| 9,381,810 B2 | 7/2016 | Nelson et al. |
| 9,381,902 B2 | 7/2016 | Braunberger et al. |
| 9,428,242 B2 | 8/2016 | Ginther et al. |
| 9,429,235 B2 | 8/2016 | Krosschell et al. |
| 9,527,362 B2 | 12/2016 | Scheuerell et al. |
| 9,643,538 B2 | 5/2017 | Braunberger et al. |
| 9,643,616 B2 | 5/2017 | Lu |
| 9,662,954 B2 | 5/2017 | Scheuerell et al. |
| 9,665,418 B2 | 5/2017 | Arnott |
| 9,695,899 B2 | 7/2017 | Smith |
| 9,771,084 B2 | 9/2017 | Norstad |
| 9,802,621 B2 | 10/2017 | Gillingham et al. |
| 9,809,195 B2 | 11/2017 | Giese et al. |
| 9,830,821 B2 | 11/2017 | Braunberger et al. |
| 9,834,184 B2 | 12/2017 | Braunberger |
| 9,834,215 B2 | 12/2017 | Braunberger et al. |
| 9,855,986 B2 | 1/2018 | Braunberger et al. |
| 9,868,385 B2 | 1/2018 | Braunberger |
| 9,878,693 B2 | 1/2018 | Braunberger |
| 9,920,810 B2 | 3/2018 | Smeljanskij |
| 9,945,298 B2 | 4/2018 | Braunberger et al. |
| 10,005,335 B2 | 6/2018 | Brady et al. |
| 10,046,694 B2 | 8/2018 | Braunberger et al. |
| 10,086,698 B2 | 10/2018 | Grajkowski et al. |
| 10,154,377 B2 | 12/2018 | Post et al. |
| 10,195,989 B2 | 2/2019 | Braunberger et al. |
| 10,202,159 B2 | 2/2019 | Braunberger et al. |
| 10,220,765 B2 | 3/2019 | Braunberger |
| 10,227,041 B2 | 3/2019 | Braunberger et al. |
| 10,266,164 B2 | 4/2019 | Braunberger |
| 10,363,941 B2 | 7/2019 | Norstad |
| 10,384,682 B2 | 8/2019 | Braunberger et al. |
| 10,391,989 B2 | 8/2019 | Braunberger |
| 10,406,884 B2 | 9/2019 | Oakden-Graus et al. |
| 10,410,520 B2 | 9/2019 | Braunberger et al. |
| 10,436,125 B2 | 10/2019 | Braunberger et al. |
| 10,578,184 B2 | 3/2020 | Gilbert |
| 10,704,640 B2 | 7/2020 | Galasso |
| 10,723,408 B2 | 7/2020 | Pelot |
| 10,731,724 B2 | 8/2020 | Laird |
| 10,774,896 B2 | 9/2020 | Hamers |
| 10,933,710 B2 | 3/2021 | Tong |
| 10,981,429 B2 | 4/2021 | Tsiaras |
| 11,001,120 B2 | 5/2021 | Cox |
| 11,110,913 B2 | 9/2021 | Krosschell et al. |
| 11,124,036 B2 | 9/2021 | Brady et al. |
| 11,148,748 B2 | 10/2021 | Galasso |
| 11,152,555 B2 | 10/2021 | Hiller |
| 11,162,555 B2 | 11/2021 | Haugen |
| 11,192,424 B2 * | 12/2021 | Tabata ............. B60G 21/073 |
| 11,279,198 B2 | 3/2022 | Marking |
| 11,285,964 B2 | 3/2022 | Norstad et al. |
| 11,306,798 B2 | 4/2022 | Cox |
| 11,351,834 B2 | 6/2022 | Cox |
| 11,400,784 B2 | 8/2022 | Brady et al. |
| 11,400,785 B2 | 8/2022 | Brady et al. |
| 11,400,786 B2 | 8/2022 | Brady et al. |
| 11,400,787 B2 | 8/2022 | Brady et al. |
| 11,413,924 B2 | 8/2022 | Cox |
| 11,448,283 B2 | 9/2022 | Strickland |
| 11,472,252 B2 | 10/2022 | Tong |
| 11,479,075 B2 | 10/2022 | Graus et al. |
| 2001/0005803 A1 | 6/2001 | Cochofel et al. |
| 2001/0021887 A1 | 9/2001 | Obradovich et al. |
| 2001/0035166 A1 | 11/2001 | Kerns et al. |
| 2001/0052756 A1 | 12/2001 | Noro et al. |
| 2002/0082752 A1 | 6/2002 | Obradovich |
| 2002/0113185 A1 | 8/2002 | Ziegler |
| 2002/0115357 A1 | 8/2002 | Hiki et al. |
| 2002/0125675 A1 | 9/2002 | Clements et al. |
| 2002/0177949 A1 | 11/2002 | Katayama et al. |
| 2002/0193935 A1 | 12/2002 | Hashimoto et al. |
| 2003/0014174 A1 | 1/2003 | Giers |
| 2003/0036360 A1 | 2/2003 | Russell et al. |
| 2003/0036823 A1 | 2/2003 | Mahvi |
| 2003/0038411 A1 | 2/2003 | Sendrea |
| 2003/0046000 A1 | 3/2003 | Morita et al. |
| 2003/0047994 A1 | 3/2003 | Koh |
| 2003/0054831 A1 | 3/2003 | Bardmesser |
| 2003/0062025 A1 | 4/2003 | Samoto et al. |
| 2003/0125857 A1 | 7/2003 | Madau et al. |
| 2003/0187555 A1 | 10/2003 | Lutz et al. |
| 2003/0200016 A1 | 10/2003 | Spillane et al. |
| 2003/0205867 A1 | 11/2003 | Coelingh et al. |
| 2004/0010383 A1 | 1/2004 | Lu et al. |
| 2004/0015275 A1 | 1/2004 | Herzog et al. |
| 2004/0024515 A1 | 2/2004 | Troupe et al. |
| 2004/0026880 A1 | 2/2004 | Bundy |
| 2004/0034460 A1 | 2/2004 | Folkerts et al. |
| 2004/0041358 A1 | 3/2004 | Hrovat et al. |
| 2004/0090020 A1 | 5/2004 | Braswell |
| 2004/0094912 A1 | 5/2004 | Niwa et al. |
| 2004/0107591 A1 | 6/2004 | Cuddy |
| 2004/0216550 A1 | 11/2004 | Fallak et al. |
| 2004/0226538 A1 | 11/2004 | Cannone et al. |
| 2004/0245034 A1 | 12/2004 | Miyamoto et al. |
| 2005/0004736 A1 | 1/2005 | Belcher et al. |
| 2005/0023789 A1 | 2/2005 | Suzuki et al. |

(56) References Cited

U.S. PATENT DOCUMENTS

| | | |
|---|---|---|
| 2005/0027428 A1 | 2/2005 | Glora et al. |
| 2005/0045148 A1 | 3/2005 | Katsuragawa et al. |
| 2005/0077696 A1* | 4/2005 | Ogawa .............. B60G 17/0162 |
| | | 280/124.157 |
| 2005/0098964 A1 | 5/2005 | Brown |
| 2005/0131604 A1 | 6/2005 | Lu |
| 2005/0133006 A1 | 6/2005 | Frenz et al. |
| 2005/0149246 A1 | 7/2005 | McLeod |
| 2005/0155571 A1 | 7/2005 | Hanasato |
| 2005/0217953 A1 | 10/2005 | Bossard |
| 2005/0267663 A1 | 12/2005 | Naono et al. |
| 2005/0279244 A1 | 12/2005 | Bose |
| 2005/0280219 A1 | 12/2005 | Brown |
| 2005/0284446 A1 | 12/2005 | Okuyama |
| 2006/0014606 A1 | 1/2006 | Sporl et al. |
| 2006/0017240 A1 | 1/2006 | Laurent et al. |
| 2006/0018636 A1 | 1/2006 | Watanabe et al. |
| 2006/0052909 A1 | 3/2006 | Cherouny |
| 2006/0064223 A1 | 3/2006 | Voss |
| 2006/0065239 A1 | 3/2006 | Tsukada et al. |
| 2006/0112930 A1 | 6/2006 | Matsuda et al. |
| 2006/0162681 A1 | 7/2006 | Kawasaki |
| 2006/0191739 A1 | 8/2006 | Koga |
| 2006/0224294 A1 | 10/2006 | Kawazoe et al. |
| 2006/0226611 A1 | 10/2006 | Xiao et al. |
| 2006/0229811 A1 | 10/2006 | Herman et al. |
| 2006/0235602 A1 | 10/2006 | Ishida et al. |
| 2006/0243246 A1 | 11/2006 | Yokoi |
| 2006/0243247 A1 | 11/2006 | Yokoi |
| 2006/0247840 A1 | 11/2006 | Matsuda et al. |
| 2006/0270520 A1 | 11/2006 | Owens |
| 2006/0278197 A1 | 12/2006 | Takamatsu et al. |
| 2006/0284387 A1 | 12/2006 | Klees |
| 2007/0007742 A1* | 1/2007 | Allen ..................... B60G 7/008 |
| | | 280/124.134 |
| 2007/0028888 A1 | 2/2007 | Jasem |
| 2007/0039770 A1 | 2/2007 | Barrette et al. |
| 2007/0045028 A1 | 3/2007 | Yamamoto et al. |
| 2007/0050095 A1 | 3/2007 | Nelson et al. |
| 2007/0050125 A1 | 3/2007 | Matsuda et al. |
| 2007/0068490 A1 | 3/2007 | Matsuda |
| 2007/0073461 A1 | 3/2007 | Fielder |
| 2007/0096672 A1 | 5/2007 | Endo et al. |
| 2007/0118268 A1 | 5/2007 | Inoue et al. |
| 2007/0119419 A1 | 5/2007 | Matsuda |
| 2007/0120332 A1 | 5/2007 | Bushko et al. |
| 2007/0126628 A1 | 6/2007 | Lalik et al. |
| 2007/0142167 A1 | 6/2007 | Kanafani et al. |
| 2007/0151544 A1 | 7/2007 | Arai et al. |
| 2007/0158920 A1 | 7/2007 | Delaney |
| 2007/0168125 A1 | 7/2007 | Petrik |
| 2007/0169744 A1 | 7/2007 | Maruo et al. |
| 2007/0178779 A1 | 8/2007 | Takada et al. |
| 2007/0192001 A1 | 8/2007 | Tatsumi et al. |
| 2007/0213920 A1 | 9/2007 | Igarashi et al. |
| 2007/0239331 A1 | 10/2007 | Kaplan |
| 2007/0240917 A1 | 10/2007 | Duceppe |
| 2007/0244619 A1 | 10/2007 | Peterson |
| 2007/0246010 A1 | 10/2007 | Okuyama et al. |
| 2007/0247291 A1 | 10/2007 | Masuda et al. |
| 2007/0255462 A1 | 11/2007 | Masuda et al. |
| 2007/0255466 A1 | 11/2007 | Chiao |
| 2007/0260372 A1* | 11/2007 | Langer ................. G01M 17/04 |
| | | 701/31.4 |
| 2007/0271026 A1 | 11/2007 | Hijikata |
| 2008/0004773 A1 | 1/2008 | Maeda |
| 2008/0015767 A1 | 1/2008 | Masuda et al. |
| 2008/0022969 A1 | 1/2008 | Frenz et al. |
| 2008/0059034 A1 | 3/2008 | Lu |
| 2008/0078355 A1 | 4/2008 | Maehara et al. |
| 2008/0091309 A1 | 4/2008 | Walker |
| 2008/0114521 A1 | 5/2008 | Doering |
| 2008/0115761 A1 | 5/2008 | Deguchi et al. |
| 2008/0119984 A1 | 5/2008 | Hrovat et al. |
| 2008/0172155 A1 | 7/2008 | Takamatsu et al. |
| 2008/0178838 A1 | 7/2008 | Ota |
| 2008/0178839 A1 | 7/2008 | Oshima et al. |
| 2008/0178840 A1 | 7/2008 | Oshima et al. |
| 2008/0183353 A1 | 7/2008 | Post et al. |
| 2008/0243334 A1 | 10/2008 | Bujak et al. |
| 2008/0243336 A1 | 10/2008 | Fitzgibbons |
| 2008/0269989 A1 | 10/2008 | Brenner et al. |
| 2008/0275606 A1 | 11/2008 | Tarasinski et al. |
| 2008/0287256 A1 | 11/2008 | Unno |
| 2008/0300768 A1 | 12/2008 | Hijikata |
| 2009/0008890 A1 | 1/2009 | Woodford |
| 2009/0020966 A1* | 1/2009 | Germain ............. B60G 21/0555 |
| | | 280/124.106 |
| 2009/0037051 A1 | 2/2009 | Shimizu et al. |
| 2009/0071437 A1 | 3/2009 | Samoto et al. |
| 2009/0076699 A1 | 3/2009 | Osaki et al. |
| 2009/0093928 A1 | 4/2009 | Getman et al. |
| 2009/0095252 A1 | 4/2009 | Yamada |
| 2009/0095254 A1 | 4/2009 | Yamada |
| 2009/0096598 A1 | 4/2009 | Tengler et al. |
| 2009/0108546 A1 | 4/2009 | Ohletz et al. |
| 2009/0132154 A1 | 5/2009 | Fuwa et al. |
| 2009/0171546 A1 | 7/2009 | Tozuka et al. |
| 2009/0173562 A1 | 7/2009 | Namari et al. |
| 2009/0229568 A1 | 9/2009 | Nakagawa |
| 2009/0234534 A1 | 9/2009 | Stempnik et al. |
| 2009/0240427 A1 | 9/2009 | Siereveld et al. |
| 2009/0243339 A1 | 10/2009 | Orr et al. |
| 2009/0254249 A1 | 10/2009 | Ghoneim et al. |
| 2009/0254259 A1 | 10/2009 | The |
| 2009/0261542 A1 | 10/2009 | McIntyre |
| 2009/0287392 A1 | 11/2009 | Thomas |
| 2009/0301830 A1 | 12/2009 | Kinsman et al. |
| 2009/0308682 A1 | 12/2009 | Ripley et al. |
| 2009/0312147 A1 | 12/2009 | Oshima et al. |
| 2009/0321167 A1 | 12/2009 | Simmons |
| 2010/0012399 A1 | 1/2010 | Hansen |
| 2010/0016120 A1 | 1/2010 | Dickinson et al. |
| 2010/0017059 A1 | 1/2010 | Lu et al. |
| 2010/0017070 A1 | 1/2010 | Doering et al. |
| 2010/0023236 A1 | 1/2010 | Morgan et al. |
| 2010/0057297 A1 | 3/2010 | Itagaki et al. |
| 2010/0059964 A1 | 3/2010 | Morris |
| 2010/0109277 A1 | 5/2010 | Furrer |
| 2010/0113214 A1 | 5/2010 | Krueger et al. |
| 2010/0121529 A1 | 5/2010 | Savaresi et al. |
| 2010/0131131 A1 | 5/2010 | Kamio et al. |
| 2010/0138142 A1 | 6/2010 | Pease |
| 2010/0140009 A1 | 6/2010 | Kamen et al. |
| 2010/0145579 A1 | 6/2010 | O'Brien |
| 2010/0145581 A1 | 6/2010 | Hou |
| 2010/0145595 A1 | 6/2010 | Bellistri et al. |
| 2010/0152969 A1 | 6/2010 | Li et al. |
| 2010/0181416 A1 | 7/2010 | Sakamoto et al. |
| 2010/0191420 A1 | 7/2010 | Honma et al. |
| 2010/0203933 A1 | 8/2010 | Eyzaguirre et al. |
| 2010/0211261 A1 | 8/2010 | Sasaki et al. |
| 2010/0219004 A1 | 9/2010 | Mackenzie |
| 2010/0230876 A1 | 9/2010 | Inoue et al. |
| 2010/0238129 A1 | 9/2010 | Nakanishi et al. |
| 2010/0252972 A1 | 10/2010 | Cox et al. |
| 2010/0253018 A1 | 10/2010 | Peterson |
| 2010/0259018 A1 | 10/2010 | Honig et al. |
| 2010/0276906 A1 | 11/2010 | Galasso et al. |
| 2010/0282210 A1 | 11/2010 | Itagaki |
| 2010/0301571 A1 | 12/2010 | Van et al. |
| 2011/0022266 A1 | 1/2011 | Ippolito et al. |
| 2011/0035089 A1 | 2/2011 | Hirao et al. |
| 2011/0035105 A1 | 2/2011 | Jolly |
| 2011/0036656 A1 | 2/2011 | Nicoson |
| 2011/0074123 A1 | 3/2011 | Fought et al. |
| 2011/0109060 A1 | 5/2011 | Earle et al. |
| 2011/0153158 A1 | 6/2011 | Acocella |
| 2011/0166744 A1 | 7/2011 | Lu et al. |
| 2011/0186360 A1 | 8/2011 | Brehob et al. |
| 2011/0190972 A1 | 8/2011 | Timmons et al. |
| 2011/0270509 A1 | 11/2011 | Whitney et al. |
| 2011/0297462 A1 | 12/2011 | Grajkowski et al. |
| 2011/0297463 A1 | 12/2011 | Grajkowski et al. |

(56) References Cited

U.S. PATENT DOCUMENTS

| | | |
|---|---|---|
| 2011/0301824 A1 | 12/2011 | Nelson et al. |
| 2011/0301825 A1 | 12/2011 | Grajkowski et al. |
| 2011/0307155 A1 | 12/2011 | Simard |
| 2012/0017871 A1 | 1/2012 | Matsuda |
| 2012/0018263 A1 | 1/2012 | Marking |
| 2012/0029770 A1 | 2/2012 | Hirao et al. |
| 2012/0053790 A1 | 3/2012 | Oikawa |
| 2012/0053791 A1 | 3/2012 | Harada |
| 2012/0055745 A1 | 3/2012 | Buettner et al. |
| 2012/0065860 A1 | 3/2012 | Isaji et al. |
| 2012/0078470 A1 | 3/2012 | Hirao et al. |
| 2012/0119454 A1 | 5/2012 | Di Maria |
| 2012/0136506 A1 | 5/2012 | Takeuchi et al. |
| 2012/0139328 A1 | 6/2012 | Brown et al. |
| 2012/0168268 A1 | 7/2012 | Bruno et al. |
| 2012/0191301 A1 | 7/2012 | Benyo et al. |
| 2012/0191302 A1 | 7/2012 | Sternecker et al. |
| 2012/0222927 A1 | 9/2012 | Marking |
| 2012/0247888 A1 | 10/2012 | Chikuma et al. |
| 2012/0253601 A1 | 10/2012 | Ichida et al. |
| 2012/0265402 A1 | 10/2012 | Post et al. |
| 2012/0277953 A1 | 11/2012 | Savaresi et al. |
| 2013/0009350 A1 | 1/2013 | Wolf-Monheim |
| 2013/0018559 A1 | 1/2013 | Epple et al. |
| 2013/0030650 A1 | 1/2013 | Norris et al. |
| 2013/0041545 A1 | 2/2013 | Baer et al. |
| 2013/0060423 A1 | 3/2013 | Jolly |
| 2013/0060444 A1 | 3/2013 | Matsunaga et al. |
| 2013/0074487 A1 | 3/2013 | Herold et al. |
| 2013/0079988 A1 | 3/2013 | Hirao et al. |
| 2013/0092468 A1 | 4/2013 | Nelson et al. |
| 2013/0096784 A1 | 4/2013 | Kohler et al. |
| 2013/0096785 A1 | 4/2013 | Kohler et al. |
| 2013/0096793 A1 | 4/2013 | Krosschell |
| 2013/0103259 A1 | 4/2013 | Eng et al. |
| 2013/0124045 A1 | 5/2013 | Suzuki et al. |
| 2013/0158799 A1 | 6/2013 | Kamimura |
| 2013/0161921 A1 | 6/2013 | Cheng et al. |
| 2013/0173119 A1 | 7/2013 | Izawa |
| 2013/0190980 A1 | 7/2013 | Ramirez Ruiz |
| 2013/0197732 A1 | 8/2013 | Pearlman et al. |
| 2013/0197756 A1 | 8/2013 | Ramirez Ruiz |
| 2013/0218414 A1 | 8/2013 | Meitinger et al. |
| 2013/0226405 A1 | 8/2013 | Koumura et al. |
| 2013/0253770 A1 | 9/2013 | Nishikawa et al. |
| 2013/0261893 A1 | 10/2013 | Yang |
| 2013/0304319 A1 | 11/2013 | Daniels |
| 2013/0328277 A1 | 12/2013 | Ryan et al. |
| 2013/0334394 A1 | 12/2013 | Parison et al. |
| 2013/0338869 A1 | 12/2013 | Tsumano |
| 2013/0341143 A1 | 12/2013 | Brown |
| 2013/0345933 A1 | 12/2013 | Norton et al. |
| 2014/0001717 A1 | 1/2014 | Giovanardi et al. |
| 2014/0005888 A1 | 1/2014 | Bose et al. |
| 2014/0012467 A1 | 1/2014 | Knox et al. |
| 2014/0038755 A1 | 2/2014 | Ijichi et al. |
| 2014/0046539 A1 | 2/2014 | Wijffels et al. |
| 2014/0058606 A1 | 2/2014 | Hilton |
| 2014/0095022 A1 | 4/2014 | Cashman et al. |
| 2014/0125018 A1 | 5/2014 | Brady et al. |
| 2014/0129083 A1 | 5/2014 | O'Connor et al. |
| 2014/0131971 A1 | 5/2014 | Hou |
| 2014/0136048 A1 | 5/2014 | Ummethala et al. |
| 2014/0156143 A1 | 6/2014 | Evangelou et al. |
| 2014/0167372 A1 | 6/2014 | Kim et al. |
| 2014/0232082 A1* | 8/2014 | Oshita ............... B60G 17/0162 |
| | | 280/124.161 |
| 2014/0239602 A1 | 8/2014 | Blankenship et al. |
| 2014/0316653 A1 | 10/2014 | Kikuchi et al. |
| 2014/0353933 A1 | 12/2014 | Hawksworth et al. |
| 2014/0358373 A1 | 12/2014 | Kikuchi et al. |
| 2015/0039199 A1 | 2/2015 | Kikuchi |
| 2015/0046034 A1 | 2/2015 | Kikuchi |
| 2015/0057885 A1 | 2/2015 | Brady et al. |
| 2015/0081170 A1 | 3/2015 | Kikuchi |
| 2015/0081171 A1 | 3/2015 | Ericksen et al. |
| 2015/0084290 A1 | 3/2015 | Norton et al. |
| 2015/0217778 A1 | 8/2015 | Fairgrieve et al. |
| 2015/0329141 A1 | 11/2015 | Preijert |
| 2016/0059660 A1 | 3/2016 | Brady et al. |
| 2016/0107498 A1 | 4/2016 | Yamazaki |
| 2016/0121689 A1 | 5/2016 | Park et al. |
| 2016/0121905 A1 | 5/2016 | Gillingham et al. |
| 2016/0121924 A1 | 5/2016 | Norstad |
| 2016/0153516 A1 | 6/2016 | Marking |
| 2016/0200164 A1* | 7/2016 | Tabata .................. B60G 21/073 |
| | | 280/5.508 |
| 2016/0214455 A1 | 7/2016 | Reul et al. |
| 2016/0347142 A1 | 12/2016 | Seong et al. |
| 2017/0008363 A1 | 1/2017 | Ericksen et al. |
| 2017/0043778 A1 | 2/2017 | Kelly |
| 2017/0087950 A1 | 3/2017 | Brady et al. |
| 2017/0129298 A1 | 5/2017 | Lu et al. |
| 2017/0129390 A1 | 5/2017 | Akaza et al. |
| 2017/0321729 A1 | 11/2017 | Melcher |
| 2018/0001729 A1 | 1/2018 | Goffer et al. |
| 2018/0009443 A1 | 1/2018 | Norstad |
| 2018/0126817 A1 | 5/2018 | Russell et al. |
| 2018/0141543 A1 | 5/2018 | Krosschell et al. |
| 2018/0264902 A1* | 9/2018 | Schroeder ............ F16C 11/0619 |
| 2018/0297435 A1 | 10/2018 | Brady et al. |
| 2018/0339566 A1 | 11/2018 | Ericksen et al. |
| 2018/0354336 A1* | 12/2018 | Oakden-Graus ......... B60G 3/20 |
| 2018/0361853 A1 | 12/2018 | Grajkowski et al. |
| 2019/0100071 A1 | 4/2019 | Tsiaras et al. |
| 2019/0118604 A1 | 4/2019 | Suplin et al. |
| 2019/0118898 A1 | 4/2019 | Ericksen et al. |
| 2019/0389478 A1 | 12/2019 | Norstad |
| 2020/0016953 A1 | 1/2020 | Oakden-Graus et al. |
| 2020/0096075 A1 | 3/2020 | Lindblad |
| 2020/0156430 A1 | 5/2020 | Oakden-Graus et al. |
| 2020/0223279 A1* | 7/2020 | McKeefery ............ B60G 11/50 |
| 2020/0269648 A1 | 8/2020 | Halper |
| 2020/0282786 A1* | 9/2020 | Lorenz .................. B60G 7/001 |
| 2021/0031579 A1* | 2/2021 | Booth .................... B60G 13/00 |
| 2021/0070124 A1 | 3/2021 | Brady et al. |
| 2021/0070125 A1 | 3/2021 | Brady et al. |
| 2021/0070126 A1 | 3/2021 | Brady et al. |
| 2021/0086578 A1 | 3/2021 | Brady et al. |
| 2021/0088100 A1 | 3/2021 | Wolfe |
| 2021/0102596 A1 | 4/2021 | Malmborg |
| 2021/0108696 A1 | 4/2021 | Randall |
| 2021/0162830 A1 | 6/2021 | Graus et al. |
| 2021/0162833 A1 | 6/2021 | Graus et al. |
| 2021/0206263 A1 | 7/2021 | Grajkowski et al. |
| 2021/0300140 A1 | 9/2021 | Ericksen |
| 2021/0316716 A1 | 10/2021 | Krosschell et al. |
| 2021/0362816 A1 | 11/2021 | Hedlund et al. |
| 2021/0379957 A1* | 12/2021 | Tabata ............... B60G 21/0551 |
| 2022/0016949 A1 | 1/2022 | Graus et al. |
| 2022/0032708 A1* | 2/2022 | Tabata ............... B60G 21/0558 |
| 2022/0041029 A1 | 2/2022 | Randall |
| 2022/0056976 A1 | 2/2022 | Anderson |
| 2022/0088988 A1 | 3/2022 | Menden |
| 2022/0266844 A1 | 8/2022 | Norstad et al. |
| 2022/0324282 A1 | 10/2022 | Brady et al. |
| 2022/0397194 A1 | 12/2022 | Kohler |
| 2023/0013665 A1 | 1/2023 | Gagnon |
| 2023/0079941 A1 | 3/2023 | Graus et al. |

FOREIGN PATENT DOCUMENTS

| | | | |
|---|---|---|---|
| CA | 2260292 | A1 | 7/2000 |
| CA | 2851626 | A1 | 4/2013 |
| CA | 2963790 | A1 | 4/2016 |
| CA | 2965309 | A1 | 5/2016 |
| CA | 3018906 | A1 | 4/2019 |
| CN | 1129646 | A | 8/1996 |
| CN | 2255379 | Y | 6/1997 |
| CN | 2544987 | Y | 4/2003 |
| CN | 1660615 | A | 8/2005 |
| CN | 1664337 | A | 9/2005 |
| CN | 1746803 | A | 3/2006 |
| CN | 1749048 | A | 3/2006 |

(56) References Cited

FOREIGN PATENT DOCUMENTS

| | | |
|---|---|---|
| CN | 1810530 A | 8/2006 |
| CN | 101417596 A | 4/2009 |
| CN | 101549626 A | 10/2009 |
| CN | 101868363 A | 10/2010 |
| CN | 201723635 U | 1/2011 |
| CN | 102069813 A | 5/2011 |
| CN | 102168732 A | 8/2011 |
| CN | 201914049 U | 8/2011 |
| CN | 202040257 U | 11/2011 |
| CN | 102616104 A | 8/2012 |
| CN | 102627063 A | 8/2012 |
| CN | 102678808 A | 9/2012 |
| CN | 202449059 U | 9/2012 |
| CN | 102729760 A | 10/2012 |
| CN | 202468817 U | 10/2012 |
| CN | 102840265 A | 12/2012 |
| CN | 103079934 A | 5/2013 |
| CN | 103303088 A | 9/2013 |
| CN | 103318184 A | 9/2013 |
| CN | 103507588 A | 1/2014 |
| CN | 104755348 A | 7/2015 |
| CN | 104768782 A | 7/2015 |
| CN | 105564437 A | 5/2016 |
| CN | 106183688 A | 12/2016 |
| CN | 106218343 A | 12/2016 |
| CN | 106794736 A | 5/2017 |
| CN | 103857576 B | 8/2017 |
| CN | 107406094 A | 11/2017 |
| CN | 107521449 A | 12/2017 |
| CN | 107521499 A | 12/2017 |
| CN | 110121438 A | 8/2019 |
| DE | 3811541 A1 | 10/1988 |
| DE | 4017255 A1 | 12/1990 |
| DE | 4323589 A1 | 1/1994 |
| DE | 4328551 A1 | 3/1994 |
| DE | 19508302 A1 | 9/1996 |
| DE | 19922745 A1 | 12/2000 |
| DE | 60029553 T2 | 7/2007 |
| DE | 102010020544 A1 | 1/2011 |
| DE | 102012101278 A1 | 8/2013 |
| EP | 0361726 A2 | 4/1990 |
| EP | 0398804 A1 | 11/1990 |
| EP | 0403803 A1 | 12/1990 |
| EP | 0544108 A1 | 6/1993 |
| EP | 0546295 A1 | 6/1993 |
| EP | 0405123 | 10/1993 |
| EP | 0473766 | 2/1994 |
| EP | 0691226 A1 | 1/1996 |
| EP | 0745965 A1 | 12/1996 |
| EP | 0829383 | 3/1998 |
| EP | 0829383 A2 | 3/1998 |
| EP | 0953470 A2 | 11/1999 |
| EP | 1022169 | 12/1999 |
| EP | 1005006 A2 | 5/2000 |
| EP | 1022169 | 7/2000 |
| EP | 1022169 A2 | 7/2000 |
| EP | 1172239 A2 | 1/2002 |
| EP | 1219475 A1 | 7/2002 |
| EP | 1238833 | 9/2002 |
| EP | 1238833 A1 | 9/2002 |
| EP | 1258706 A2 | 11/2002 |
| EP | 1355209 A1 | 10/2003 |
| EP | 1449688 A2 | 8/2004 |
| EP | 1481876 A1 | 12/2004 |
| EP | 1164897 | 2/2005 |
| EP | 2123933 A2 | 11/2009 |
| EP | 2216191 A1 | 8/2010 |
| EP | 2268496 A1 | 1/2011 |
| EP | 2397349 A1 | 12/2011 |
| EP | 2517904 A1 | 10/2012 |
| EP | 3150454 A1 | 4/2017 |
| EP | 3204248 A1 | 8/2017 |
| FR | 2935642 | 3/2010 |
| GB | 2233939 A | 1/1991 |
| GB | 2234211 A | 1/1991 |
| GB | 2259063 A | 3/1993 |
| GB | 2262491 A | 6/1993 |
| GB | 2329728 A | 3/1999 |
| GB | 2377415 | 1/2003 |
| GB | 2377415 A | 1/2003 |
| GB | 2412448 A | 9/2005 |
| GB | 2441348 A | 3/2008 |
| GB | 2445291 A | 7/2008 |
| IN | 20130233813 | 8/2014 |
| JP | 01-208212 | 8/1989 |
| JP | 02-155815 A | 6/1990 |
| JP | 03-137209 A | 6/1991 |
| JP | 04-368211 A | 12/1992 |
| JP | 05-178055 A | 7/1993 |
| JP | 06-156036 A | 6/1994 |
| JP | 07-117433 A | 5/1995 |
| JP | 07-186668 A | 7/1995 |
| JP | 08-332940 A | 12/1996 |
| JP | 09-203640 A | 8/1997 |
| JP | 2898949 B2 | 6/1999 |
| JP | 2956221 B2 | 10/1999 |
| JP | 11-321754 A | 11/1999 |
| JP | 3087539 B2 | 9/2000 |
| JP | 2001-018623 A | 1/2001 |
| JP | 3137209 B2 | 2/2001 |
| JP | 2001-121939 A | 5/2001 |
| JP | 2001-233228 A | 8/2001 |
| JP | 2002-219921 A | 8/2002 |
| JP | 2003-328806 A | 11/2003 |
| JP | 2008-273246 A | 11/2008 |
| JP | 2009-035220 A | 2/2009 |
| JP | 2009-160964 A | 7/2009 |
| JP | 4584510 B2 | 11/2010 |
| JP | 2011-126405 A | 6/2011 |
| JP | 5149443 B2 | 2/2013 |
| JP | 2013-173490 A | 9/2013 |
| JP | 2013-189109 A | 9/2013 |
| KR | 10-2008-0090833 A | 10/2008 |
| TW | M299089 U | 10/2006 |
| WO | 92/10693 A1 | 6/1992 |
| WO | 96/05975 A1 | 2/1996 |
| WO | 97/27388 A1 | 7/1997 |
| WO | 99/59860 A1 | 11/1999 |
| WO | 00/53057 A1 | 9/2000 |
| WO | 02/20318 A1 | 3/2002 |
| WO | 2004/009433 A1 | 1/2004 |
| WO | 2004/098941 A1 | 11/2004 |
| WO | 2009/008816 A1 | 1/2009 |
| WO | 2009/133000 A1 | 11/2009 |
| WO | 2012/028923 A1 | 3/2012 |
| WO | 2015/004676 A1 | 1/2015 |
| WO | 2016/057555 A1 | 4/2016 |
| WO | 2016/069405 A2 | 5/2016 |
| WO | 2020/089837 A1 | 5/2020 |

OTHER PUBLICATIONS

Ackermann et al., "Robust steering control for active rollover avoidance of vehicles with elevated center of gravity", Jul. 1998, pp. 1-6.

Article 34 Amendment, issued by the European Patent Office, dated Aug. 29, 2016, for related International patent application No. PCT/US2015/057132; 34 pages.

Bhattacharyya et al., "An Approach to Rollover Stability In Vehicles Using Suspension Relative Position Sensors And Lateral Acceleration Sensors", Dec. 2005, 100 pages.

Compare: Three Selectable Terrain Management Systems, Independent Land Rover News Blog, retrieved from https://web.archive.org/web/20120611082023/ . . . ; archive date Jun. 11, 2012; 4 pages.

EDFC Active Adjust Damping Force Instantly according to G-Force & Speed, TEIN, retrieved from https://web.archive.org/web/20140528221849/ . . . ; archive date May 28, 2014; 18 pages.

EDFC Active Adjust Damping Force Instantly according to G-Force & Speed, TEIN, retrieved from https://web.archive.org/web/20160515190809/ . . . ; archive date May 15, 2016; 22 pages.

English translation of Examination Report issued by the State

(56) References Cited

OTHER PUBLICATIONS

Intellectual Property Office of People's Republic of China, dated Jun. 1, 2015, for Chinese Patent Application No. 201180037804.3; 13 pages.
European Search Report issued by the European Patent Office, dated Feb. 10, 2017, for corresponding European patent application No. 16193006; 7 pages.
Examination Report issued by the European Patent Office, dated Aug. 1, 2016, for European Patent Application No. 11724931.8; 5 pages.
Examination Report issued by the State Intellectual Property Office of People's Republic of China, dated Feb. 3, 2016, for Chinese Patent Application No. 201180037804.3; 14 pages.
Examination Report No. 1 issued by the Australian Government IP Australia, dated Apr. 15, 2014, for Australian Patent Application No. 2011261248; 5 pages.
Examination Report No. 1 issued by the Australian Government IP Australia, dated Aug. 10, 2018, for Australian Patent Application No. 2015328248; 2 pages.
Examination Report No. 1 issued by the Australian Government IP Australia, dated Jan. 12, 2017, for corresponding Australian patent application No. 2015271880; 6 pages.
Examination Report No. 2 issued by the Australian Government IP Australia, dated Jun. 29, 2017, for Australian Patent Application No. 2015271880; 8 pages.
Examination Report No. 2 issued by the Australian Government IP Australia, dated May 29, 2015, for Australian Patent Application No. 2011261248; 8 pages.
Examination Report No. 3 issued by the Australian Government IP Australia, dated Dec. 1, 2017, for Australian Patent Application No. 2015271880; 7 pages.
Extended European Search Report issued by the European Patent Office, dated Sep. 7, 2018, for European Patent Application No. 18183050.6; 7 pages.
First drive: Ferrari's easy-drive supercar, GoAuto.com.au, Feb. 16, 2010; 4 pages.
Gangadurai et al.; Development of control strategy for optimal control of a continuously variable transmission operating in combination with a throttle controlled engine; SAE International; Oct. 12, 2005.
Hac et al., "Improvements in vehicle handling through integrated control of chassis systems", Int. J. of Vehicle Autonomous Systems(IJVAS), vol. 1, No. 1, 2002, pp. 83-110.
Huang et al., "Nonlinear Active Suspension Control Design Applied to a Half-Car Model", Proceedings of the 2004 IEEE International Conference on Networking, Mar. 21-23, 2004, pp. 719-724.
Ingalls, Jake; Facebook post https://www.facebook.com/groups/877984048905836/permalink/110447996625624- 2; Sep. 11, 2016; 1 page.
International Preliminary Report on Patentability in PCT Application Serial No. PCT/US15/57132, issued Jan. 30, 2017 (6 pages).
International Preliminary Report on Patentability issued by the European Patent Office, dated Apr. 11, 2017, for International Patent Application No. PCT/US2015/054296; 7 pages.
International Preliminary Report on Patentability issued by the International Bureau of WIPO, dated Dec. 10, 2019, for International Patent Application No. PCT/US2018/036383; 8 pages.
International Preliminary Report on Patentability issued by the International Bureau of WIPO, dated May 12, 2015, for International Application No. PCT/US2013/068937; 7 pages.
International Preliminary Report on Patentability issued by The International Bureau of WIPO, Dec. 4, 2012, for International Application No. PCT/US2011/039165; 9 pages.
International Preliminary Report on Patentability received for PCT Patent Application No. PCT/IB2019/060089, mailed on Jun. 3, 2021, 22 pages.
International Preliminary Report on Patentability received for PCT Patent Application No. PCT/US2013/068937, mailed on May 21, 2015, 8 pages.
International Preliminary Report on Patentability received for PCT Patent Application No. PCT/US2017/062303, mailed on May 31, 2019, 23 pages.
International Search Report and Written Opinion issued by the European Patent Office, dated Feb. 18, 2014, for International Application No. PCT/US2013/068937; 11 Pages.
International Search Report and Written Opinion of the International Searching Authority for International Application No. PCT/US2011/39165, dated Jan. 3, 2012; 15 pages.
International Search Report and Written Opinion of the International Searching Authority, dated Aug. 31, 2018, for International Patent Application No. PCT/US2018/036383; 12 pages.
International Search Report and Written Opinion received for PCT Patent Application No. PCT/IB2019/060089, mailed on May 29, 2020, 24 pages.
International Search Report and Written Opinion received for PCT Patent Application No. PCT/US2013/068937, mailed on Feb. 26, 2014, 10 pages.
International Search Report and Written Opinion received for PCT Patent Application No. PCT/US2015/054296, mailed on Dec. 18, 2015, 9 pages.
International Search Report and Written Opinion received for PCT Patent Application No. PCT/US2015/057132, mailed on May 13, 2016, 17 pages.
International Search Report and Written Opinion received for PCT Patent Application No. PCT/US2021/033199, mailed on Aug. 23, 2021, 14 pages.
International Search Report and Written Opinion received for PCT Patent Application No. PCT/US2021/042230, mailed on Dec. 17, 2021, 4 pages.
International Search Report issued by the International Searching Authority, dated Jun. 7, 2018, for related International Patent Application No. PCT/US2017/062303; 7 pages.
International Search Report of the International Searching Authority, dated Aug. 31, 2018, for International Patent Application No. PCT/US2018/036383; 7 pages.
McKay et al., Delphi Electronic Throttle Control Systems for Model Year 2000; Driver Features, System Security, and OEM Benefits. ETC for the Mass Market, Electronic Engine Controls 2000: Controls (SP-1500), SAE 2000 World Congress, Detroit, MI, Mar. 6-9, 2000, 13 pages.
Office Action issued by the Canadian Intellectual Property Office, dated Apr. 21, 2017, for corresponding Canadian patent application No. 2,801,334; 3 pages.
Office Action issued by the Canadian Intellectual Property Office, dated Jul. 26, 2019, for Canadian Patent Application No. 2,963,790; 3 pages.
Office Action issued by the Canadian Intellectual Property Office, dated Jun. 22, 2021, for Canadian Patent Application No. 3,043,481; 3 pages.
Office Action issued by the Canadian Intellectual Property Office, dated May 10, 2021, for Canadian Patent Application No. 2,890,996; 3 pages.
Office Action issued by the Canadian Intellectual Property Office, dated Oct. 1, 2019, for Canadian Patent Application No. 2,965,309; 8 pages.
Office Action issued by the Mexican Patent Office, dated Jun. 25, 2014, for corresponding Mexican patent application No. MX/a/2012/014069; 2 pages.
Scott Tsuneishi, "2005 Subaru WRX Sti—Blitz Throttle Controller," Oct. 1, 2008, Super Street Online, <http://www.superstreetonline.com/how-to/engine/turp-0810-2005-subam-wrx-sti-blitz-throttle-controller>; see appended screenshot retrived from the Internet Nov. 30, 2015; 11 pages.
Throttle Controller, Blitz Power USA, <http://www.blitzpowerusa.com/products/throcon/throcon.html>.; earliest known archive via Internet Archive Wayback Machine Sep. 14, 2009: <http://web.archive.Org/web/20090914102957/http://www.blitzpowerusa.com/products/throcon/throcon.html>.; see appended screenshot.
Trebi-Ollennu et al., Adaptive Fuzzy Throttle Control of an All Terrain Vehicle, 2001, Abstract.

(56) References Cited

OTHER PUBLICATIONS

Unno et al.; Development of Electronically Controlled DVT Focusing on Rider's Intention of Acceleration and Deceleration; SAE International; Oct. 30, 2007.
Written Opinion issued by the International Searching Authority, dated Jun. 7, 2018, for related International Patent Application No. PCT/US2017/062303; 22 pages.
Written Opinion of the International Searching Authority, dated Aug. 31, 2018, for International Patent Application No. PCT/US2018/036383; 8 pages.

* cited by examiner

DOWNHILL AND RIGHT POINTED SLIDE

Graphical User Interface
830

First Driver Mode
832

Second Driver Mode
834

Third Driver Mode
836

Fourth Driver Mode
838

Fig. 28

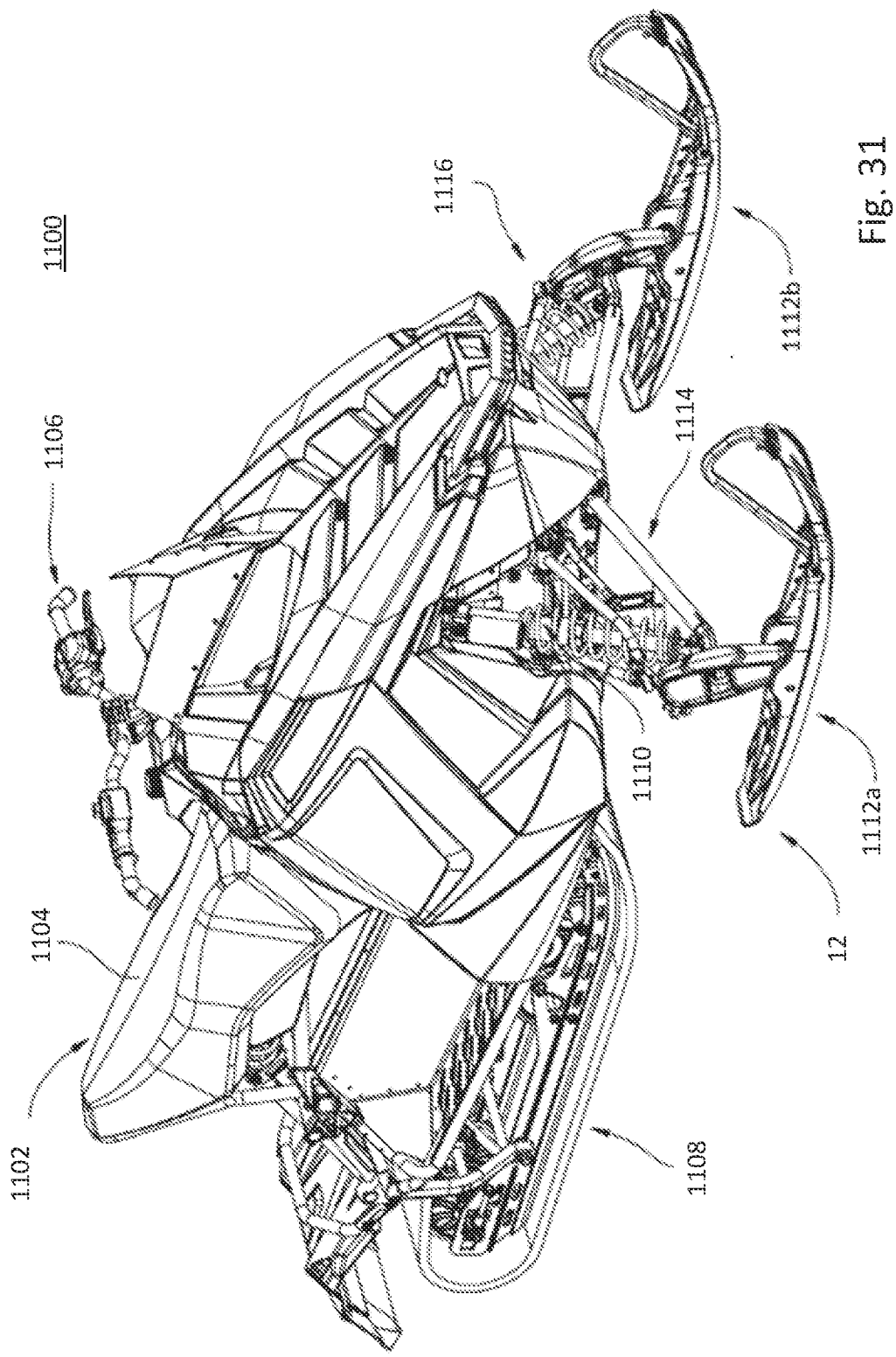

VEHICLE HAVING ADJUSTABLE COMPRESSION AND REBOUND DAMPING

CROSS-REFERENCE TO RELATED APPLICATION

The present application is continuation of U.S. patent application Ser. No. 17/175,888, filed Feb. 15, 2021, titled "VEHICLE HAVING ADJUSTABLE COMPRESSION AND REBOUND DAMPING" which is a divisional of U.S. patent application Ser. No. 16/198,280, filed Nov. 21, 2018, titled "VEHICLE HAVING ADJUSTABLE COMPRESSION AND REBOUND DAMPING", the entire disclosures of which are expressly incorporated herein by reference.

FIELD OF DISCLOSURE

The present disclosure relates to improved suspension characteristics for a vehicle and in particular to systems and methods of damping control, such as compression and/or rebound damping, for shock absorbers.

BACKGROUND OF THE DISCLOSURE

Adjustable shock absorbers are known. Systems and methods for controlling one or more adjustable characteristics of adjustable shock absorbers are disclosed in US Published Patent Application No. 2016/0059660 (filed Nov. 6, 2015, titled VEHICLE HAVING SUSPENSION WITH CONTINUOUS DAMPING CONTROL) and US Published Application 2018/0141543 (filed Nov. 17, 2017, titled VEHICLE HAVING ADJUSTABLE SUSPENSION).

SUMMARY OF THE DISCLOSURE

In an exemplary embodiment of the present disclosure, a recreational vehicle is provided. The recreational vehicle includes a plurality of ground engaging members, a frame supported by the plurality of ground engaging members, a plurality of suspensions, a plurality of adjustable shock absorbers, at least one sensor positioned on the recreational vehicle and configured to provide sensor information to a controller, and a controller operatively coupled to the sensor and the plurality of adjustable shock absorbers. Each of the suspensions couples a ground engaging member to the frame. The controller is configured to receive sensor information from the sensor, determine a cornering event related to the recreational vehicle executing a turn based on the sensor information, and provide, to at least one of the plurality of adjustable shock absorbers and based on the cornering event, one or more commands to result in a decrease of a damping characteristic of the at least one of the plurality of adjustable shock absorbers.

In some instances, the controller is configured determine, based on the sensor information, a direction of the turn corresponding to the cornering event, determine, based on the direction of the turn, at least one inner adjustable shock absorber of the plurality of adjustable shock absorbers, and provide, to the at least one inner adjustable shock absorber, one or more commands to result in a decrease of a compression damping characteristic and an increase of a rebound damping characteristic. In some examples, the at least one sensor comprises an inertial measurement unit (IMU), the sensor information comprises acceleration information indicating a lateral acceleration value, and the controller is configured to determine the cornering event by determining that the recreational vehicle is turning based on comparing the lateral acceleration value to a first threshold.

In some variations, the sensor information further comprises yaw rate information indicating a yaw rate. The controller is further configured to determine the cornering event by determining that the recreational vehicle is turning based on comparing the yaw rate to a second threshold. In some instances, the at least one sensor further comprises a steering sensor and the sensor information further comprises steering information indicating a steering position or a steering rate corresponding to a steering wheel. Further, the controller is configured to determine the cornering event by determining that the recreational vehicle is turning based on comparing the steering position to a third threshold.

In some variations, the sensor information comprises yaw rate information indicating a yaw rate and steering information indicating a steering position or a steering rate. The controller is further configured to prioritize the yaw rate information over the steering information such that the controller is configured to determine the vehicle is executing the turn in a first direction based on the yaw rate indicating the turn in the first direction and even if the steering position or the steering rate indicates the turn in a second direction or does not indicate the turn. In some instances, the sensor information comprises acceleration information indicating a lateral acceleration value and yaw rate information indicating a yaw rate. The controller is further configured to prioritize the acceleration information over the yaw rate information such that the controller is configured to determine the vehicle is executing the turn in a first direction based on the lateral acceleration value indicating the turn in the first direction and even if the yaw rate indicates the turn in a second direction or does not indicate the turn. In some examples, the sensor information comprises steering information indicating a steering position or a steering rate and acceleration information indicating a lateral acceleration value. The controller is further configured to prioritizing the acceleration information over the steering information such that the controller is configured to determine the vehicle is executing the turn in a first direction based on the lateral acceleration value indicating the turn in the first direction and even if the steering position or the steering rate indicates the turn in a second direction or does not indicate the turn.

In another exemplary embodiment of the present disclosure, a recreational vehicle is provided. The recreational vehicle includes a plurality of ground engaging members, a frame supported by the plurality of ground engaging members, a plurality of suspensions, a plurality of adjustable shock absorbers, a first sensor positioned on the recreational vehicle and configured to provide cornering information to a controller, a second sensor positioned on the recreational vehicle and configured to provide acceleration information to the controller and a controller operatively coupled to the sensor and the plurality of adjustable shock absorbers. Each of the suspensions couples a ground engaging member to the frame. The controller is configured to receive, from the first sensor, the cornering information, receive, from the second sensor, the acceleration information, determine, based on the cornering information, a cornering event corresponding to the recreational vehicle executing a turn, determine, based on the acceleration information, a position of the recreational vehicle during the turn, and provide, to the at least one of the plurality of adjustable shock absorbers and based on the cornering event and the position of the recreational vehicle during the turn, one or more commands to result in an adjustment of a damping characteristic of the at least one of the plurality of adjustable shock absorbers.

In some instances, the second sensor is an accelerometer or an IMU. In some examples, the controller is configured to determine the position of the recreational vehicle during the turn by determining, based on the acceleration information indicating a longitudinal deceleration, that the vehicle is entering the turn. Also, the controller is further configured to determine, based on the cornering event, a plurality of damping characteristics for the plurality of adjustable shock absorbers, bias, based on the determining that the vehicle is entering the turn, the plurality of damping characteristics, and generate the one or more commands based on the plurality of biased damping characteristics. In some instances, the controller is configured to bias the plurality of damping characteristics by additionally increasing the compression damping of a front adjustable shock absorber of the plurality of adjustable shock absorbers, and additionally decreasing the compression damping of a rear adjustable shock absorber of the plurality of adjustable shock absorbers. In some examples, the controller is configured to bias the plurality of damping characteristics by additionally increasing the rebound damping of a rear adjustable shock absorber of the plurality of adjustable shock absorbers and additionally decreasing the rebound damping of a front adjustable shock absorber of the plurality of adjustable shock absorbers.

In some instances, the controller is configured to determine the position of the recreational vehicle during the turn by determining, based on the acceleration information indicating a longitudinal acceleration, that the vehicle is exiting the turn. Also, the controller is further configured to determine, based on the cornering event, a plurality of damping characteristics for the plurality of adjustable shock absorbers, bias, based on the determining that the vehicle is exiting the turn, the plurality of damping characteristics, and generate the one or more commands based on the plurality of biased damping characteristics. In some examples, the controller is configured to bias the plurality of damping characteristics by additionally increasing the compression damping of a rear adjustable shock absorber of the plurality of adjustable shock absorbers and additionally decreasing the compression damping of a front adjustable shock absorber of the plurality of adjustable shock absorbers. In some variations, the controller is configured to bias the plurality of damping characteristics by additionally increasing the rebound damping of a front adjustable shock absorber of the plurality of adjustable shock absorbers and additionally decreasing the rebound damping of a rear adjustable shock absorber of the plurality of adjustable shock absorbers.

In another exemplary embodiment of the present disclosure, a recreational vehicle is provided. The recreational vehicle includes a plurality of ground engaging members, a frame supported by the plurality of ground engaging members, a plurality of suspensions, a plurality of adjustable shock absorbers, a sensor positioned on the recreational vehicle and configured to provide sensor information to a controller, and a controller operatively coupled to the sensor and the plurality of adjustable shock absorbers. Each of the suspensions couples a ground engaging member to the frame. The controller is configured to receive sensor information from the sensor, determine a braking event corresponding to the recreational vehicle based on the sensor information, and provide, to at least one of the plurality of adjustable shock absorbers and based on the braking event, one or more commands to decrease a damping characteristic of the at least one of the plurality of adjustable shock absorbers.

In some instances, the controller is configured to provide one or more commands to decrease a rebound damping characteristic of the at least one of the plurality of adjustable shock absorbers. In some examples, the controller is configured to provide, one or more commands to decrease a compression damping characteristic of the at least one of the plurality of adjustable shock absorbers. In some variations, the sensor is a brake sensor, and the sensor information is information indicating actuation of a brake pedal. In some instances, the controller is configured to provide, to a front adjustable shock absorber of the plurality of adjustable shock absorbers, a command to increase a compression damping characteristic and to decrease a rebound damping characteristic. In some examples, the controller is configured to provide, to a rear adjustable shock absorber of the plurality of adjustable shock absorbers, a command to increase a rebound damping characteristic and to decrease a compression damping characteristic.

In another exemplary embodiment of the present disclosure, a recreational vehicle is provided. The recreational vehicle includes a plurality of ground engaging members, a frame supported by the plurality of ground engaging members, a plurality of suspensions, a plurality of adjustable shock absorbers, a first sensor positioned on the recreational vehicle and configured to provide braking information to a controller, a second sensor positioned on the recreational vehicle and configured to provide acceleration information, and a controller operatively coupled to the sensor and the plurality of adjustable shock absorbers. Each of the suspensions couples a ground engaging member to the frame. The controller is configured to receive, from the first sensor, the braking information, receive, from the second sensor, the acceleration information, determine a braking event corresponding to the recreational vehicle based on the braking information, determine, based on the acceleration information, an amount to reduce a damping characteristic of an adjustable shock absorber from the plurality of adjustable shock absorbers, and provide, to the adjustable shock absorber and based on the cornering event, one or more first commands to adjust the damping characteristics of the front adjustable shock absorber to the determined amount.

In some instances, the second sensor is an accelerometer, and the acceleration information indicates a longitudinal deceleration of the recreational vehicle. In some examples, the second sensor is an inertial measurement unit (IMU), and the acceleration information indicates a longitudinal deceleration of the recreational vehicle. In some variations, the second sensor is a brake sensor, and the acceleration information indicates a longitudinal deceleration of the recreational vehicle. In some instances, the adjustable shock absorber is a shock absorber positioned at a rear portion of the recreational vehicle.

In some variations, the controller is configured to determine, based on the acceleration information, a deceleration value, and in response to determining the deceleration value is below a first threshold, maintaining a compression damping of the adjustable shock absorber. In some examples, the controller is configured to determine, based on the acceleration information, a deceleration value, in response to determining the deceleration value is greater than a first threshold and below a second threshold, reducing a compression damping of the adjustable shock absorber to a first value, and in response to determining the deceleration value is greater than the first threshold and the second threshold, reducing the compression damping of the adjustable shock absorber to a second value, wherein the second value is below the first value.

In another exemplary embodiment of the present disclosure, a recreational vehicle is provided. The recreational vehicle includes a plurality of ground engaging members, a frame supported by the plurality of ground engaging members, a plurality of suspensions, a plurality of adjustable shock absorbers, a sensor positioned on the recreational vehicle and configured to provide airborne information and landing information to a controller, and a controller operatively coupled to the sensor and the plurality of adjustable shock absorbers. Each of the suspensions couples a ground engaging member to the frame. The controller is configured to receive, from the sensor, the airborne information, determine, based on the airborne information, an airborne event indicating the recreational vehicle is airborne, provide, based on the airborne event, one or more first commands to result in decreasing a rebound damping characteristic for the plurality of adjustable shock absorbers from a pre-takeoff rebound value to a free-fall rebound value, receive, from the at least one sensor, landing information, determine, based on the landing information, a landing event indicating the recreational vehicle has landed subsequent to the airborne event, determine, based on the airborne event and the landing event, a time duration that the recreational vehicle is airborne, provide, based on the landing event and the time duration the recreational vehicle is airborne, one or more second commands to result in increasing the rebound damping characteristic for the plurality of adjustable shock absorbers from the free-fall rebound value to a post-landing rebound value to prevent a landing hop, and provide one or more third commands to result in decreasing the rebound damping characteristic for the plurality of adjustable shock absorbers from the post-landing rebound value to the pre-takeoff rebound value.

In some instances, the sensor is an accelerometer or an IMU. In some examples, the sensor is an inertial measurement unit (IMU). In some variations, the one or more third commands cause the rebound damping characteristic for the plurality of adjustable shock absorbers to gradually decrease from the post-landing rebound value to the pre-takeoff rebound value. In some examples, the controller is further configured to increase the post-landing rebound value as the time duration that the recreational vehicle is airborne increases. In some variations, the controller is further configured to in response to determining the time duration is below a first threshold, set the post-landing rebound value to a same value as the pre-takeoff rebound value. In some instances, the controller is further configured to in response to determining the time duration is below a first threshold, bias the post-landing rebound value for a front shock absorber of the plurality of adjustable shock absorbers different from a rear shock absorber of the plurality of adjustable shock absorbers, and generate the one or more second commands based on the biasing the post-landing rebound value. In some instances, the controller is configured to bias the post-landing rebound value by additionally increasing the post-landing rebound value for the front shock absorber.

In some examples, the controller is configured to provide, based on the airborne event, one or more fourth commands to result in gradually increasing a compression damping characteristic for the plurality of adjustable shock absorbers from a pre-takeoff compression value to a post-landing compression value, provide, based on the landing event and the time duration, one or more fifth commands to result in maintaining the compression damping characteristic for the plurality of adjustable shock absorbers at the post-landing compression value, and provide one or more sixth commands to result in decreasing the compression damping characteristic for the plurality of adjustable shock absorbers from the post-landing compression value to the pre-takeoff compression value. In some instances, the controller is further configured to in response to determining the time duration is below a first threshold, set the post-landing compression value to a same value as the pre-takeoff compression value. In some examples, the controller is further configured to in response to determining the time duration is below a first threshold, bias the post-landing compression value for a front shock absorber of the plurality of adjustable shock absorbers different from a rear shock absorber of the plurality of adjustable shock absorbers, and generate the one or more fifth commands based on the biasing the post-landing compression value. In some variations, the controller is further configured to in response to determining the time duration is below a first threshold, bias the post-landing compression value for a front shock absorber of the plurality of adjustable shock absorbers different from a rear shock absorber of the plurality of adjustable shock absorbers, and generate the one or more fifth commands based on the biasing the post-landing compression value. In some examples, the free-fall rebound value is substantially zero.

In another exemplary embodiment of the present disclosure, a recreational vehicle is provided. The recreational vehicle includes a plurality of ground engaging members, a frame supported by the plurality of ground engaging members, a plurality of suspensions, a plurality of adjustable shock absorbers, a sensor positioned on the recreational vehicle and configured to provide acceleration information to a controller, and a controller operatively coupled to the sensor and the plurality of adjustable shock absorbers. Each of the suspensions couples a ground engaging member to the frame. The controller is configured to receive, from the at least one sensor, the acceleration information, determine, based on the acceleration information, an orientation of the vehicle, and provide, to at least one of the plurality of adjustable shock absorbers and based on the orientation of the vehicle, one or more commands to result in an adjustment of a damping characteristic of the at least one of the plurality of adjustable shock absorbers.

In some instances, the sensor is an accelerometer or an IMU. In some examples, the sensor is an IMU. In some variations, the recreational vehicle further includes an operator interface configured to provide one or more user inputs indicating mode selections to the controller. The controller is configured to provide the one or more commands to result in the adjustment of the damping characteristic based on receiving, from the operator interface, user input indicating a selection of a rock crawler mode. In some examples, the at least one sensor comprises a second sensor configured to provide vehicle speed information to the controller. The controller is further configured to receive, from the second sensor, vehicle speed information indicating a vehicle speed of the recreational vehicle, and in response to determining that the vehicle speed is greater than a threshold, transitioning the vehicle from the rock crawler mode to a different operating mode.

In some variations, the controller is further configured to determine, based on the acceleration information, a longitudinal acceleration and a lateral acceleration of the recreational vehicle, determine, based on the longitudinal acceleration and the lateral acceleration, a pitch angle and a roll angle of the recreational vehicle, and the controller is configured to determine the orientation of the recreational vehicle based on the pitch angle and the roll angle. In some examples, the controller is configured to determine, based on the longitudinal acceleration and the lateral acceleration, that the orientation of the recreational vehicle is on flat ground, and provide, based on the determination that the recreational vehicle is on flat ground, one or more commands to result in an increase of a compression damping characteristic and a decrease of a rebound damping characteristic for the at least one of the plurality of adjustable shock absorbers.

In some instances, the controller is configured to determine, based on the longitudinal acceleration and the lateral acceleration, at least one uphill adjustable shock absorber and at least one downhill adjustable shock absorber from the plurality of adjustable shock absorbers, and provide, to the at least one uphill adjustable shock absorber, one or more commands to result in an increase of a rebound damping characteristic and a decrease of a compression damping characteristic. In some examples, the controller is further configured to determine, based on the longitudinal acceleration and the lateral acceleration, at least one uphill adjustable shock absorber and at least one downhill adjustable shock absorber from the plurality of adjustable shock absorbers, and provide, to the at least one downhill adjustable shock absorber, one or more commands to result in an increase of a compression damping characteristic.

In another exemplary embodiment of the present disclosure, a recreational vehicle is provided. The recreational vehicle includes a plurality of ground engaging members, a frame supported by the plurality of ground engaging members, a plurality of suspensions, a plurality of adjustable shock absorbers, a sensor positioned on the recreational vehicle and configured to provide sensor information to a controller, and a controller operatively coupled to the sensor and the plurality of adjustable shock absorbers. Each of the suspensions couples a ground engaging member to the frame. The controller is configured to receive, from the at least one sensor, the sensor information, determine, based on the sensor information, a sliding event corresponding to the recreational vehicle sliding while traversing a slope, and provide, to at least one of the plurality of adjustable shock absorbers and based on the determining of the sliding event, one or more commands to result in adjusting a damping characteristic for the at least one of the plurality of adjustable shock absorbers.

In some instances, the at least one sensor comprises an inertial measurement unit (IMU). Also, the sensor information comprises acceleration information indicating a lateral acceleration value. The controller is configured to determine the sliding event by determining that the recreational vehicle is sliding based on comparing the lateral acceleration value to a first threshold. In some examples, the sensor information further comprises yaw rate information indicating a yaw rate. The controller is further configured to determine the cornering based on the yaw rate. In some variations, the sensor information comprises acceleration information indicating a lateral acceleration value and yaw rate information indicating a yaw rate. The controller is further configured to prioritize the acceleration information over the yaw rate information such that the controller is configured to determine the vehicle is sliding while traversing the slope based on the lateral acceleration value exceeding a first threshold and even if the yaw rate does not exceed a second threshold.

In some instances, the sensor information comprises steering information indicating a steering position or a steering rate and acceleration information indicating a lateral acceleration value. The controller is further configured to prioritizing the acceleration information over the steering information such that the controller is configured to determine the vehicle is sliding while traversing the slope based on the lateral acceleration value exceeding a first threshold and even if the steering position or the steering rate does not exceed a second threshold. In some variations, the sensor information indicates a lateral acceleration. The controller is further configured to determine, based on the lateral acceleration, a direction of a slide corresponding to the sliding event, determining, based on the direction of the slide, at least one leading adjustable shock absorber of the plurality of adjustable shock absorbers, and the controller is configured to provide the one or more commands by providing, to the at least one leading adjustable shock absorber, one or more commands to result in an increase of a compression damping characteristic and a decrease of a rebound damping characteristic.

In some examples, the sensor information indicates a lateral acceleration. The controller is further configured to determine, based on the lateral acceleration, a direction of a slide corresponding to the sliding event, determining, based on the direction of the slide, at least one trailing adjustable shock absorber of the plurality of adjustable shock absorbers, and the controller is configured to provide the one or more commands by providing, to the at least one trailing adjustable shock absorber, one or more commands to result in a decrease of a compression damping characteristic and an increase of a rebound damping characteristic. In some variations, the sensor information indicates a longitudinal acceleration. The controller is further configured to determine, based on the longitudinal acceleration, an orientation of the vehicle, determine, based on the orientation of the vehicle, a plurality of damping characteristics for the plurality of adjustable shock absorbers, bias, based on the orientation of the vehicle, the plurality of damping characteristics, and generate the one or more commands based on the plurality of biased damping characteristics.

In some instances, the controller is configured to bias the plurality of damping characteristics by additionally increasing a compression damping of a downhill adjustable shock absorber of the plurality of adjustable shock absorbers and additionally decreasing a compression damping of an uphill adjustable shock absorber of the plurality of adjustable shock absorbers. In some examples, the controller is configured to bias the plurality of damping characteristics by additionally increasing the rebound damping of an uphill adjustable shock absorber of the plurality of adjustable shock absorbers.

In another exemplary embodiment of the present disclosure, a method and vehicle of adjusting a plurality of adjustable shock absorbers of a recreational vehicle traveling over terrain including at least one dune is provided. For example, the method and vehicle determines an orientation of the recreational vehicle based on a longitudinal acceleration of the vehicle, determines a slide of the recreational vehicle based on a lateral acceleration of the vehicle, detects the recreational vehicle is sliding across the dune based on the orientation and the slide of the recreational vehicle, and adjusts at least one damping characteristic of the plurality of adjustable shock absorbers to turn the recreational vehicle into the dune as the recreational vehicle continues across the dune.

In some instances, the method and vehicle determines, based on the slide, at least one leading adjustable shock absorber and at least one trailing adjustable shock absorber of the plurality of adjustable shock absorbers and provides, to the at least one leading adjustable shock absorber, one or more commands to result in an increase of a compression damping characteristic and a decrease in a rebound damping characteristic. In some examples, the method and vehicle determines, based on the slide, at least one leading adjustable shock absorber and at least one trailing adjustable shock absorber of the plurality of adjustable shock absorbers and provides, to the at least one trailing adjustable shock absorber, one or more commands to result in an increase of a rebound damping characteristic and a decrease of a compression damping characteristic.

In some variations, the method and vehicle determines, based on the orientation, at least one uphill adjustable shock absorber and at least one downhill adjustable shock absorber of the plurality of adjustable shock absorbers and provides, to the at least one uphill adjustable shock absorber, one or more commands to result in an increase of a compression damping characteristic. In some instances, the method and vehicle determines, based on the orientation, at least one uphill adjustable shock absorber and at least one downhill adjustable shock absorber of the plurality of adjustable shock absorbers and provides, to the at least one downhill adjustable shock absorber, one or more commands to result in an increase of a rebound damping characteristic and a decrease of the compression damping characteristic.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The foregoing aspects and many additional features of the present system and method will become more readily appreciated and become better understood by reference to the following detailed description when taken in conjunction with the accompanying drawings, where:

FIG. 28 shows an exemplary graphical user interface for adjusting driver modes;

FIG. 31 illustrates a view of another exemplary vehicle.

DETAILED DESCRIPTION OF EMBODIMENTS

Figure 1:
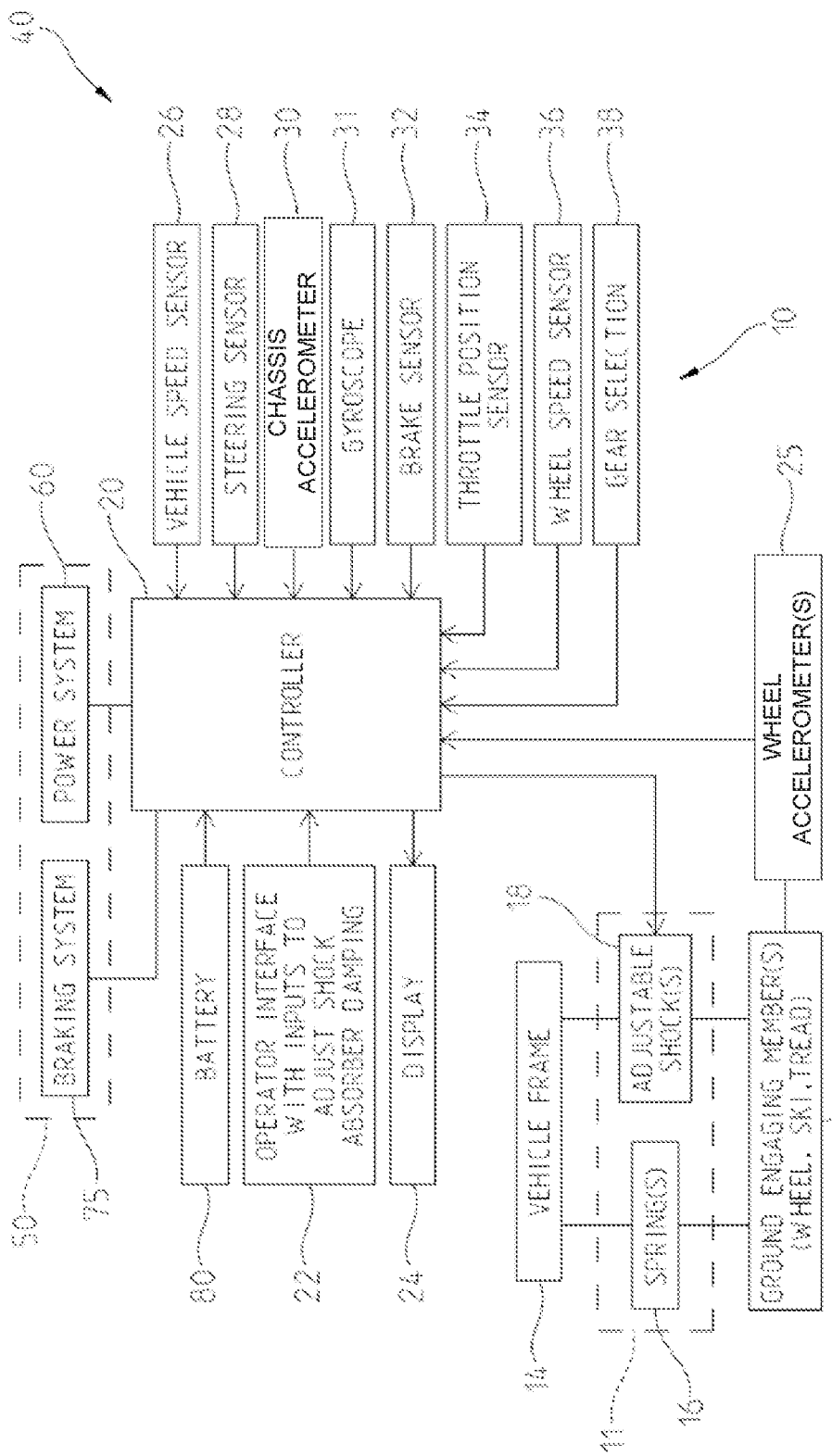
FIG. 1 shows a representative view of components of a vehicle of the present disclosure having a suspension with a plurality of continuous damping control shock absorbers and a plurality of sensors integrated with a controller of the vehicle.

For the purposes of promoting an understanding of the principles of the present disclosure, reference will now be made to the embodiments illustrated in the drawings, which are described below. The embodiments disclosed below are not intended to be exhaustive or limited to the precise form disclosed in the following detailed description. Rather, the embodiments are chosen and described so that others skilled in the art may utilize their teachings.

Referring now to FIG. 1, the present disclosure relates to a vehicle 10 having a suspension system 11 located between a plurality of ground engaging members 12 and a vehicle frame 14. Exemplary ground engaging members 12 include wheels, skis, guide tracks, treads or other suitable devices for supporting the vehicle relative to the ground. The suspension typically includes springs 16 and shock absorbers 18 coupled between the ground engaging members 12 and the frame 14. The springs 16 may include, for example, coil springs, leaf springs, air springs or other gas springs. The air or gas springs 16 may be adjustable. See, for example, U.S. Pat. No. 7,950,486, assigned to the current assignee, the entire disclosure of which is incorporated herein by reference.

Figure 2:
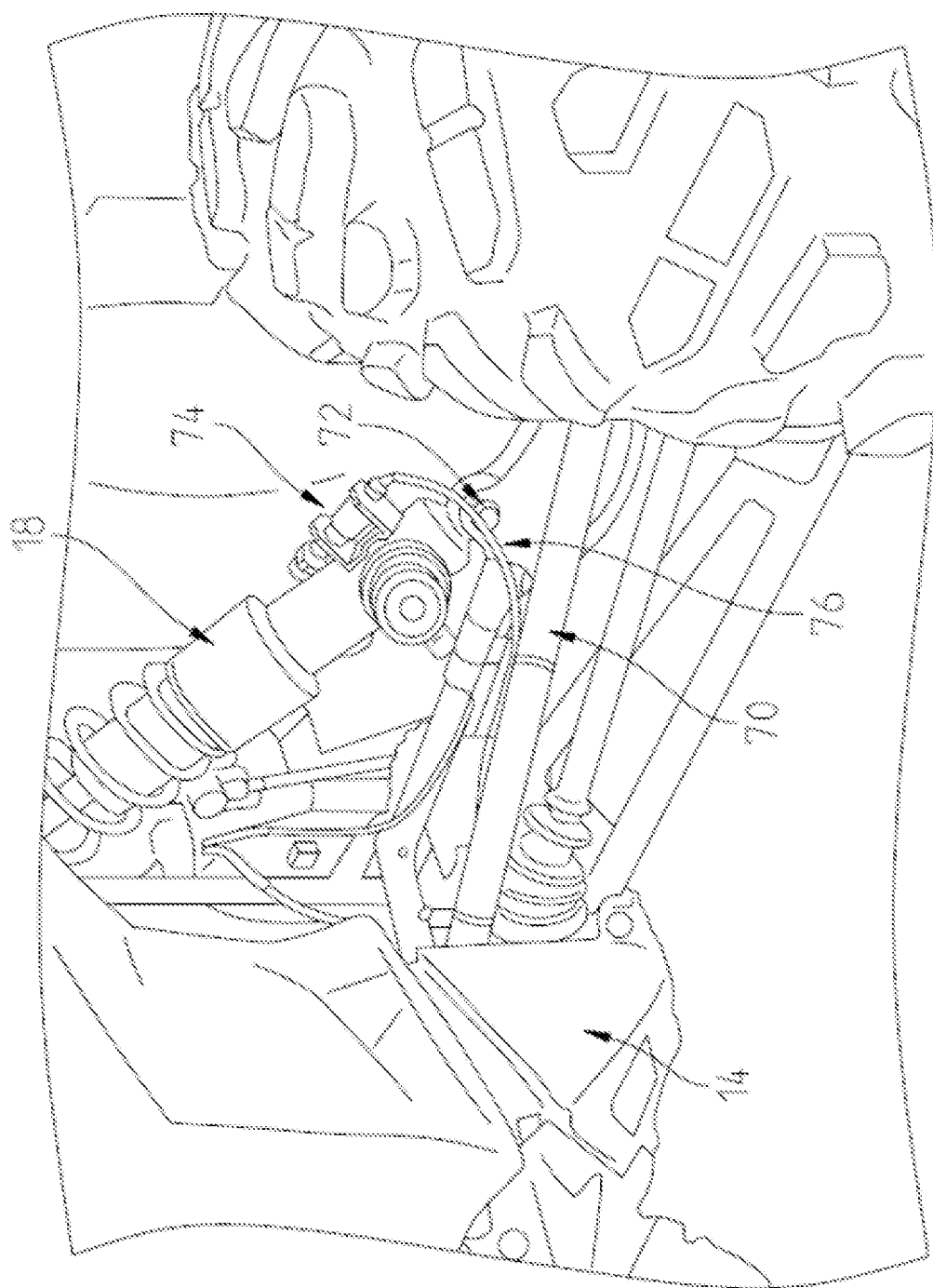
FIG. 2 shows an adjustable damping shock absorber coupled to a vehicle suspension.

The adjustable shock absorbers 18 are often coupled between the vehicle frame 14 and the ground engaging members 12 through an A-arm linkage 70 (See FIG. 2) or other type linkage. Springs 16 are also coupled between the ground engaging members 12 and the vehicle frame 14. FIG. 2 illustrates an adjustable shock absorber 18 mounted on an A-arm linkage 70 having a first end pivotably coupled to the vehicle frame 14 and a second end pivotably coupled to A-arm linkage 70 which moves with wheel 12. A damping control activator 74 is coupled to controller 20 by one or more wires 76. An exemplary damping control activator is an electronically controlled valve which is activated to increase or decrease the damping characteristics of adjustable shock absorber 18.

In one embodiment, the adjustable shock absorbers 18 include solenoid valves mounted at the base of the shock body or internal to a damper piston of the shock absorber 18. The stiffness of the shock is increased or decreased by introducing additional fluid to the interior of the shock absorber, removing fluid from the interior of the shock absorber, and/or increasing or decreasing the ease with which fluid can pass from a first side of a damping piston of the shock absorber to a second side of the damping piston of the shock absorber. In another embodiment, the adjustable shock absorbers 18 include a magnetorheological fluid internal to the shock absorber 18. The stiffness of the shock is increased or decreased by altering a magnetic field experienced by the magnetorheological fluid. Additional details on exemplary adjustable shocks are provided in US Published Patent Application No. 2016/0059660, filed Nov. 6, 2015, titled VEHICLE HAVING SUSPENSION WITH CONTINUOUS DAMPING CONTROL, assigned to the present assignee, the entire disclosure of which is expressly incorporated by reference herein.

In one embodiment, a spring 16 and shock 18 are located adjacent each of the ground engaging members 12. In an all-terrain vehicle (ATV), for example, a spring 16 and an adjustable shock 18 are provided adjacent each of the four wheels 12. In a snowmobile, for example, one or more springs 16 and one or more adjustable shocks 18 are provided for each of the two front skis and the rear tread. Some manufacturers offer adjustable springs 16 in the form of either air springs or hydraulic preload rings. These adjustable springs 16 allow the operator to adjust the ride height on the go. However, a majority of ride comfort comes from the damping provided by shock absorbers 18.

In an illustrated embodiment, controller 20 provides signals and/or commands to adjust damping characteristics of the adjustable shocks 18. For example, the controller 20 provides signals to adjust damping of the shocks 18 in a continuous or dynamic manner. In other words, adjustable shocks 18 may be adjusted to provide differing compression damping, rebound damping, or both. In one embodiment, adjustable shocks 18 include a first controllable valve to adjust compression damping and a second controllable valve to adjust rebound damping. In another embodiment, adjustable shocks include a combination valve which controls both compression damping and rebound damping.

In an illustrated embodiment of the present disclosure, an operator interface 22 is provided in a location easily accessible to the driver operating the vehicle. For example, the operator interface 22 is either a separate user interface mounted adjacent the driver's seat on the dashboard or integrated onto a display within the vehicle. Operator interface 22 includes user input devices to allow the driver or a passenger to manually adjust shock absorber 18 damping during operation of the vehicle based on road conditions that are encountered or to select a preprogrammed active damping profile for shock absorbers 18 by selecting a ride mode. In one embodiment, a selected ride mode (e.g., a selected driver mode) alters characteristics of suspension system 11 alone, such as the damping profile for shock absorbers 18. In one embodiment, a selected ride mode alters characteristics of suspension system 11 and other vehicle systems, such as a driveline torque management system 50 or a steering system 104.

Exemplary input devices for operator interface 22 include levers, buttons, switches, soft keys, and other suitable input devices. Operator interface 22 may also include output devices to communicate information to the operator. Exemplary output devices include lights, displays, audio devices, tactile devices, and other suitable output devices. In another illustrated embodiment, the user input devices are on a steering wheel, handle bar, or other steering control of the vehicle 10 to facilitate actuation of the damping adjustment. For example, referring to FIG. 27, a physical switch 820 may be located on the steering wheel, handle bar, or other steering control of the vehicle 10. A display 24 is also provided on or next to the operator interface 22 or integrated into a dashboard display of vehicle 10 to display information related to the compression and/or rebound damping characteristics.

As explained in further detail below, controller 20 receives user inputs from operator interface 22 and adjusts the damping characteristics of the adjustable shocks 18 accordingly. The operator may independently adjust front and rear shock absorbers 18 to adjust the ride characteristics of the vehicle 10. In certain embodiments, each of the shocks 18 is independently adjustable so that the damping characteristics of the shocks 18 are changed from one side of the vehicle 10 to another. Side-to-side adjustment is desirable during sharp turns or other maneuvers in which different damping profiles for shock absorbers 18 on opposite sides of the vehicle improves the handling characteristics of the vehicle. The damping response of the shock absorbers 18 can be changed in a matter of milliseconds to provide nearly instantaneous changes in damping for potholes, dips in the road, or other driving conditions. Additionally, and/or alternatively, controller 20 may independently adjust the damping characteristics of front and/or rear shocks 18. An advantage, among others, of adjusting the damping characteristics of the front and/or rear shocks 18 is that the vehicle 10 may be able to operate more efficiently in rough terrain.

The controller 20 communicates with (e.g., provides, transmits, receives, and/or obtains) multiple vehicle condition sensors 40. For example, a wheel accelerometer 25 is coupled adjacent each ground engaging member 12. The controller 20 communicates with each of the accelerometers 25. For instance, the accelerometers 25 may provide information indicating movement of the ground engaging members and the suspension components 16 and 18 as the vehicle traverses different terrain. Further, the controller 20 may communicate with additional vehicle condition sensors 40, such as a vehicle speed sensor 26, a steering sensor 28, a chassis supported accelerometer 30, a chassis supported gyroscope 31, an inertial measurement unit (IMU) 37

(shown on FIG. 10), a physical switch 820 (shown on FIG. 10), and other sensors which monitor one or more characteristics of vehicle 10.

Figure 3:
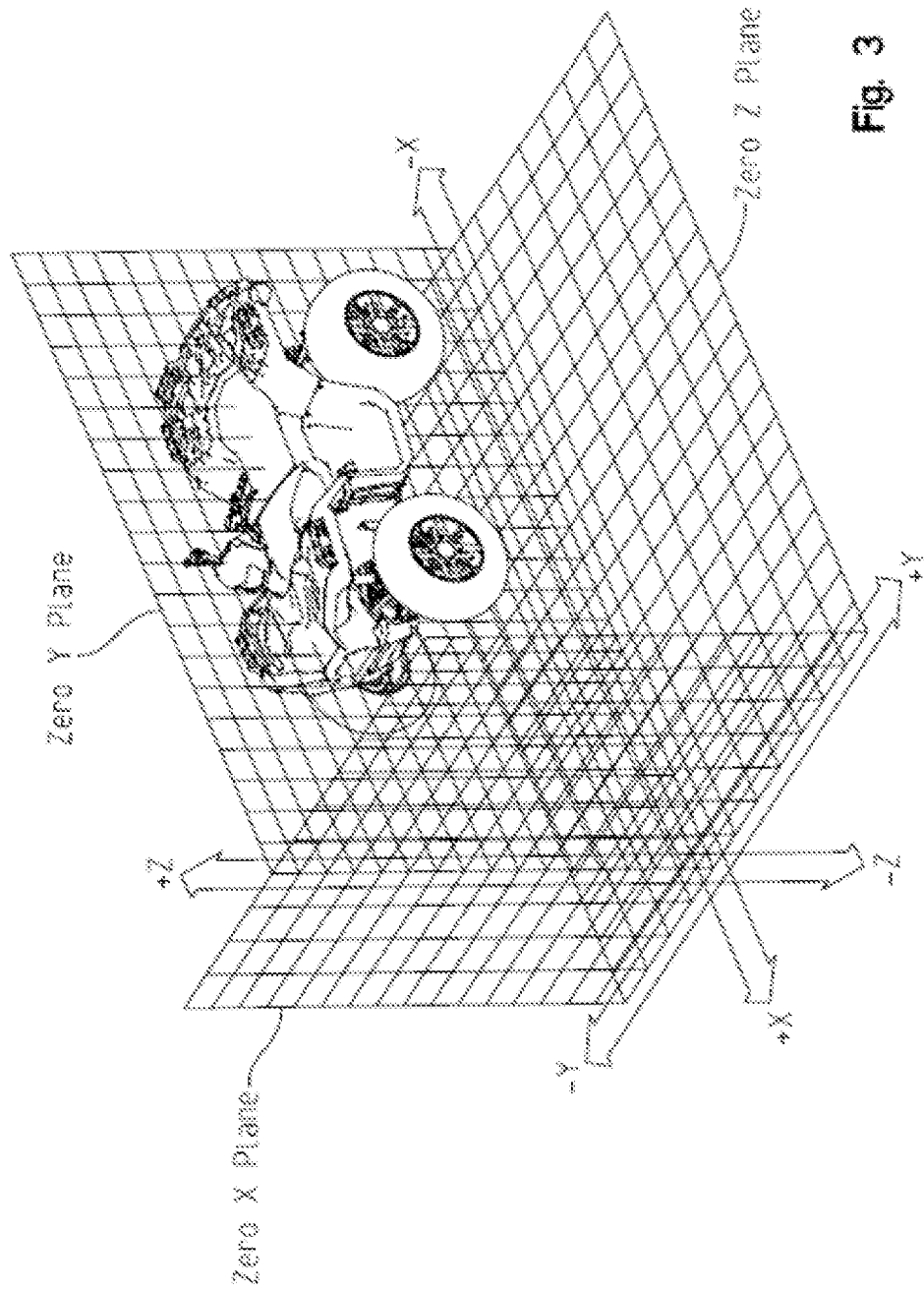
FIG. 3 shows an x-axis, a y-axis, and a z-axis for a vehicle, such as an ATV.

Accelerometer 30 is illustratively a three-axis accelerometer supported on the chassis of the vehicle 10 to provide information indicating acceleration forces of the vehicle 10 during operation. In some instances, accelerometer 30 is located at or close to a center position (e.g., a center of gravity position) of vehicle 10. In other instances, the accelerometer 30 is located at a position that is not near the center of gravity of the vehicle 10. In the exemplary vehicle 200 illustrated in FIGS. 6-9, the chassis accelerometer 30 is located along a longitudinal centerline plane 122 of vehicle 200. The x-axis, y-axis, and z-axis for a vehicle 10, illustratively an ATV, are shown in FIG. 3.

Gyroscope 31 is illustratively a three-axis gyroscope supported on the chassis to provide indications of inertial measurements, such as roll rates, pitch rates, and/or yaw rates, of the vehicle during operation. In one embodiment, accelerometer 30 is not located at a center of gravity of vehicle 10 and the readings of gyroscope 31 are used by controller 20 to determine the acceleration values of vehicle 10 at the center of gravity of vehicle 10. In one embodiment, accelerometer 30 and gyroscope 31 are integrated into the controller 20, such as a suspension controller 86.

Figure 10:
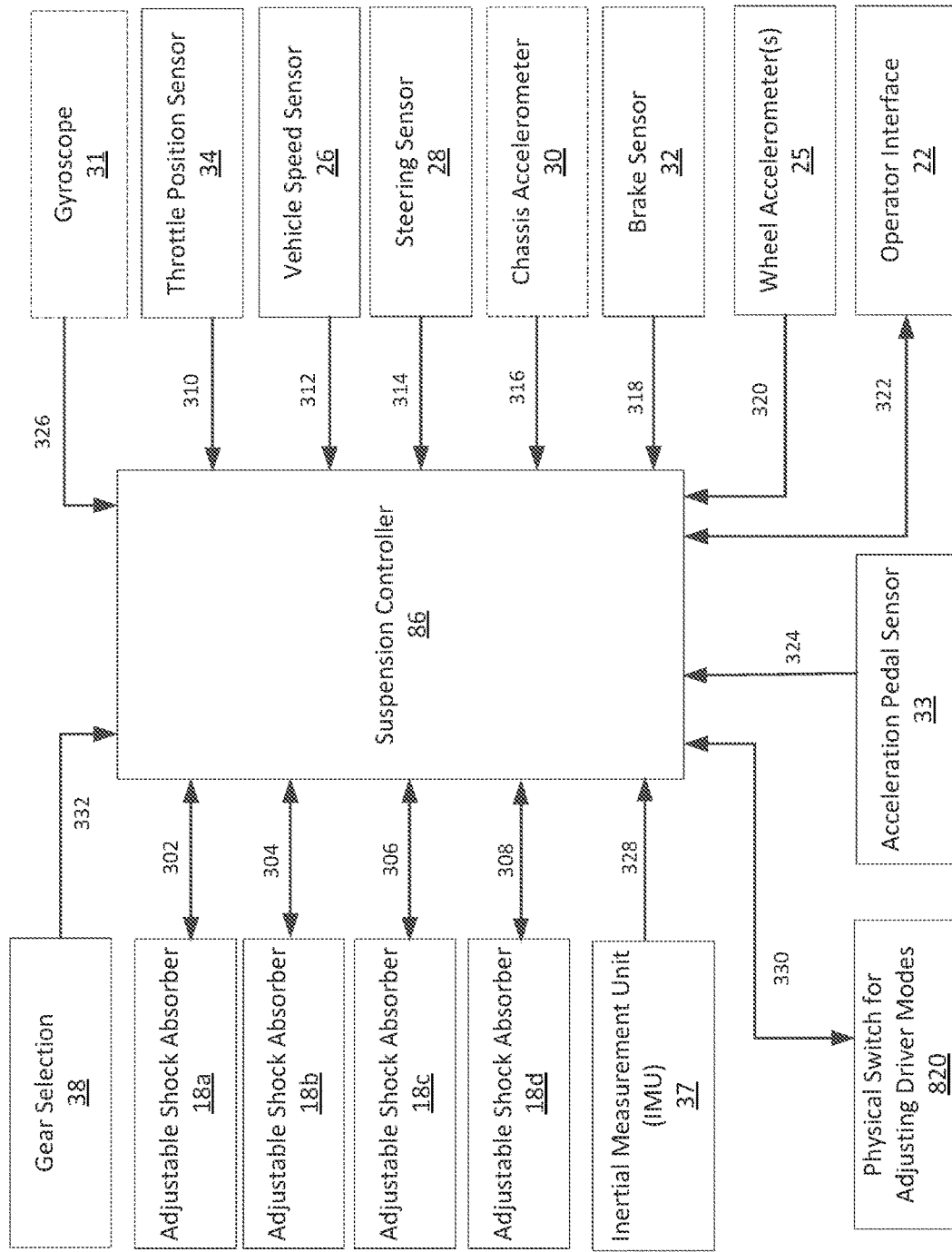
FIG. 10 shows an exemplary control system for controlling the damping of one or more shock absorbers.

In some examples and referring to FIG. 10, an IMU, such as the IMU 37 is supported on the chassis to provide indications of the inertial measurements, including the angular rate and/or the acceleration forces, of the vehicle 10 during operation. The IMU 37 may include the functionalities of the accelerometer 30 and/or the gyroscope 31. As such, in some instances, the accelerometer 30 and/or the gyroscope 31 are optional and might not be included in the vehicle 10. In other instances, the vehicle 10 may include the gyroscope 31 and the accelerometer 30 instead of the IMU 37.

The controller 20 may also communicate with additional vehicle condition sensors 40, such as a brake sensor 32, a throttle position sensor 34, a wheel speed sensor 36, and/or a gear selection sensor 38.

Figure 4:
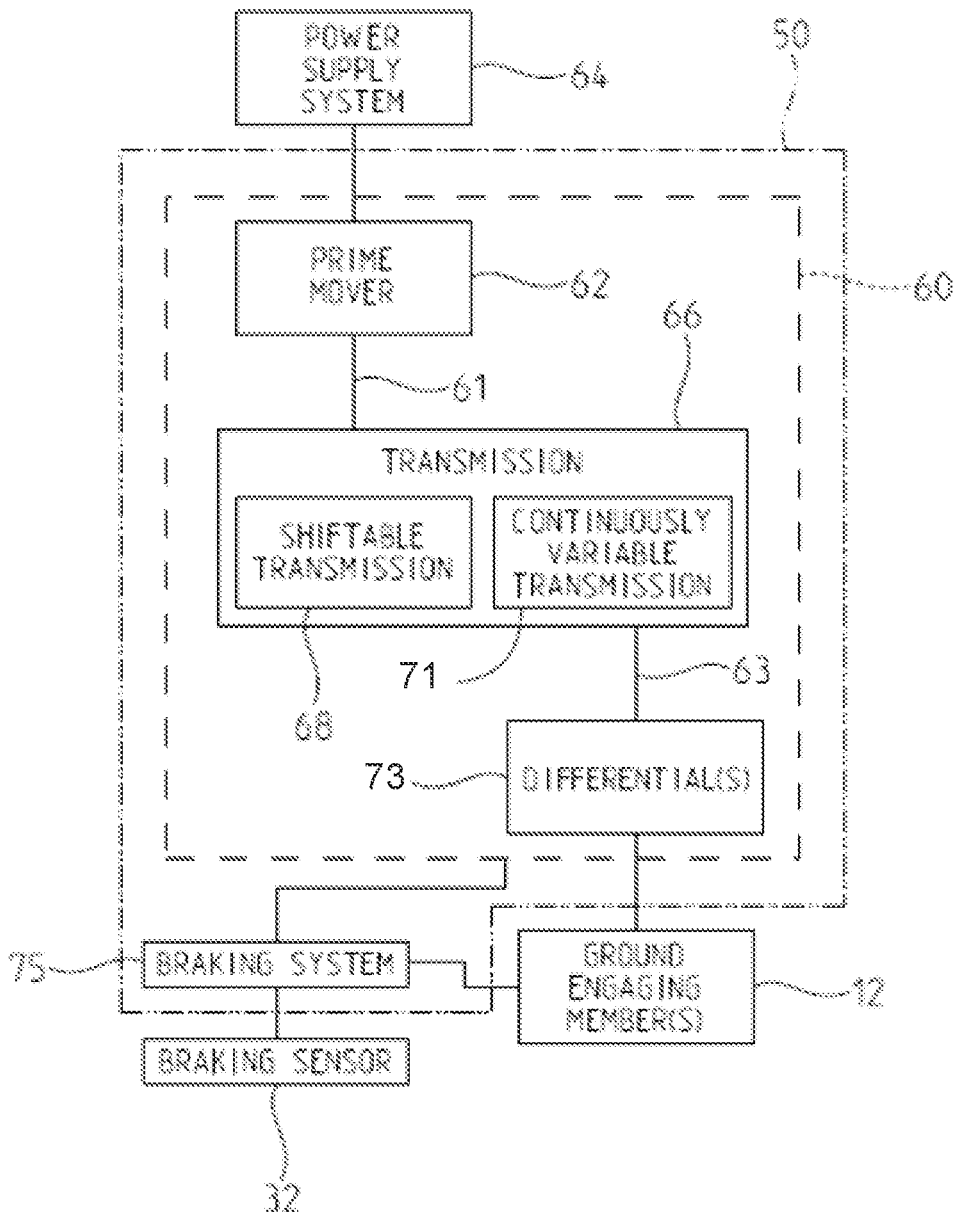
FIG. 4 shows a representative view of an exemplary power system for the vehicle of FIG. 1.

Referring to FIG. 4, one embodiment of a driveline torque management system 50 of vehicle 10 is illustrated. Driveline torque management system 50 controls the amount of torque exerted by each of ground engaging members 12. Driveline torque management system 50 provides a positive torque to one or more of ground engaging members 12 to power the movement of vehicle 10 through a power system 60. Driveline torque management system 50 further provides a negative torque to one or more of ground engaging members 12 to slow or stop a movement of vehicle 10 through a braking system 75. In one example, each of ground engaging members 12 has an associated brake of braking system 75.

Power system 60 includes a prime mover 62. Exemplary prime movers 62 include internal combustion engines, two stroke internal combustion engines, four stroke internal combustion engines, diesel engines, electric motors, hybrid engines, and other suitable sources of motive force. To start the prime mover 62, a power supply system 64 is provided. The type of power supply system 64 depends on the type of prime mover 62 used. In one embodiment, prime mover 62 is an internal combustion engine and power supply system 64 is one of a pull start system and an electric start system. In one embodiment, prime mover 62 is an electric motor and power supply system 64 is a switch system which electrically couples one or more batteries to the electric motor.

A transmission 66 is coupled to prime mover 62. Transmission 66 converts a rotational speed of an output shaft 61 of prime mover 62 to one of a faster rotational speed or a slower rotational speed of an output shaft 63 of transmission 66. It is contemplated that transmission 66 may additionally rotate output shaft 63 at the same speed as output shaft 61.

In the illustrated embodiment, transmission 66 includes a shiftable transmission 68 and a continuously variable transmission ("CVT") 71. In one example, an input member of CVT 71 is coupled to prime mover 62. An input member of shiftable transmission 68 is in turn coupled to an output member of CVT 71. In one embodiment, shiftable transmission 68 includes a forward high setting, a forward low setting, a neutral setting, a park setting, and a reverse setting. The power communicated from prime mover 62 to CVT 71 is provided to a drive member of CVT 71. The drive member in turn provides power to a driven member through a belt. Exemplary CVTs are disclosed in U.S. Pat. Nos. 3,861,229; 6,176,796; 6,120,399; 6,860,826; and 6,938,508, the disclosures of which are expressly incorporated by reference herein. The driven member provides power to an input shaft of shiftable transmission 68. Although transmission 66 is illustrated as including both shiftable transmission 68 and CVT 71, transmission 66 may include only one of shiftable transmission 68 and CVT 71. Further, transmission 66 may include one or more additional components.

Transmission 66 is further coupled to at least one differential 73 which is in turn coupled to at least one ground engaging members 12. Differential 73 may communicate the power from transmission 66 to one of ground engaging members 12 or multiple ground engaging members 12. In an ATV embodiment, one or both of a front differential and a rear differential are provided. The front differential powering at least one of two front wheels of the ATV and the rear differential powering at least one of two rear wheels of the ATV. In a side-by-side vehicle embodiment having seating for at least an operator and a passenger in a side-by-side configuration, one or both of a front differential and a rear differential are provided. The front differential powering at least one of two front wheels of the side-by-side vehicle and the rear differential powering at least one of multiple rear wheels of the side-by-side vehicle. In one example, the side-by-side vehicle has three axles and a differential is provided for each axle. An exemplary side-by-side vehicle 200 is illustrated in FIGS. 6-9.

In one embodiment, braking system 75 includes anti-lock brakes. In one embodiment, braking system 75 includes active descent control and/or engine braking. In one embodiment, braking system 75 includes a brake and in some embodiments a separate parking brake. Braking system 75 may be coupled to any of prime mover 62, transmission 66, differential 73, and ground engaging members 12 or the connecting drive members therebetween. Brake sensor 32, in one example, monitors when braking system 75 is applied. In one example, brake sensor 32 monitors when a user actuatable brake input, such as brake pedal 232 (see FIG. 7) in vehicle 200, is applied.

Figure 5:
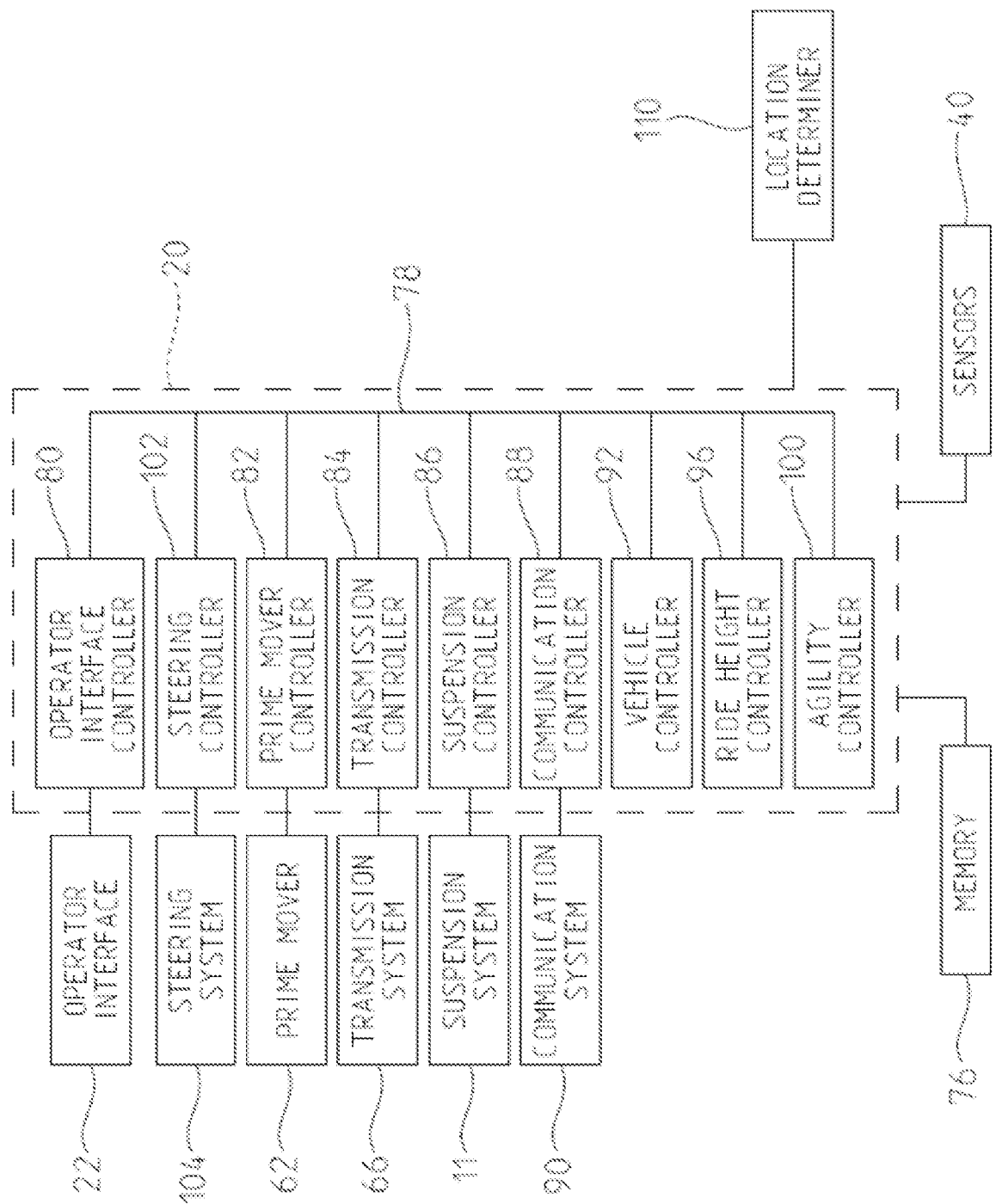
FIG. 5 shows a representative view of an exemplary controller of the vehicle of FIG. 1.

Referring to FIG. 5, controller 20 has at least one associated memory 76. Controller 20 provides the electronic control of the various components of vehicle 10. Further, controller 20 is operatively coupled to a plurality of vehicle condition sensors 40 as described above, which monitor various parameters of the vehicle 10 or the environment surrounding the vehicle 10. Controller 20 performs certain operations (e.g., provides commands) to control one or more subsystems of other vehicle components. In certain embodiments, the controller 20 forms a portion of a processing subsystem including one or more computing devices having memory, processing, and communication hardware. Controller 20 may be a single device or a distributed device, and the functions of the controller 20 may be performed by hardware and/or as computer instructions on a non-transitory computer readable storage medium, such as memory 76.

As illustrated in the embodiment of FIG. 5, controller 20 is represented as including several controllers. These controllers may each be single devices or distributed devices or one or more of these controllers may together be part of a single device or distributed device. The functions of these controllers may be performed by hardware and/or as computer instructions on a non-transitory computer readable storage medium, such as memory 76.

In one embodiment, controller 20 includes at least two separate controllers which communicate over a network 78. In one embodiment, network 78 is a CAN network. Details regarding an exemplary CAN network are disclosed in U.S. patent application Ser. No. 11/218,163, filed Sep. 1, 2005, the disclosure of which is expressly incorporated by reference herein. Of course any suitable type of network or data bus may be used in place of the CAN network. In one embodiment, two wire serial communication is used for some connections.

Referring to FIG. 5, controller 20 includes an operator interface controller 80 which controls communication with an operator through operator interface 22. A prime mover controller 82 controls the operation of prime mover 62. A transmission controller 84 controls the operation of transmission system 66.

A suspension controller 86 controls adjustable portions of suspension system 11. Exemplary adjustable components include adjustable shocks 18, adjustable springs 16, and/or configurable stabilizer bars. Additional details regarding adjustable shocks, adjustable springs, and configurable stabilizer bars is provided in US Published Patent Application No. 2016/0059660, filed Nov. 6, 2015, titled VEHICLE HAVING SUSPENSION WITH CONTINUOUS DAMPING CONTROL, assigned to the present assignee, the entire disclosure of which is expressly incorporated by reference herein.

Communication controller 88 controls communications between a communication system 90 of vehicle 10 and remote devices, such as other vehicles, personal computing devices, such as cellphones or tablets, a centralized computer system maintaining one or more databases, and other types of devices remote from vehicle 10 or carried by riders of vehicle 10. In one embodiment, communication controller 88 of vehicle 10 communicates with paired devices over a wireless network. An exemplary wireless network is a radio frequency network utilizing a BLUETOOTH protocol. In this example, communication system 90 includes a radio frequency antenna. Communication controller 88 controls the pairing of devices to vehicle 10 and the communications between vehicle 10 and the remote device. In one embodiment, communication controller 88 of vehicle 10 communicates with remote devices over a cellular network. In this example, communication system 90 includes a cellular antenna and communication controller 88 receives and sends cellular messages from and to the cellular network. In one embodiment, communication controller 88 of vehicle 10 communicates with remote devices over a satellite network. In this example, communication system 90 includes a satellite antenna and communication controller 88 receives and sends messages from and to the satellite network. In one embodiment, vehicle 10 is able to communicate with other vehicles 10 over a Radio Frequency mesh network and communication controller 88 and communication system 90 are configured to enable communication over the mesh network. An exemplary vehicle communication system is disclosed in U.S. patent application Ser. No. 15/262,113, filed Sep. 12, 2016, titled VEHICLE TO VEHICLE COMMUNICATIONS DEVICE AND METHODS FOR RECREATIONAL VEHICLES, the entire disclosure of which is expressly incorporated by reference herein.

A steering controller 102 controls portions of a steering system 104. In one embodiment, steering system 104 is a power steering system and includes one or more steering sensors 28 (shown in FIG. 1). Exemplary sensors and electronic power steering units are provided in U.S. patent application Ser. No. 12/135,107, assigned to the assignee of the present application, titled VEHICLE, the disclosure of which is expressly incorporated by reference herein. A vehicle controller 92 controls lights, loads, accessories, chassis level functions, and other vehicle functions. A ride height controller 96 controls the preload and operational height of the vehicle. In one embodiment, ride height controller controls springs 16 to adjust a ride height of vehicle 10, either directly or through suspension controller 86. In one example, ride height controller 96 provides more ground clearance in a comfort ride mode compared to a sport ride mode.

An agility controller 100 controls a braking system of vehicle 10 and the stability of vehicle 10. Control methods of agility controller 100 may include integration into braking circuits (ABS) such that a stability control system can improve dynamic response (vehicle handling and stability) by modifying the shock damping in conjunction with electronic braking control.

In one embodiment, controller 20 either includes a location determiner 110 and/or communicates via network 78 to a location determiner 110. The location determiner 110 determines a current geographical location of vehicle 10. An exemplary location determiner 110 is a GPS unit which determines the position of vehicle 10 based on interaction with a global satellite system.

Referring to FIGS. 6-9, an exemplary side-by-side vehicle 200 is illustrated. Vehicle 200, as illustrated, includes a plurality of ground engaging members 12. Illustratively, ground engaging members 12 are wheels 204 and associated tires 206. As mentioned herein, one or more of ground engaging members 12 are operatively coupled to power system 60 (see FIG. 4) to power the movement of vehicle 200 and braking system 75 to slow movement of vehicle 200.

Figure 6:
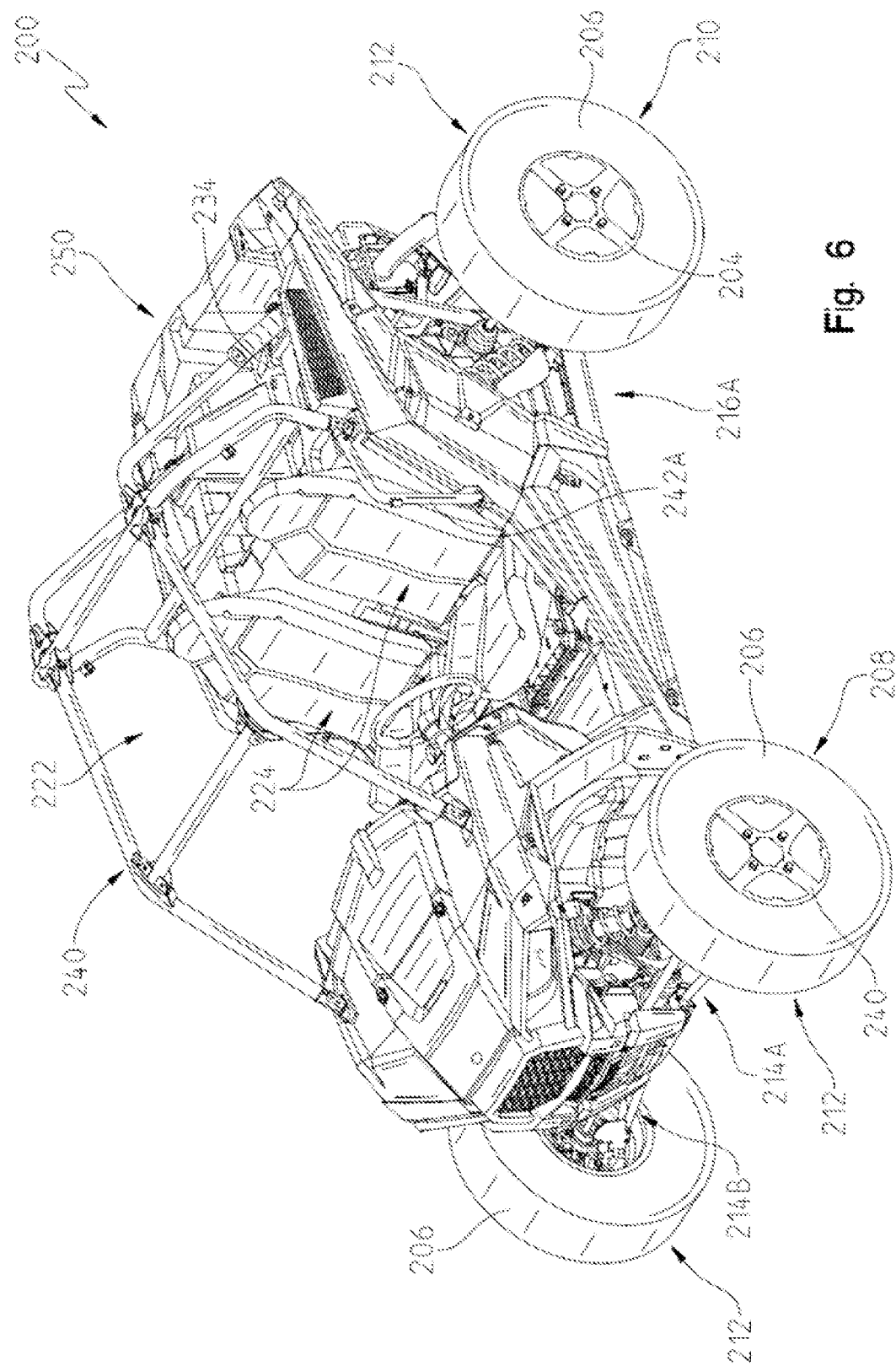
FIG. 6 shows a first, perspective view of an exemplary vehicle.
Figure 7:
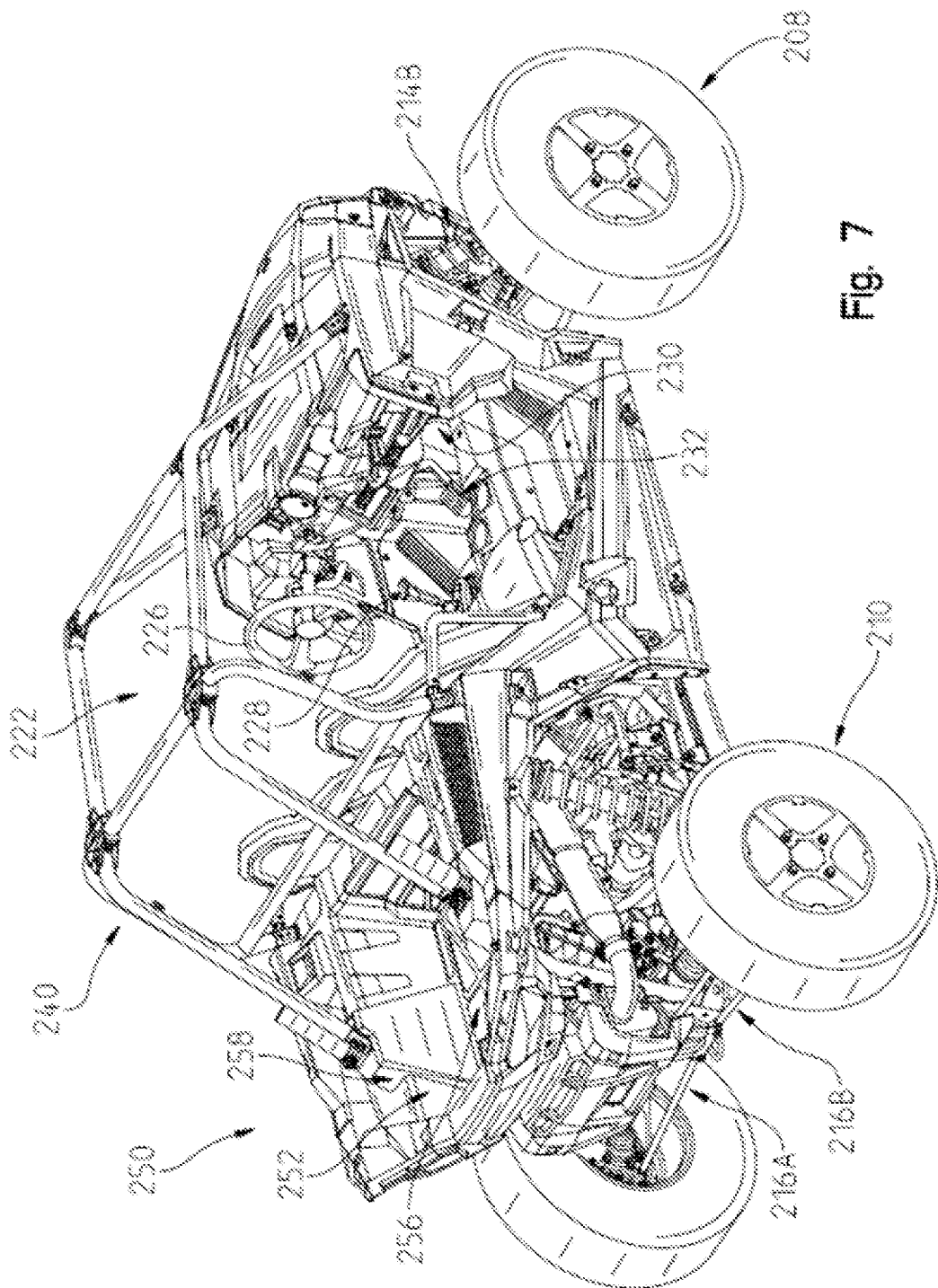
FIG. 7 shows a second, perspective view of the exemplary vehicle of FIG. 6.
Figure 8:
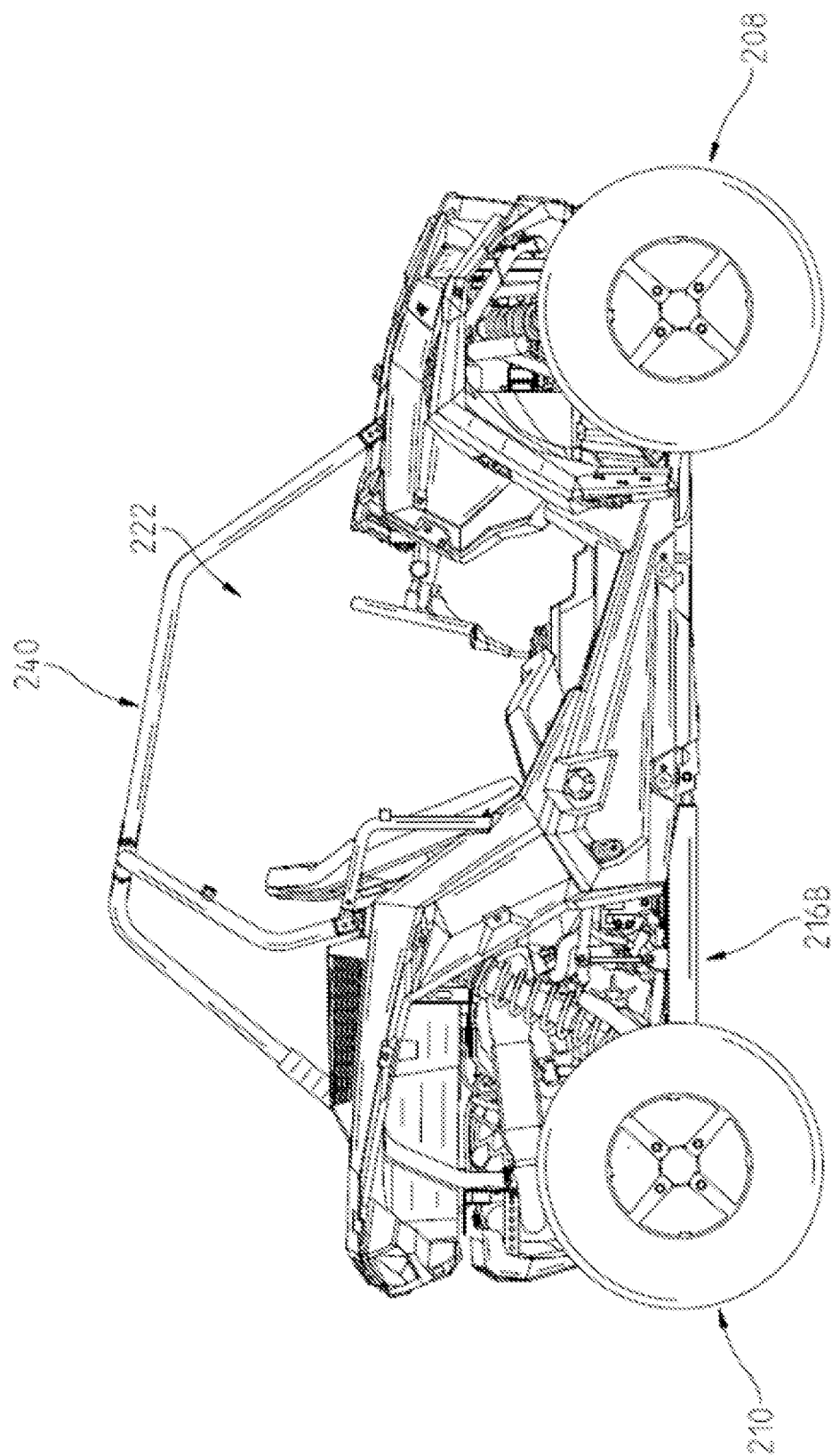
FIG. 8 shows a side view of the exemplary vehicle of FIG. 6.

Referring to the illustrated embodiment in FIG. 6, a first set of wheels, one on each side of vehicle 200, generally correspond to a front axle 208. A second set of wheels, one on each side of vehicle 200, generally correspond to a rear axle 210. Although each of front axle 208 and rear axle 210 are shown having a single ground engaging member 12 on each side, multiple ground engaging members 12 may be included on each side of the respective front axle 208 and rear axle 210. As configured in FIG. 6, vehicle 200 is a four wheel, two axle vehicle.

Figure 9:
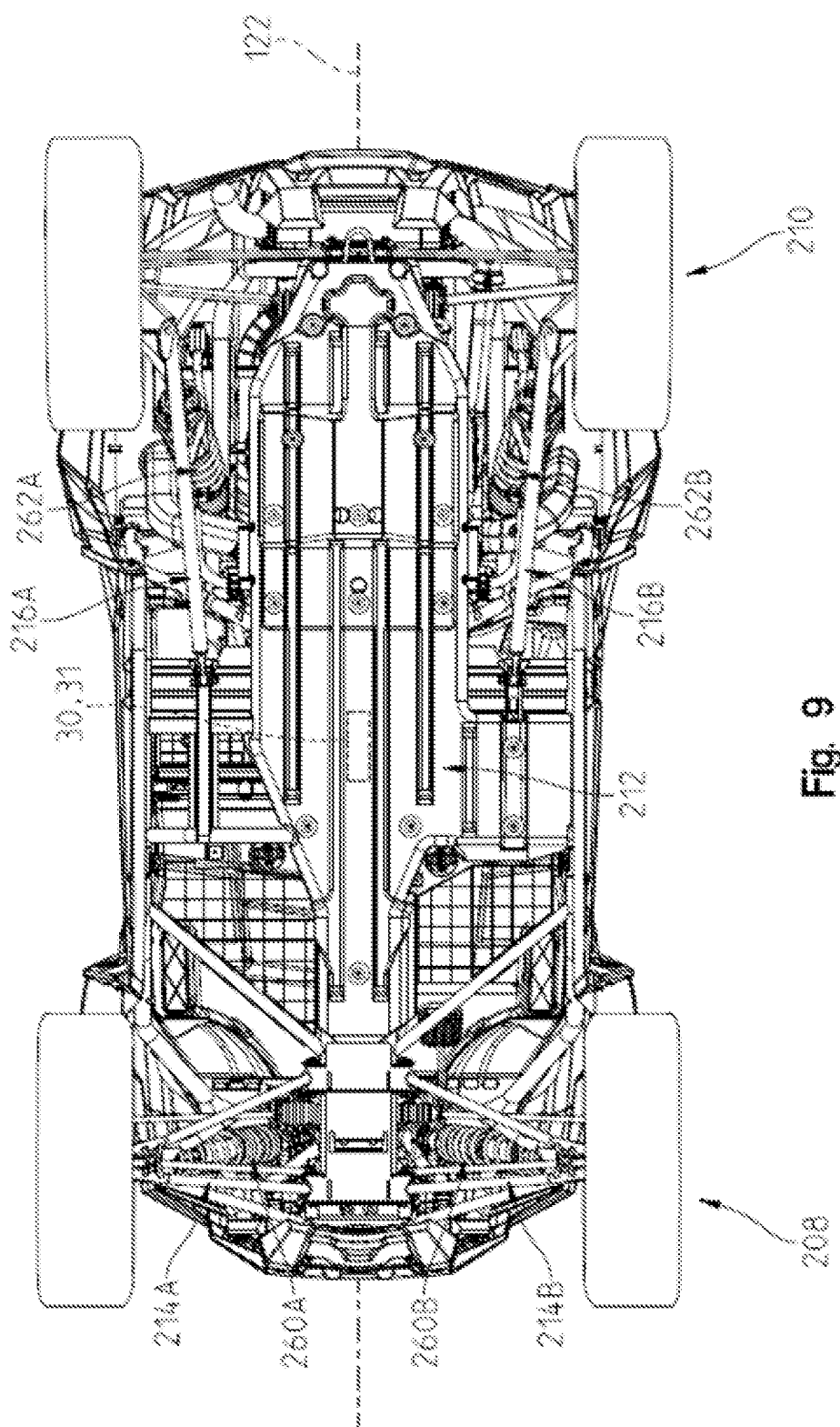
FIG. 9 shows a bottom view of the exemplary vehicle of FIG. 6.

Referring to FIG. 9, wheels 204 of front axle 208 are coupled to a frame 212 of vehicle 200 through front independent suspensions 214. Front independent suspensions 214 in the illustrated embodiment are double A-arm suspensions. Other types of suspensions systems may be used for front independent suspensions 214. The wheels 204 of rear axle 210 are coupled to frame 212 of vehicle 200 through rear independent suspensions 216. Other types of suspensions systems may be used for rear independent suspensions 216.

Returning to FIG. 6, vehicle 200 includes a cargo carrying portion 250. Cargo carrying portion 250 is positioned rearward of an operator area 222. Operator area 222 includes seating 224 and a plurality of operator controls. In the illustrated embodiment, seating 224 includes a pair of bucket seats. In one embodiment, seating 224 is a bench seat. In one embodiment, seating 224 includes multiple rows of seats, either bucket seats or bench seats or a combination thereof. Exemplary operator controls include a steering wheel 226, a gear selector 228, an accelerator pedal 230 (see FIG. 7), and a brake pedal 232 (see FIG. 7). Steering wheel 226 is operatively coupled to the wheels of front axle 208 to control the orientation of the wheels relative to frame 212. Gear selector 228 is operatively coupled to the shiftable transmission 68 to select a gear of the shiftable transmission 68. Exemplary gears include one or more forward gears, one or more reverse gears, and a park setting. Accelerator pedal 230 is operatively coupled to prime mover 62 to control the speed of vehicle 200. Brake pedal 232 is operatively coupled to brake units associated with one or more of wheels 204 to slow the speed of vehicle 200.

Operator area 222 is protected with a roll cage 240. Referring to FIG. 6, side protection members 242 are provided on both the operator side of vehicle 200 and the passenger side of vehicle 200. In the illustrated embodiment, side protection members 262 are each a unitary tubular member.

In the illustrated embodiment, cargo carrying portion 250 includes a cargo bed 234 having a floor 256 and a plurality of upstanding walls. Floor 256 may be flat, contoured, and/or comprised of several sections. Portions of cargo carrying portion 250 also include mounts 258 which receive an expansion retainer (not shown). The expansion retainers which may couple various accessories to cargo carrying portion 250. Additional details of such mounts and expansion retainers are provided in U.S. Pat. No. 7,055,454, to Whiting et al., filed Jul. 13, 2004, titled "Vehicle Expansion Retainers," the entire disclosure of which is expressly incorporated by reference herein.

Front suspensions 214A and 214B each include a shock absorber 260, respectively. Similarly, rear suspensions 216A and 216B each include a shock absorber 262. In one embodiment each of shock absorbers 260 and shock absorbers 262 are electronically adjustable shocks 18 which are controlled by a controller 20 of vehicle 200.

Additional details regarding vehicle 200 are provided in U.S. Pat. Nos. 8,827,019 and 9,211,924, assigned to the present assignee, the entire disclosures of which are expressly incorporated by reference herein. Other exemplary recreational vehicles include ATVs, utility vehicles, snowmobiles, other recreational vehicles designed for off-road use, on-road motorcycles, and other suitable vehicles (e.g., FIG. 31).

FIG. 10 shows an exemplary control system 300 for controlling the damping of shock absorbers 18. In some instances, the control system 300 may be included in the vehicle 10 and/or the vehicle 200 described above. For example, the suspension controller 86 may communicate with (e.g., receive and/or provide) one or more entities (e.g., sensors, devices, controllers, and/or subsystems) from the vehicle 10 and/or 200 described above. Additionally, and/or alternatively, the vehicle 10 and 200 may be the same vehicle (e.g., the vehicle 200 may include entities from vehicle 10, such as the suspension controller 86).

Additionally, the controller 20 may include a suspension controller 86 as described above in FIG. 5. The suspension controller 86 may communicate with the plurality of vehicle condition sensors 40 as described above. Further, the suspension controller 86 may provide information (e.g., one or more commands) to each of the adjustable shock absorbers 18a, 18b, 18c, and 18d. For example, the suspension controller 86 may provide commands to adjust the compression damping characteristic and/or the rebound damping characteristic for the adjustable shock absorbers 18a, 18b, 18c, and 18d.

While exemplary sensors, devices, controllers, and/or subsystems are provided in FIG. 10, additional exemplary sensors, devices, controllers, and/or subsystems used by the suspension controller 86 to adjust shock absorbers 18 are provided in US Published Patent Application No. 2016/0059660 (filed Nov. 6, 2015, titled VEHICLE HAVING SUSPENSION WITH CONTINUOUS DAMPING CONTROL) and US Published Application 2018/0141543 (filed Nov. 17, 2017, titled VEHICLE HAVING ADJUSTABLE SUSPENSION), both assigned to the present assignee and the entire disclosures of each expressly incorporated by reference herein.

The illustrative control system 300 is not intended to suggest any limitation as to the scope of use or functionality of embodiments of the present disclosure. Neither should the illustrative control system 300 be interpreted as having any dependency or requirement related to any single entity or combination of entities illustrated therein. Additionally, various entities depicted in FIG. 10, in embodiments, may be integrated with various ones of the other entities depicted therein (and/or entities not illustrated). For example, the suspension controller 86 may be included within the controller 20, and may communicate with one or more vehicle condition sensors 40 as described above. The functionalities of the suspension controller 86 and/or other entities in control system 300 will be described below.

Cornering Event and Braking Event

Figure 11:
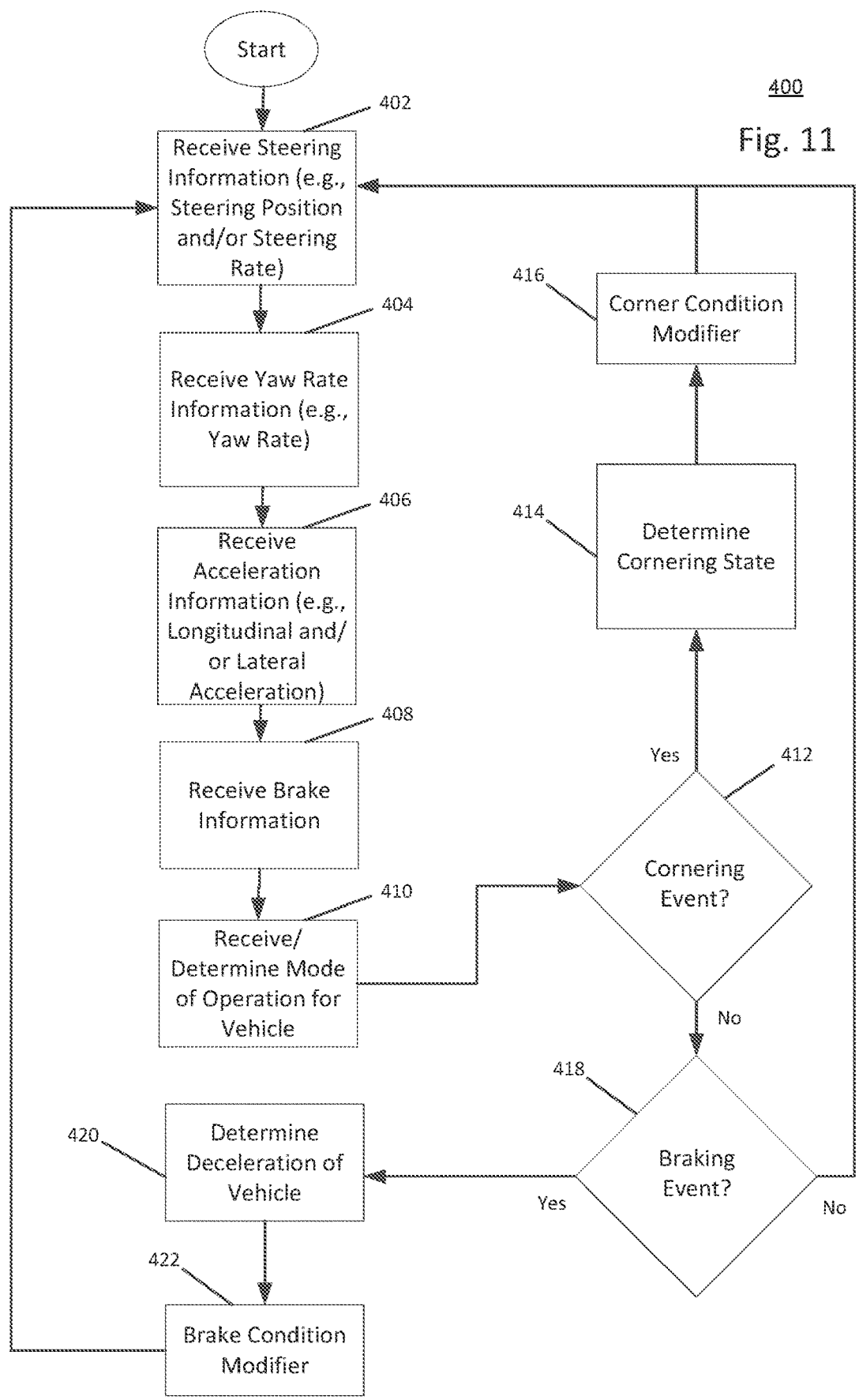
FIG. 11 shows an exemplary flowchart describing the operation of the suspension controller during a cornering event and/or a braking event.
Figure 12:
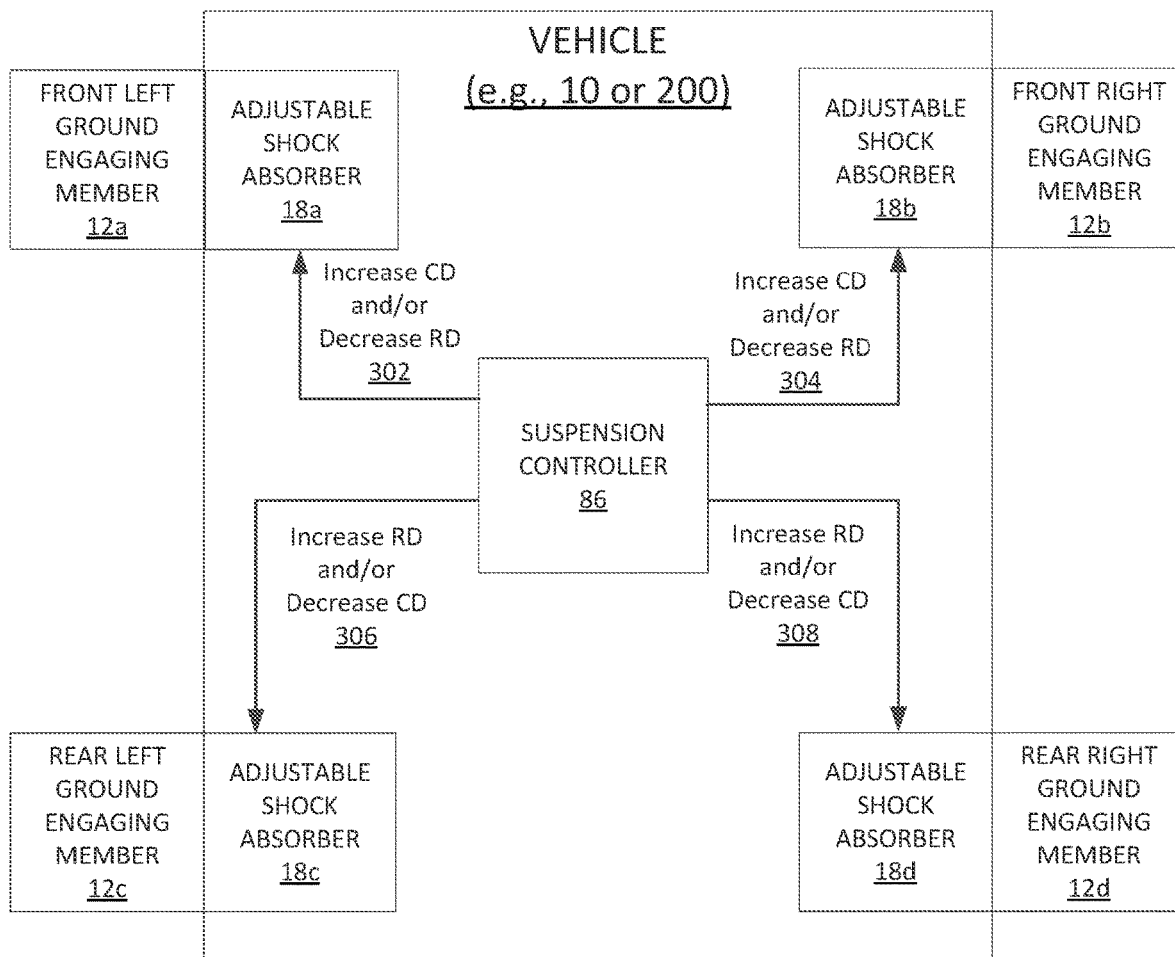
FIG. 12 shows an example of the suspension controller adjusting the adjustable shock absorbers for the vehicle during a braking event.
Figure 13:
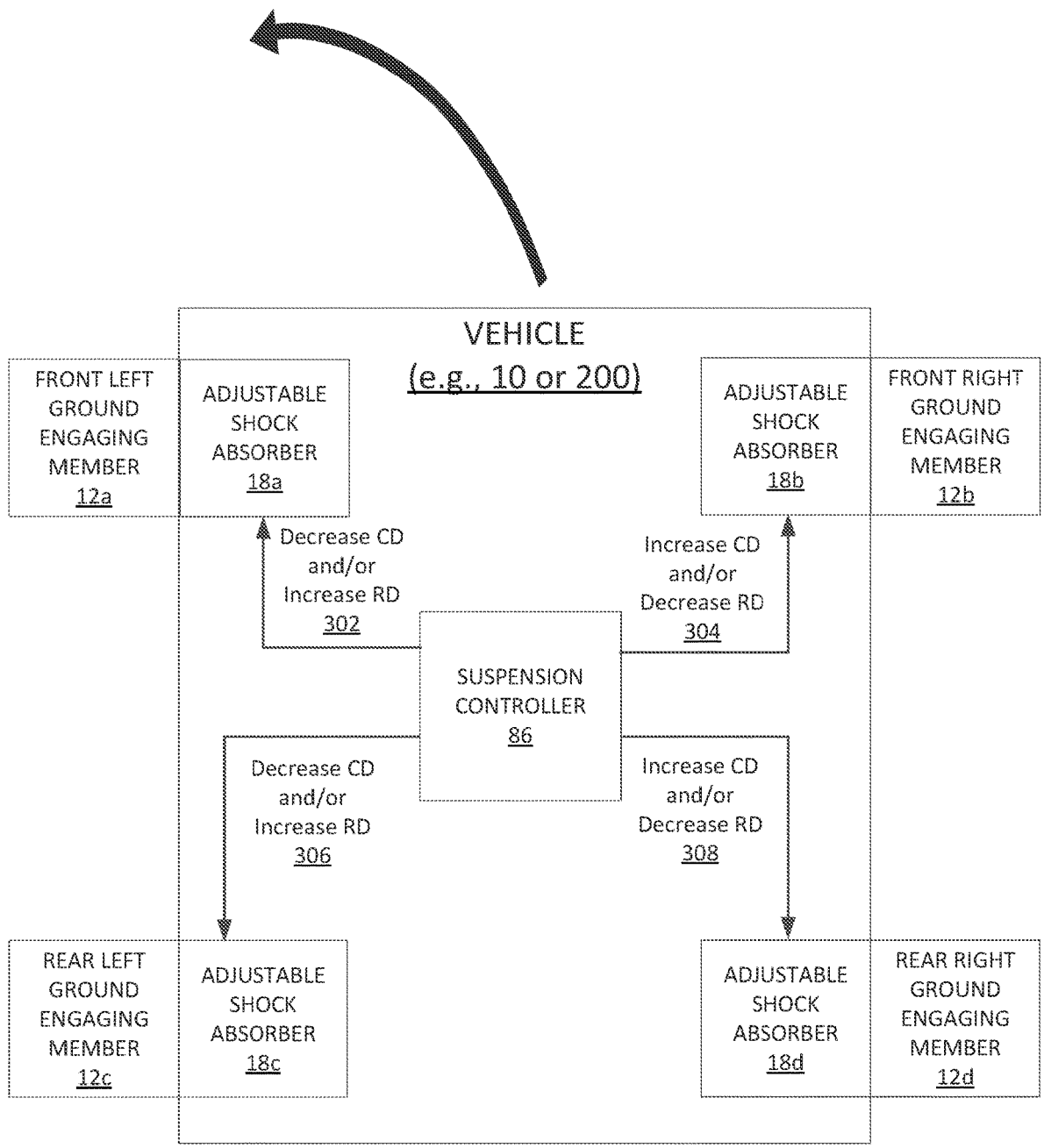
FIG. 13 shows an example of the suspension controller adjusting the adjustable shock absorbers for the vehicle during a cornering event.

FIG. 11 shows an example flowchart describing the operation of the suspension controller 86 during a cornering event and/or a braking event. FIGS. 12 and 13 show examples of the suspension controller 86 adjusting the shock absorbers 18 for the vehicle 10 during a cornering event and/or braking event. As will be described in more detail below, for better performance during a braking and/or cornering event, a vehicle, such as vehicle 10, may use a controller 20 (e.g., the suspension controller 86) to adjust the rebound and/or compression damping. For instance, during a cornering event, the suspension controller 86 may reduce (e.g., decrease) the compression damping of the inner adjustable shock absorbers 18, which may cause the vehicle 10 to ride lower during cornering and/or to be less upset when the inner ground engaging members 12 encounter bumps. Further, the suspension controller 86 may reduce the rebound damping of the outside adjustable shock absorbers 18, which may promote shock extensions to flatten the vehicle 10 and/or cause the wheels of the vehicle 10 to follow the ground better to provide better traction. Additionally, and/or alternatively, the suspension controller 86 may increase the compression damping of the outside adjustable shocks 18 and/or increase the rebound damping of the inside adjustable shock absorbers 18.

During a braking event, the suspension controller 86 may reduce the compression damping for the rear adjustable shock absorbers 18 based on a deceleration rate (e.g., deceleration value), which may cause increased stability of the vehicle 10 during bumps and/or rough trails. Further, by reducing the compression damping for the rear adjustable shock absorbers 18, the suspension controller 86 may cause the rear ground engaging members 12 to absorb events, such as bumps, better. Also, the suspension controller 86 may also reduce the rebound damping for the front adjustable shock absorbers 18, which may promote shock extensions to flatten the vehicle 10 and/or cause the wheels of the vehicle 10 to follow the ground better to provide better traction. Additionally, and/or alternatively, the suspension controller 86 may increase the compression damping of the front adjustable shocks 18 and/or increase the rebound damping of the rear adjustable shock absorbers 18. By increasing the rebound damping of the rear adjustable shock absorbers 18, the vehicle 10 may be better able to control the pitch body movement and/or weight transfer during a braking event. Further, the suspension controller 86 may hold the vehicle 10 flatter and/or more stable when the vehicle 10 encounters bumps while braking.

In operation, at step 402, the suspension controller 86 may receive steering information from one or more sensors, such as the steering sensor 28. The steering information may indicate a steering position, steering angle, and/or steering rate of a steering wheel, such as steering wheel 226. The steering position and/or angle may indicate a position and/or an angle of the steering wheel for the vehicle 10. The steering rate may indicate a change of the position and/or angle of the steering wheel over a period of time.

At step 404, the suspension controller 86 may receive yaw rate information from one or more sensors, such as the gyroscope 31 and/or the IMU 37. The yaw information indicates the yaw rate of the vehicle 10.

At step 406, the suspension controller 86 may receive acceleration information indicating an acceleration rate or deceleration rate of the vehicle 10 from one or more sensors, such as the IMU 37 and/or the chassis accelerometer 30. The acceleration information may indicate multi-axis acceleration values of the vehicle, such as a longitudinal acceleration and/or a lateral acceleration. In some examples, the suspension controller 86 may receive information from another sensor, such as the throttle position sensor 34 and/or the accelerator pedal sensor 33. The suspension controller 86 use the information to determine the acceleration rate. For example, the suspension controller 86 may use the throttle position from the throttle position sensor and/or the position of the accelerator pedal 230 from the acceleration pedal sensor 33 to determine whether the vehicle 10 is accelerating and/or decelerating.

At step 408, the suspension controller 86 may receive brake information from a sensor, such as the brake sensor 32. The brake information may indicate a position (e.g., braking and/or not braking) of the brake pedal 232. Additionally, and/or alternatively, the brake information may indicate an amount of brake pressure on the brake pedal 232.

At step 410, the suspension controller 86 may receive an operating mode of the vehicle 10 from the operator interface 22 and/or one or more other controllers (e.g., controller 20). Each mode may include a different setting for the rebound and/or compression damping. An operator (e.g., user) may input a mode of operation on the operator interface 22. The operator interface 22 may provide the user input indicating the mode of operation to the controller 20 and/or the suspension controller 86. The suspension controller 86 may use the user input to determine the mode of operation for the vehicle 10.

At step 412, the suspension controller 86 may determine whether a cornering event (e.g., a turn) is occurring. Further, the suspension controller 86 may determine a direction of the turn (e.g., a left turn or a right turn). For example, the suspension controller 86 may determine the cornering event and/or direction of the turn based on the steering information indicating a steering rate, angle, and/or position, yaw rate information indicating a yaw rate, and/or the acceleration information indicating a lateral acceleration. The suspension controller 86 may compare the steering rate, steering angle, steering position, yaw rate, and/or lateral acceleration with one or more corresponding thresholds (e.g., pre-determined, pre-programmed, and/or user-defined) to determine the cornering event. The suspension controller 86 may use the positive and/or negative values of the steering rate, angle, position, yaw rate, and/or lateral acceleration to determine the direction of the turn.

In some examples, the suspension controller 86 may determine the cornering event based on the steering rate, angle, and/or position being greater than a threshold. In such examples, the method 400 may move to step 414. Otherwise, if the suspension controller 86 determines that the steering rate, angle and/or position is below the threshold, the method 400 may move to step 418. In some variations, the suspension controller 86 may determine the cornering event based on the yaw rate. For example, based on the yaw rate being greater than a threshold, the suspension controller 86 may determine a cornering event is occurring. In some instances, the suspension controller 86 may determine the cornering event based on a lateral acceleration. For example, based on the lateral acceleration being greater than a threshold, the suspension controller 86 may determine that a cornering event is occurring.

In some variations, the suspension controller 86 may prioritize the steering information, the yaw rate information, and/or the acceleration information, and determine the cornering event based on the priorities. For instance, in some examples, the steering position and/or angle, steering rate, yaw rate, and lateral acceleration may all indicate a turn. In other examples, the steering position and/or angle, steering rate, yaw rate, and/or lateral acceleration may conflict (e.g., the steering position might not indicate a turn and the yaw rate may indicate a turn; the yaw rate might not indicate a turn and the lateral acceleration may indicate a turn). For example, in a counter steer or a slide, the vehicle 10 may be turning in one direction, such as a left turn (e.g., indicated by a yaw rate and/or lateral acceleration); however, the steering position may indicate a turn in the opposite direction, such as a right turn, or might not indicate a turn. In such examples, the suspension controller 86 may prioritize the lateral acceleration and/or the yaw rate over the steering rate, angle, and/or position. For example, the suspension controller 86 may determine the vehicle 10 is turning and the turn is a left turn.

In some variations, the suspension controller 86 may prioritize the lateral acceleration over the yaw rate and the yaw rate over the steering rate, angle, and/or position. In other words, the suspension controller 86 may determine the cornering event is occurring and/or a direction of turn based on the lateral acceleration indicating a turn even if the yaw rate, steering rate, angle, and/or position do not indicate a turn. Further, the suspension controller 86 may determine the cornering event is occurring and/or a direction of turn based on the yaw rate indicating a turn even if the steering rate, angle, and/or position do not indicate a turn.

At step 414, the suspension controller 86 may determine a cornering state of the vehicle 10. The cornering state may indicate whether the vehicle 10 is entering, in the middle of, and/or exiting a corner event. Additionally, and/or alternatively, the cornering state may indicate whether the vehicle 10 is braking, accelerating, and/or decelerating through the cornering event. For example, the suspension controller 86 may determine the cornering state based on the acceleration information (e.g., the longitudinal acceleration) and/or the brake information (e.g., the position of the brake pedal 232 and/or amount of pressure on the brake pedal 232). As will be explained below, the suspension controller 86 may adjust and/or bias the adjustable shock absorbers 18 based on the cornering event, the braking of the vehicle 10, and/or the acceleration/deceleration of the vehicle 10.

At step 416, the suspension controller 86 may execute a corner condition modifier for one or more of the adjustable shock absorbers 18. For example, the suspension controller 86 may adjust (e.g., increase and/or decrease) the rebound and/or compression damping for one or more of the adjustable shock absorbers 18 based on detecting a cornering event (e.g., from step 412 indicating that the vehicle 10 is turning). FIG. 13 shows the suspension of the vehicle 10 during a cornering event. For example, in response to detecting the cornering event, the suspension controller 86 may provide information (e.g., one or more commands) to the adjustable shock absorbers 18. For instance, the suspension controller 86 may determine that the vehicle 10 is turning left (e.g., based on the steering position or rate, yaw rate, and/or lateral acceleration). In response, the suspension controller 86 may provide information 302 and/or 306 to the inner adjustable shock absorbers 18a and/or 18c to decrease the compression damping (CD) and/or increase the rebound damping (RD). By decreasing the compression damping of the inner adjustable shock absorbers 18a and/or 18c, the vehicle 10 may absorb bumps on that side better and/or be more stable when cornering in rough terrain. Further, the vehicle 10 may sit lower when cornering because the inside will move through the compression stroke easier when the vehicle is "on the sway bar" torsion. Additionally, by increasing the rebound on the inside adjustable shock absorbers 18a and/or 18c, the vehicle 10 may control the roll gradient and/or rate during the cornering event. Also, the suspension controller 86 may provide information 304 and/or 308 to the outer adjustable shock absorbers 18b and/or 18d to increase the compression damping (CD) and/or decrease the rebound damping (RD). After the suspension controller 86 determines and/or executes a corner condition modifier, the method 400 may move back to step 402 and repeat continuously.

In some variations, during the cornering event, the suspension controller 86 may adjust (e.g., increase and/or decrease) the rebound and/or compression damping for one or more of the adjustable shock absorbers 18 based on the cornering state (e.g., the braking of the vehicle 10 and/or the acceleration/deceleration of the vehicle 10). For example, during a cornering event, the suspension controller 86 may adjust the compression and/or rebound damping for the inner and/or outer adjustable shock absorbers 18 as described above. Additionally, and/or alternatively, based on the braking, acceleration, and/or deceleration rate, the suspension controller 86 may further bias (e.g., further increase by a value or percentage and/or further decrease by a value or percentage) the compression damping and/or rebound damping for the front and rear adjustable shock absorbers 18. By biasing the compression and/or rebound damping, the vehicle 10 may improve weight transfer on a corner entry and exit and may also improve the vehicle yaw response.

In other words, in response to detecting the cornering event, the suspension controller 86 may adjust the inner/outer adjustable shock absorbers 18 as described above. Then, based on the vehicle 10 slowing down, the suspension controller 86 may detect and/or determine a longitudinal deceleration (e.g., negative longitudinal acceleration) of the vehicle. Based on detecting the longitudinal deceleration, the suspension controller 86 may further bias (e.g., change and/or determine) the compression and/or rebound damping for the front/rear shock absorbers 18. For example, based on the longitudinal deceleration, the suspension controller 86 may additionally increase (e.g., increase by a percentage or a value) the compression damping of the front adjustable shock absorbers 18a and 18b and/or additionally decrease (e.g., decrease by a percentage or a value) the compression damping of rear adjustable shock absorbers 18c and 18d. Further, the suspension controller 86 may additionally increase the rebound damping of the rear shock absorbers 18c and 18d and/or additionally decrease the rebound damping of the front shock absorbers 18a and 18b.

For instance, the suspension controller 86 may adjust the compression and/or rebound damping for a shock absorber 18 based on whether the shock absorber is an inner or outer shock absorber as described above (e.g., set the compression damping at a value of 73). Then, based on the cornering state (e.g., a positive/negative longitudinal acceleration), the suspension controller 86 may further bias the compression and/or rebound damping. For example, the suspension controller 86 may decrease the front compression damping (e.g., set the compression damping from 73 to 62) if the suspension controller 86 detects a positive acceleration and increase the front compression damping (e.g., set the compression damping from 73 to 80) if the suspension controller 86 detects a negative acceleration. The suspension controller 86 may operate similarly for rebound damping.

Additionally, and/or alternatively, the suspension controller 86 may bias the compression and/or rebound damping differently based on the positive/negative longitudinal acceleration being greater than or less than one or more thresholds. For example, if acceleration is greater than a first threshold, then the suspension controller 86 may set the compression damping from a first value (e.g., 73) to a second value (e.g., 62). If acceleration is greater than a second threshold, then the suspension controller 86 may set the compression damping from the first value (e.g., 73) to a third value (e.g., 59). Additionally, and/or alternatively, if acceleration is greater than a third threshold, then the suspension controller 86 may set the compression damping from the first value (e.g., 73) to a fourth value (44). The suspension controller 86 may operate similarly for negative accelerations and/or braking as well.

At the end of the cornering event (e.g., a turn exit), the vehicle 10 may speed up (e.g., an operator may actuate the accelerator pedal 230). Based on detecting a positive acceleration (e.g., a longitudinal acceleration), the suspension controller 86 may further bias the front/rear shock absorbers 18. For example, based on the positive longitudinal acceleration, the suspension controller 86 may additionally increase the compression damping of rear adjustable shock absorbers 18c and 18d and/or additionally decrease the compression damping of the front adjustable shock absorbers 18a and 18b. Further, the suspension controller 86 may additionally increase the rebound damping of the front shock absorbers 18a and 18b and/or additionally decrease rebound damping of the rear shock absorbers 18c and 18d. After the executing the corner condition modifier, the method 400 may move back to step 402.

If the suspension controller 86 does not detect a cornering event, the method 400 may move to step 418. At step 418, the suspension controller 86 may determine whether a braking event is occurring. For example, the suspension controller 86 may determine whether the brake pedal 232 is actuated. In other words, the suspension controller 86 may determine or detect a braking event (e.g., whether the vehicle 10 is braking). If the suspension controller 86 determines that the brake pedal 232 is not actuated, the method 400 moves back to 402 and then repeats. If the suspension controller 86 determines that the brake pedal 232 is actuated, the method 400 moves to step 410.

At step 420, the suspension controller 86 may determine the deceleration rate of the vehicle 10 (e.g., two tenths of a gravitational constant (G) or half of a G). For example, the suspension controller 86 may determine the deceleration rate of the vehicle 10 from the chassis accelerometer 30 and/or the IMU 37. Additionally, and/or alternatively, the suspension controller 86 may determine and/or predict the deceleration rate of the vehicle 10 based on the amount of brake pressure on the brake pedal 232. As mentioned above, the brake sensor 32 may provide the amount of brake pressure on the brake pedal 232 to the suspension controller 86. Additionally, and/or alternatively, the suspension controller 86 may determine and/or predict the deceleration rate of the vehicle 10 based on an engine torque reduction from an engine torque sensor.

At step 422, the suspension controller 86 may execute a brake condition modifier for one or more of the adjustable shock absorbers 18. For example, the suspension controller 86 may adjust (e.g., increase and/or decrease) the rebound and/or compression damping for one or more of the adjustable shock absorbers 18 based on detecting a braking event (e.g., from step 408 indicating that the brake pedal has been actuated). FIG. 12 shows the suspension of the vehicle 10 during a braking event. For example, in response to detecting the braking event, the suspension controller 86 may provide information (e.g., one or more commands) to the adjustable shock absorbers 18 during the braking event. For instance, the suspension controller 86 may provide information 302 and/or 304 to the front adjustable shock absorbers 18*a* and/or 18*b* to increase the compression damping (CD) and decrease the rebound damping (RD). Further, the suspension controller 86 may provide information 306 and/or 308 to the rear adjustable shock absorbers 18*c* and/or 18*d* to increase the rebound damping (RD) and decrease the compression damping (CD). After the suspension controller 86 determines and/or executes a brake condition modifier, the method 400 may move back to step 402 and repeat continuously.

In some examples, in response to detecting the braking event, the suspension controller 86 may adjust the rebound and/or compression damping for the one or more adjustable shock absorbers 18 using the deceleration rate from step 410. For example, based on comparing the deceleration rate with a threshold, the suspension controller 86 may adjust the rebound and/or compression damping. For instance, if the deceleration rate is above a first threshold (e.g., above two tenths of a G), then the suspension controller 86 may reduce the compression damping of the rear adjustable shock absorbers 18*c* and/or 18*d*. If the deceleration is below the first threshold, then the suspension controller 86 might not reduce the compression damping (e.g., maintain the current compression damping) of the rear adjustable shock absorbers 18*c* and/or 18*d*. Additionally, and/or alternatively, if the deceleration rate is above the first threshold (e.g., above two tenths of a G), but below a second threshold (e.g., half of a G), then the suspension controller 86 may reduce the compression damping to a first value. If the deceleration is above the second threshold, then the suspension controller 86 may reduce to a second value that is below the first value (e.g., a softer compression damping value).

In some instances, the suspension controller 86 may separate operation of the braking event and/or cornering event. For example, step 412, 414, and 416 may be optional, and the method 400 may move directly to step 418.

Landing Hop Prevention

Figure 14:
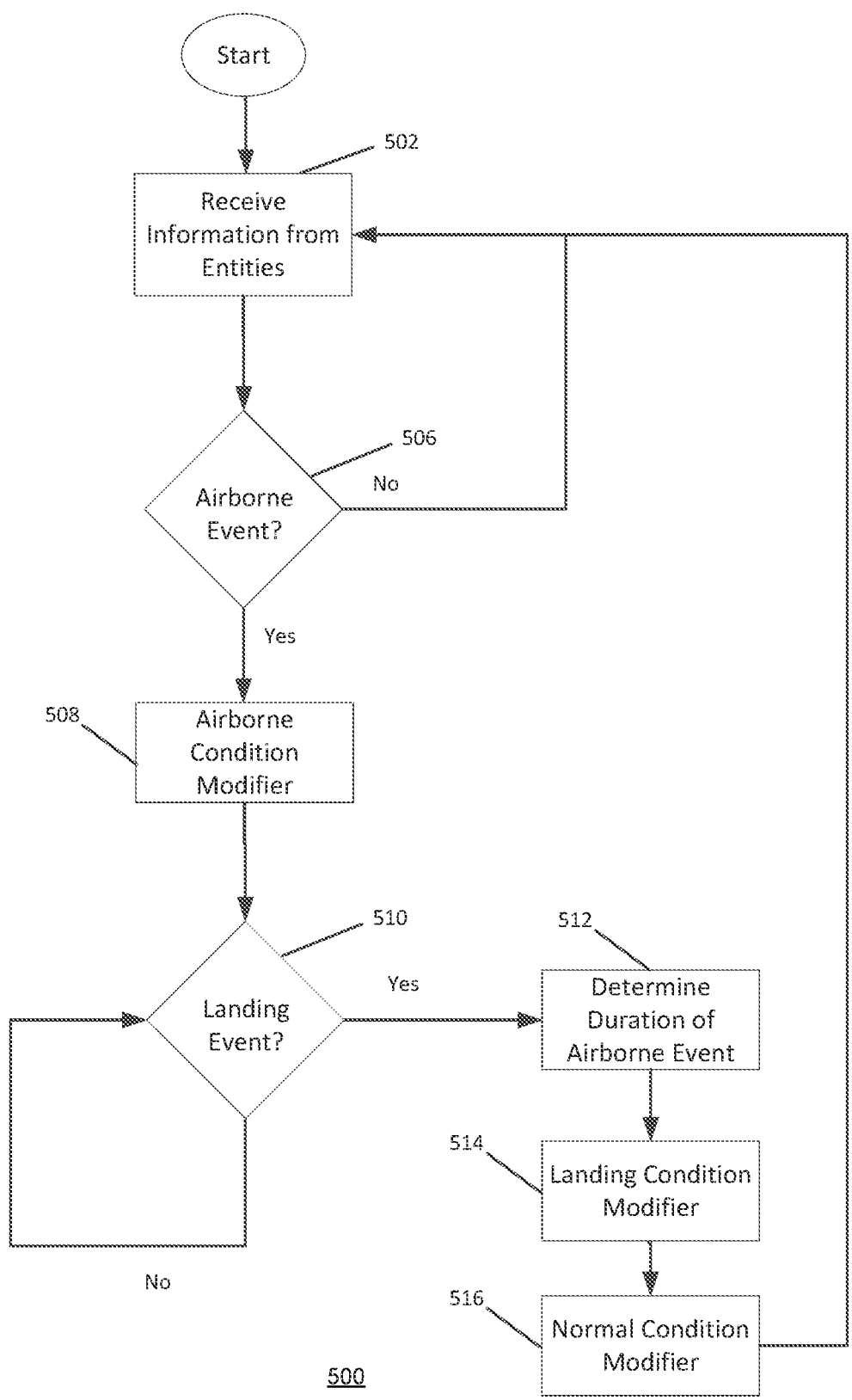
FIG. 14 shows an example flowchart describing the operation of the suspension controller 86 during an airborne event and a landing event.
Figure 15:
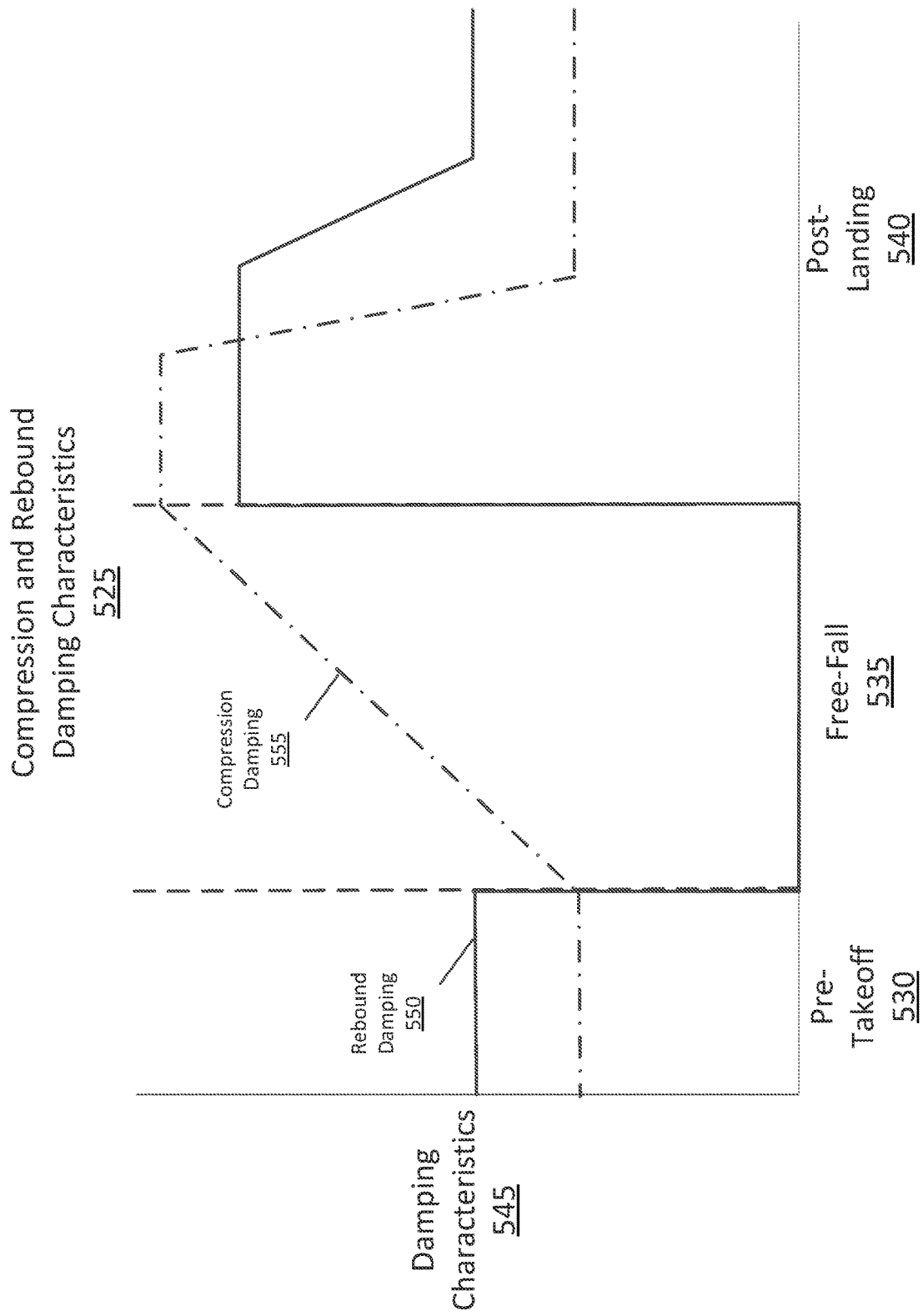
FIG. 15 shows an example representation of the compression and rebound damping characteristics of a vehicle during a pre-takeoff period, a free-fall period, and a post-landing period.

FIG. 14 shows an example flowchart describing the operation of the suspension controller 86 during an airborne event and a landing event. FIG. 14 will be described with reference to FIG. 15. FIG. 15 shows an example graph 525 illustrating the compression and rebound damping characteristics of a vehicle, such as vehicle 10 and/or 200, during a pre-takeoff period 530, a free-fall period 535, and a post-landing period 540. As will be described in more detail below, by adjusting the compression damping and/or rebound damping of one or more adjustable shock absorbers 18 during a free-fall and/or post-landing event, the suspension controller 86 may increase the stability of vehicle 10 post-landing by preventing the vehicle 10 from hoping, unloading, and/or decreasing the weight on the ground engaging members 12. Additionally, and/or alternatively, this may also provide a faster vehicle 10 in a race environment since after a landing event, the throttle may be applied quicker without tire (e.g., ground engaging members 12) spin. Additionally, and/or alternatively, this may also provide a more stable vehicle because the vehicle 10 will have better traction, and thus better user control.

In operation, at step 502, the suspension controller 86 may receive information (e.g., inputs) from one or more entities (e.g., sensors, devices, and/or subsystems) of vehicle 10. For example, the suspension controller 86 may receive (e.g., retrieve and/or obtain) information (e.g., data packets and/or signals indicating sensor readings) from the one or more sensors, devices, and/or subsystems. In some instances, the suspension controller 86 may receive information indicating the x, y, and/or z-axis acceleration from the chassis accelerometer 30 and/or IMU 37. For example, referring back to FIG. 3, the chassis accelerometer 30 and/or IMU 37 may measure the x, y, and/or z-axis acceleration values for the vehicle 10, and may provide the acceleration values to the suspension controller 86.

At step 506, the suspension controller 86 may determine whether an airborne event is occurring. For example, the suspension controller 86 may determine whether an airborne event is occurring based on the magnitude of the x-axis acceleration value, the y-axis acceleration value, and/or the z-axis acceleration value. For instance, the suspension controller 86 may compare the x, y, and/or z-axis acceleration values with one or more thresholds (e.g., one or more pre-defined, pre-programmed, and/or user-defined thresholds) to determine whether the vehicle 10 is in free-all. If the x, y, and/or z-axis acceleration values are less than the one or more thresholds, the method 500 may move to step 508. If the x, y, and/or z-axis acceleration values are greater than the thresholds, the method 500 may move back to step 502 and repeat.

In some examples, the suspension controller 86 may use two or three different thresholds. For example, the suspension controller 86 may compare the magnitudes for each of the x, y, and/or z-axis acceleration with a different threshold. Additionally, and/or alternatively, the suspension controller 86 may compare the magnitudes for the x and y-axis acceleration with a same threshold. For example, in free-fall, the chassis accelerometer 30 and/or IMU 37 may measure the vehicle 10 to have zero or substantially zero acceleration (e.g., wind, air resistance, and/or other factors may account for substantially zero acceleration) for the x and y-axis, and 1 G or substantially 1 G on the z-axis. As such, the suspension controller 86 may use a first threshold for the x-axis and y-axis acceleration values and a second threshold for the z-axis acceleration value. In some variations, the first threshold for the x-axis and the y-axis may be 0.3 Gs. In some instances, the suspension controller 86 may combine (e.g., calculate) a magnitude of acceleration for the x, y, and z-axis acceleration, and compare the combined magnitude with a threshold to determine whether the vehicle 10 is in free-fall.

Exemplary detection of an airborne event is described in US Published Patent Application No. 2016/0059660 (filed Nov. 6, 2015, titled VEHICLE HAVING SUSPENSION WITH CONTINUOUS DAMPING CONTROL) and US Published Application 2018/0141543 (filed Nov. 17, 2017, titled VEHICLE HAVING ADJUSTABLE SUSPENSION), both assigned to the present assignee and the entire disclosures of each expressly incorporated by reference herein.

At step 508, the suspension controller 86 may determine an airborne condition modifier for one or more of the adjustable shock absorbers 18. For example, the suspension controller 86 may provide information (e.g., one or more commands) to the adjustable shock absorbers 18 to increase and/or gradually increase the compression damping. By increasing the adjustable shock absorbers 18, the vehicle 10 may increase the energy absorption upon landing. Further, the suspension controller 86 may provide information (e.g., one or more commands) to decrease the rebound damping for the adjustable shock absorbers 18. By decreasing the rebound damping, the adjustable shock absorbers 18 may achieve full shock extension faster, increase energy absorption upon landing, and/or increase the travel of the shocks 18 available for landing. For example, the suspension controller 86 may reduce the rebound damping for the adjustable shock absorbers 18 to zero or substantially zero.

FIG. 15 shows an example of a graph 525 indicating compression and rebound damping characteristics for a vehicle, such as vehicle 10. The graph 525 is merely one example of a possible compression and rebound damping characteristics set by the suspension controller 86 over different periods of time. Graph 525 shows three periods, a pre-takeoff (e.g., pre-airborne) period 530, a free-fall period 535, and a post-landing period 540. Initially, during the pre-takeoff period, the rebound damping 550 and the compression damping 555 for the adjustable shock absorbers 18 are steady. When an airborne event occurs, the suspension controller 86 gradually increases the compression damping 55 over the free-fall period 535 and decreases the rebound damping 550 to substantially zero. The post-landing period 540 will be discussed below.

Referring back to FIG. 14, at step 510, the suspension controller 86 may determine whether a landing event has occurred. For example, similar to step 506, the suspension controller 86 may determine whether a landing event is occurring based on the magnitude of the x-axis acceleration value, the y-axis acceleration value, and/or the z-axis acceleration value. For instance, the suspension controller 86 may compare the x, y, and/or z-axis acceleration values with one or more thresholds (e.g., one or more pre-defined, pre-programmed, and/or user-defined thresholds) to determine whether the vehicle 10 has landed. If the x, y, and/or z-axis acceleration values are greater than the one or more thresholds, the method 500 may move to step 508. If the x, y, and/or z-axis acceleration values are less than the thresholds, then step 510 may repeat.

In some examples, the suspension controller 86 may use the same thresholds as in step 506. For example, as mentioned above, in free-fall, the chassis accelerometer 30 and/or IMU 37 may measure the vehicle 10 to have zero or substantially zero acceleration for the x and y-axis, and 1 G or substantially 1 G on the z-axis. As such, the suspension controller 86 may determine whether a landing event is occurring based on determining whether the acceleration values for the x and/or y-axis is greater than the first threshold (e.g., 0.3 Gs) and/or whether the acceleration values for the z-axis is greater than a second threshold. In some instances, the suspension controller 86 may combine (e.g., calculate) a magnitude of acceleration for the x, y, and z-axis acceleration, and compare the combined magnitude with a threshold to determine whether the vehicle 10 has landed.

At step 512, the suspension controller 86 may determine a duration for the airborne event (e.g., a duration that the vehicle 10 is in free-fall). For example, the suspension controller 86 may include a timer, and may use the timer to determine the duration between detecting the airborne event at step 506 and detecting the landing event at step 510.

At step 514, the suspension controller 86 may execute a landing condition modifier for one or more of the adjustable shock absorbers 18. For example, the suspension controller 86 may provide information (e.g., one or more commands) to the adjustable shock absorbers 18 to adjust the compression damping and/or the rebound damping to a post-landing set-point for a period of time. For instance, the suspension controller 86 may increase the rebound damping for a period of time. Also, the suspension controller 86 may maintain the compression damping at the post-landing setting for a period of time. By maintaining the compression damping, the vehicle 10 may be easier able to get through the landing compression stroke of the shock.

At step 516, the suspension controller 86 may execute a normal condition modifier. For example, the suspension controller 86 may adjust the compression damping and/or rebound damping back to normal (e.g., back to the pre-takeoff position). For example, the suspension controller may decrease and/or gradually decrease the rebound damping back to the normal (e.g., the pre-takeoff rebound damping setting). Further, the suspension controller 86 may decrease the compression damping back to normal (e.g., the pre-takeoff compression damping setting).

In some variations, the suspension controller 86 may adjust the post-landing compression damping settings and/or rebound damping settings based on the duration of the airborne event. Referring back to FIG. 15, the compression damping 555 is gradually increasing, and increase as the duration of the airborne event increases. As such, during the post-landing period 540, the suspension controller 86 may maintain an increased compression damping 555 based on the airborne event. Additionally, and/or alternatively, the suspension controller 86 may change the duration to maintain the increased compression damping 555 based on the duration of the airborne event. For example, the vehicle 10 may encounter a small bump (e.g., the airborne event is less than three hundred milliseconds). In such instances, the suspension controller 86 may compare the duration of the airborne event with a threshold (e.g., pre-programmed, pre-defined, and/or user-defined). If the duration of the airborne event is less than the threshold, the suspension controller 86 might not maintain the increased compression damping 555. Instead, the suspension controller 86 may reduce and/or gradually reduce the compression damping back to the pre-takeoff 530 compression damping 555 in response to detecting the landing event.

In some examples, if the duration of the airborne event is greater than the threshold, the suspension controller 86 may maintain the increased compression damping 555 for a period of time. In some instances, the suspension controller 86 may determine the period of time to maintain the increased compression damping 555 based on the duration of the airborne event (e.g., the longer the duration for the airborne event, the longer the period of time to maintain the increased compression damping 555).

In response to detecting the landing event (e.g., the start of the post-landing period 540), the suspension controller 86 may increase the rebound damping 550 based on the duration of the airborne event. For example, traditionally, the vehicle 10 tends to unload the tires (e.g., wheels are light) and/or perform a hop upon landing. To prevent the hop or unloading of the tires, the suspension controller 86 increases the rebound damping 550 for the adjustable shock absorbers 18 based on the duration of the airborne event (e.g., as the duration of the airborne event increases, the rebound damping 550 after landing increases). After a set period of time (e.g., after the vehicle 10 has completed its first shock compression and rebound cycle), the suspension controller 86 decreases and/or gradually decreases the rebound damping 550 back to the pre-takeoff period's 530 rebound damping setting. By increasing the rebound damping 550, the suspension controller 86 reduces the hop/unloading of the vehicle 10 causing increases in the stability and/or traction on the landing events.

In some examples, the vehicle 10 may encounter a small bump or hill, the vehicle 10 might not perform a hop upon landing or performs a small hop upon landing. In such examples, the suspension controller 86 may adjust the compression and/or rebound damping characteristics based on comparing the duration of the airborne event with a threshold. For example, the suspension controller 86 might not increase the rebound damping 550, and instead set the rebound damping 550 to the pre-takeoff period's 530 rebound damping setting in response to detecting the landing event.

Additionally, and/or alternatively, based on the duration of the airborne event, the suspension controller 86 may bias the compression damping and/or rebound damping for the front and/or rear adjustable shock absorbers 18. For example, based on detecting the duration of the airborne event is below a threshold (e.g., the vehicle 10 is encountering a small bump or hill), the suspension controller 86 may additionally increase the rebound damping for the post-landing rebound value for the rear adjustable shock absorbers 18c and 18d. Biasing the front/rear shock absorbers 18 in response to detecting the airborne event may increase stability of the vehicle 10 and/or assist the vehicle 10 when traveling through rough terrain.

Rock Crawler Operation

Figure 16:
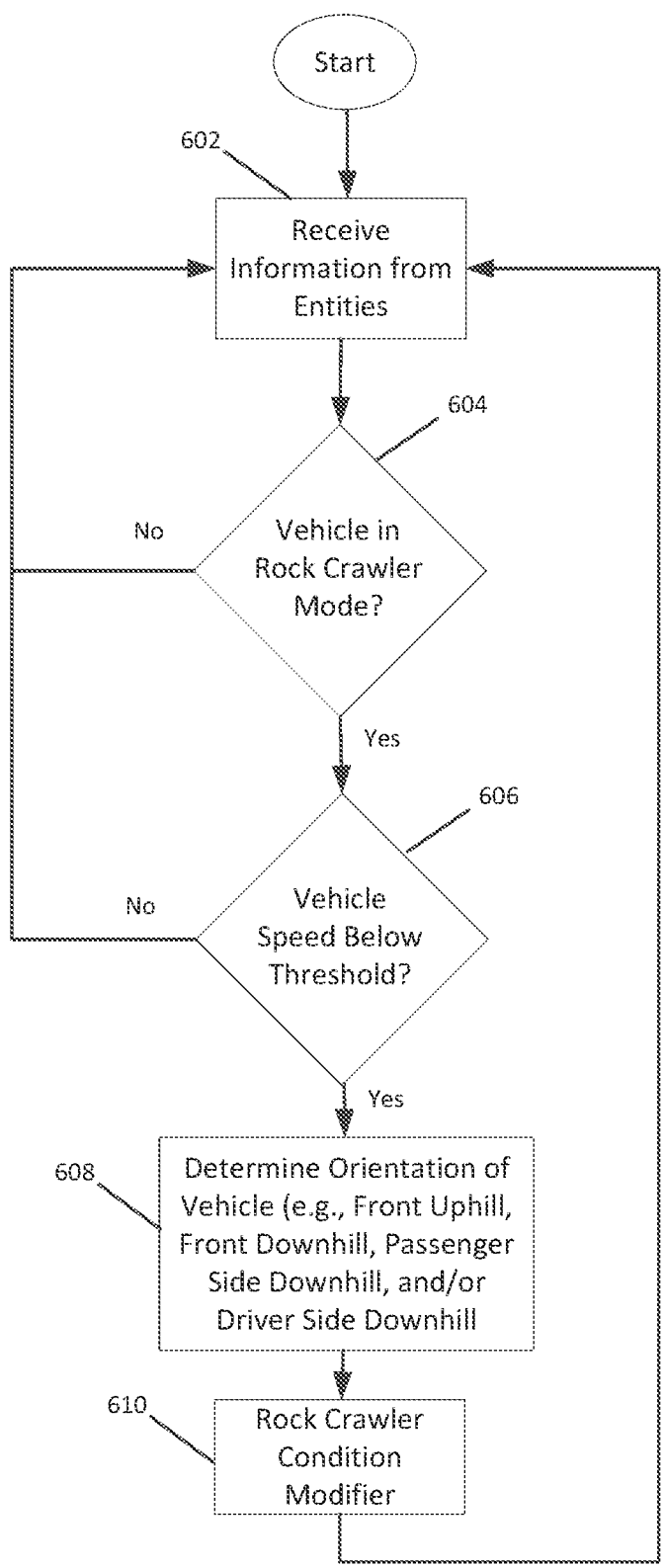
FIG. 16 shows an exemplary flowchart describing the suspension controller performing in a rock crawl operation.

FIG. 16 shows an example flowchart describing the operation of the suspension controller 86 during a rock crawler operation. FIGS. 17-20 show examples of the suspension controller 86 adjusting the adjustable shock absorbers 18 for the vehicle 10 during the rock crawler operation.

By adjusting the compression damping and/or rebound damping of one or more adjustable shock absorbers 18 during the rock crawl operation, the suspension controller 86 may increase vehicle 10 stability when encountering rocks. For example, based on received information (e.g., longitudinal acceleration, lateral acceleration vehicle speed, engine speed, and/or roll angle), the suspension controller 86 may determine the orientation of the vehicle 10 (e.g., whether the vehicle 10 is on flat ground, facing uphill, facing downhill, passenger side facing downhill, and/or driver side facing downhill). Based on the orientation of the vehicle 10, the suspension controller 86 may adjust the compression and/or rebound damping to lean the vehicle 10 into the hill, and/or rock, causing the vehicle 10 to reduce the overall pitch/roll angle when traversing an obstacle. Further, by adjusting the compression and/or rebound damping when the vehicle 10 is on flat ground, the vehicle 10 has increased ground clearance.

In operation, at step 602, the suspension controller 86 may receive information (e.g., inputs) from one or more entities (e.g., sensors, devices, and/or subsystems) of vehicle 10. For example, the suspension controller 86 may receive (e.g., retrieve and/or obtain) information (e.g., data packets and/or signals indicating sensor readings) from the one or more sensors, devices, and/or subsystems. In some instances, the suspension controller 86 may receive longitudinal and/or lateral acceleration rates from a sensor, such as the IMU 37 and/or the chassis accelerometer 30. In some examples, the suspension controller 86 may receive pitch rate, roll rate, pitch angles, roll angles, and/or yaw rates from a sensor, such as the gyroscope 31. In some instances, the suspension controller 86 may receive a vehicle speed from a sensor, such as the vehicle speed sensor 26.

In some examples, the suspension controller 86 may receive information indicating a mode of operation for the vehicle 10. For example, the suspension controller 86 may receive information indicating the mode of operation from an operator interface 22 and/or another controller (e.g., controller 20). For instance, the operator interface 22 may receive user input indicating a selection of the rock crawler mode. The operator interface 22 may provide the user input to the suspension controller 86. The suspension controller 86 may be configured to operate in a rock crawler mode based on the user input.

At step 604, the suspension controller 86 may determine whether the vehicle 10 is in a rock crawler mode. For example, based on information indicating the mode of operation, the suspension controller 86 may determine whether the vehicle 10 is in the rock crawler mode. If the vehicle 10 is in the rock crawling mode, the method 600 may move to step 606. If not, the method 600 may move back to step 602.

At step 606, the suspension controller 86 may determine whether the vehicle speed is below a threshold. For example, the suspension controller 86 may compare the vehicle speed with a threshold. If the vehicle speed is less than the threshold, then the method 600 may move to step 608. If not, then the method 600 may move back to step 602. In other words, the suspension controller 86 may operate in the rock crawler mode and provide rock crawler condition modifiers at low vehicle speeds. At higher vehicle speeds, the suspension controller 86 might not operate in the rocker crawler mode. Instead, at higher vehicle speeds, the suspension controller 86 may operate in a different mode of operation, such as a normal or comfort mode. In some instances, the suspension controller 86 may use the engine speed rather than the vehicle speed to determine whether to operate in the rock crawler mode and/or provide rock crawler condition modifiers.

At step 608, the suspension controller 86 may determine an orientation of the vehicle 10. For example, based on the magnitude of the x-axis acceleration value, the y-axis acceleration value, and/or the z-axis acceleration value, the suspension controller 86 may determine a longitudinal acceleration and/or a lateral acceleration of the vehicle 10. Using the longitudinal and/or lateral acceleration, the suspension controller 86 may determine a roll and/or pitch angle of the vehicle 10. Then, based on the roll and/or pitch angle of the vehicle, the suspension controller 86 may determine whether the vehicle 10 is on a flat surface, the front of the vehicle 10 facing uphill, the front of the vehicle 10 is facing downhill, the passenger side of the vehicle 10 is facing downhill, and/or the driver side of the vehicle 10 is facing downhill. Additionally, and/or alternatively, the suspension controller 86 may determine the orientation, such as whether the passenger side of the vehicle 10 is facing downhill and/or the driver side of the vehicle 10 is facing downhill, based on the roll rates from the gyroscope 31 and/or the IMU 37.

At step 610, the suspension controller 86 may execute a rock crawler condition modifier. For example, based on the orientation of the vehicle 10, the suspension controller 86 may provide information (e.g., one or more commands) to adjust the compression damping and/or the rebound damping for one or more of the adjustable shock absorbers 18. In some examples, the suspension controller 86 may increase the compression damping for the downhill adjustable shock absorbers 18. Additionally, and/or alternatively, the suspension controller 86 may increase the rebound damping and/or decrease the compression damping for the uphill adjustable shock absorbers 18.

Figure 17:
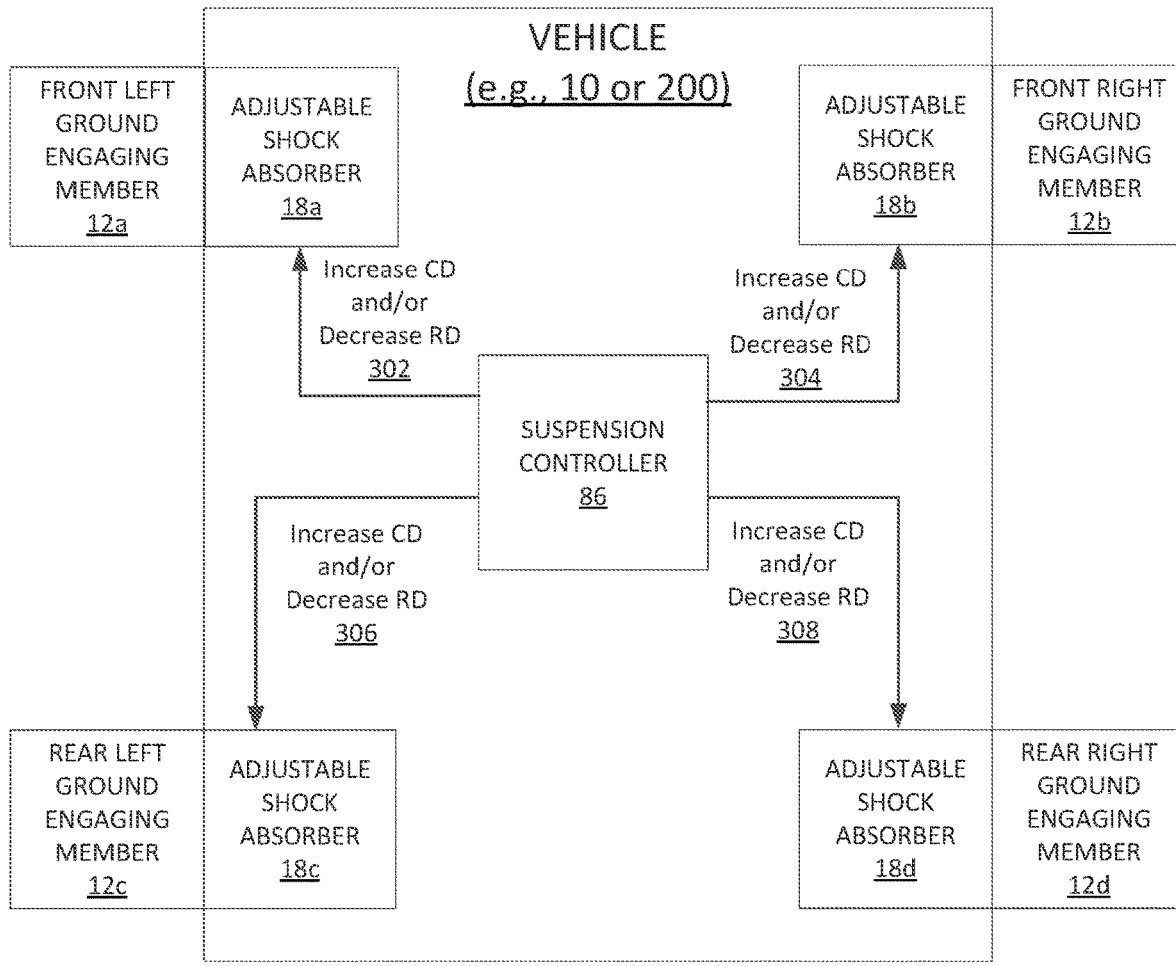
FIG. 17 shows an example of the suspension controller adjusting the adjustable shock absorbers for the vehicle performing in a rock crawl operation.

FIGS. 17-20 show examples of the rebound and compression damping characteristics of the adjustable shock absorbers 18 using method 600. FIG. 17 shows the compression damping and/or rebound damping characteristics of the vehicle 10 on flat ground. For example, at step 608, the suspension controller 86 may determine the vehicle 10 is on flat ground (e.g., based on the longitudinal acceleration value and/or the lateral acceleration value. Based on the orientation of the vehicle 10, the suspension controller 86 may provide information (e.g., one or more commands) to adjust the damping characteristics of the vehicle 10. For instance, the suspension controller 86 may provide information 302, 304, 306, 308 to increase the compression damping and to decrease the rebound damping for the adjustable shock absorber 18a, 18b, 18c, and 18d. By adjusting the compression damping and rebound damping, the suspension controller 86 may maximize the ground clearance for obstacle avoidance, may avoid full stiff compression when on flat ground to remove unnecessary harshness, and may allow the ground engaging members 12 to fall into holes in the ground more quickly, thus not upsetting the vehicle 10.

Figure 18:
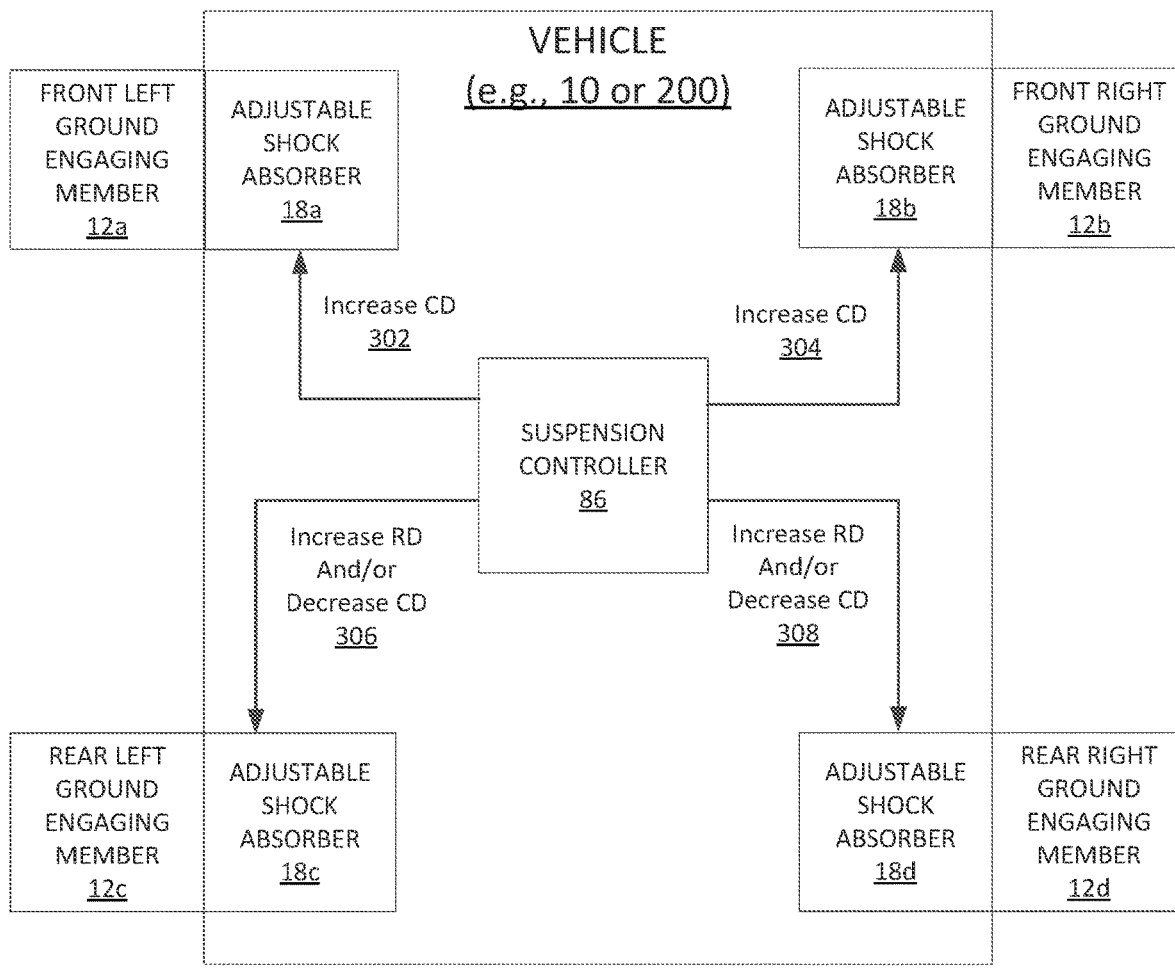
FIG. 18 shows another example of the suspension controller adjusting the adjustable shock absorbers for the vehicle performing in a rock crawl operation.

FIG. 18 shows the compression damping and/or rebound damping characteristics of the vehicle 10 when the front of the vehicle 10 is facing downhill. For example, at step 608, the suspension controller 86 may determine the vehicle 10 is facing downhill (e.g., based on the longitudinal acceleration value and/or lateral acceleration value). Based on the orientation of the vehicle 10, the suspension controller 86 may provide information (e.g., one or more commands) to adjust the damping characteristics of the vehicle 10. For instance, the suspension controller 86 may provide information 302 and 304 to increase the compression damping for the adjustable shock absorbers 18a and 18b (e.g., the downhill facing shock absorbers). Further, the suspension controller 86 may provide information 306 and 308 to increase the rebound damping and/or decrease the compression damping for the adjustable shock absorber 18c and 18d (e.g., the uphill facing shock absorbers).

Figure 19:
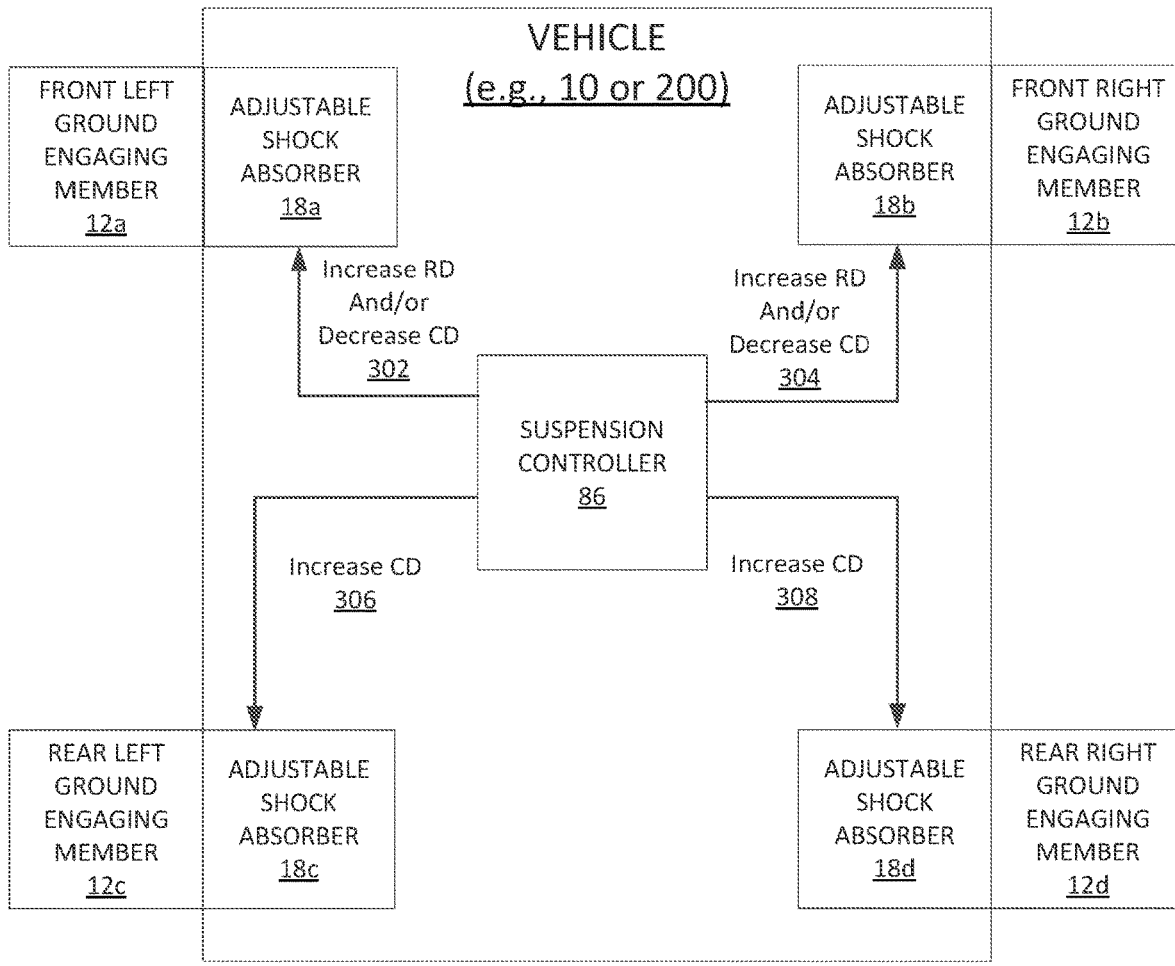
FIG. 19 shows another example of the suspension controller adjusting the adjustable shock absorbers for the vehicle performing in a rock crawl operation.

FIG. 19 shows the compression damping and/or rebound damping characteristics of the vehicle 10 when the front of the vehicle 10 is facing uphill. For example, at step 608, the suspension controller 86 may determine the vehicle 10 is facing uphill (e.g., based on the longitudinal acceleration value and/or lateral acceleration value). Based on the orientation of the vehicle 10, the suspension controller 86 may provide information (e.g., one or more commands) to adjust the damping characteristics of the vehicle 10. For instance, the suspension controller 86 may provide information 302 and 304 to increase the rebound damping and/or decrease the compression damping for the adjustable shock absorbers 18a and 18b (e.g., the uphill facing shock absorbers). Further, the suspension controller 86 may provide information 306 and 308 to increase the compression damping for the adjustable shock absorber 18c and 18d (e.g., the downhill facing shock absorbers).

Figure 20:
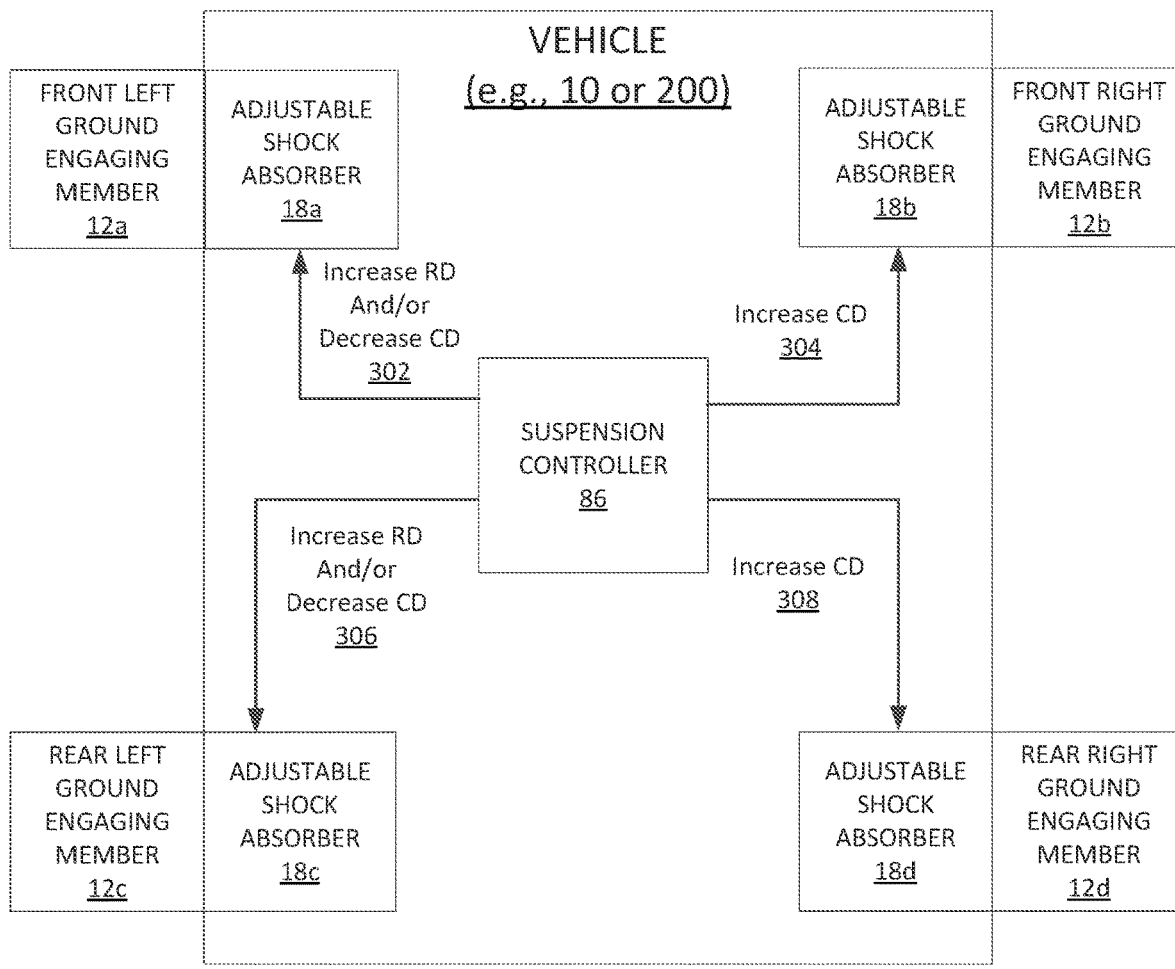
FIG. 20 shows another example of the suspension controller adjusting the adjustable shock absorbers for the vehicle performing in a rock crawl operation.

FIG. 20 shows the compression damping and/or rebound damping characteristics of the vehicle 10 when the passenger side of the vehicle 10 is facing downhill. For example, at step 608, the suspension controller 86 may determine the passenger side of the vehicle 10 is facing downhill (e.g., based on the lateral acceleration value and/or longitudinal acceleration value). Based on the orientation of the vehicle 10, the suspension controller 86 may provide information (e.g., one or more commands) to adjust the damping characteristics of the vehicle 10. For instance, the suspension controller 86 may provide information 304 and 308 to increase the compression damping for the adjustable shock absorbers 18b and 18d (e.g., the downhill facing shock absorbers). Further, the suspension controller 86 may provide information 302 and 306 to increase the rebound damping and/or decrease the compression damping for the adjustable shock absorber 18a and 18c (e.g., the uphill facing shock absorbers).

In some variations, a portion of the vehicle 10, such as the passenger side of the front of the vehicle 10, is facing downhill. In other words, the vehicle 10 may be angled so one wheel (e.g., the front right ground engaging member 12b) is facing downhill and one wheel (e.g., the rear left ground engaging member 12c) is facing uphill. In such instances, at step 608, the suspension controller 86 may determine a pitch and roll angle based on the longitudinal and/or lateral acceleration values. Based on the pitch and roll angles, the suspension controller 86 may determine the orientation of the vehicle (e.g., that the front right ground engaging member 12b is facing). Based on the orientation of the vehicle 10, the suspension controller 86 may provide information 304 to increase the compression damping for the adjustable shock absorbers 18b (e.g., the downhill facing shock absorber). Further, the suspension controller 86 may provide information 306 to increase the rebound damping and/or decrease the compression damping for the adjustable shock absorber 18c (e.g., the uphill facing shock absorber). Additionally, and/or alternatively, based on the angle of the orientation, the suspension controller 86 may provide information 302 to maintain and/or decrease the rebound damping and/or maintain and/or increase the compression damping for the adjustable shock absorber 18a (e.g., a shock absorber that is neither uphill or downhill). Additionally, and/or alternatively, based on the angle of the orientation, the suspension controller 86 may provide information 308 to decrease the rebound damping and/or maintain the compression damping for the adjustable shock absorber 18d (e.g., a shock absorber that is neither uphill or downhill).

In some instances, when the vehicle 10 is in the rock crawler mode, the suspension controller 86 may increase, decrease, and/or maintain the compression and/or rebound damping as shown in FIG. 17. Further, in response to determining the orientation of the vehicle 10 (e.g., step 608), the suspension controller 86 may additionally increase and/or or decrease the compression and/or rebound damping as shown in FIGS. 18-20. In other words, in such instances, the increasing, decreasing, and/or maintain of the compression/ rebound damping as shown in FIGS. 18-20 are based off of the compression/rebound damping from FIG. 17.

Hill (Dune) Sliding Operation

Figure 21:
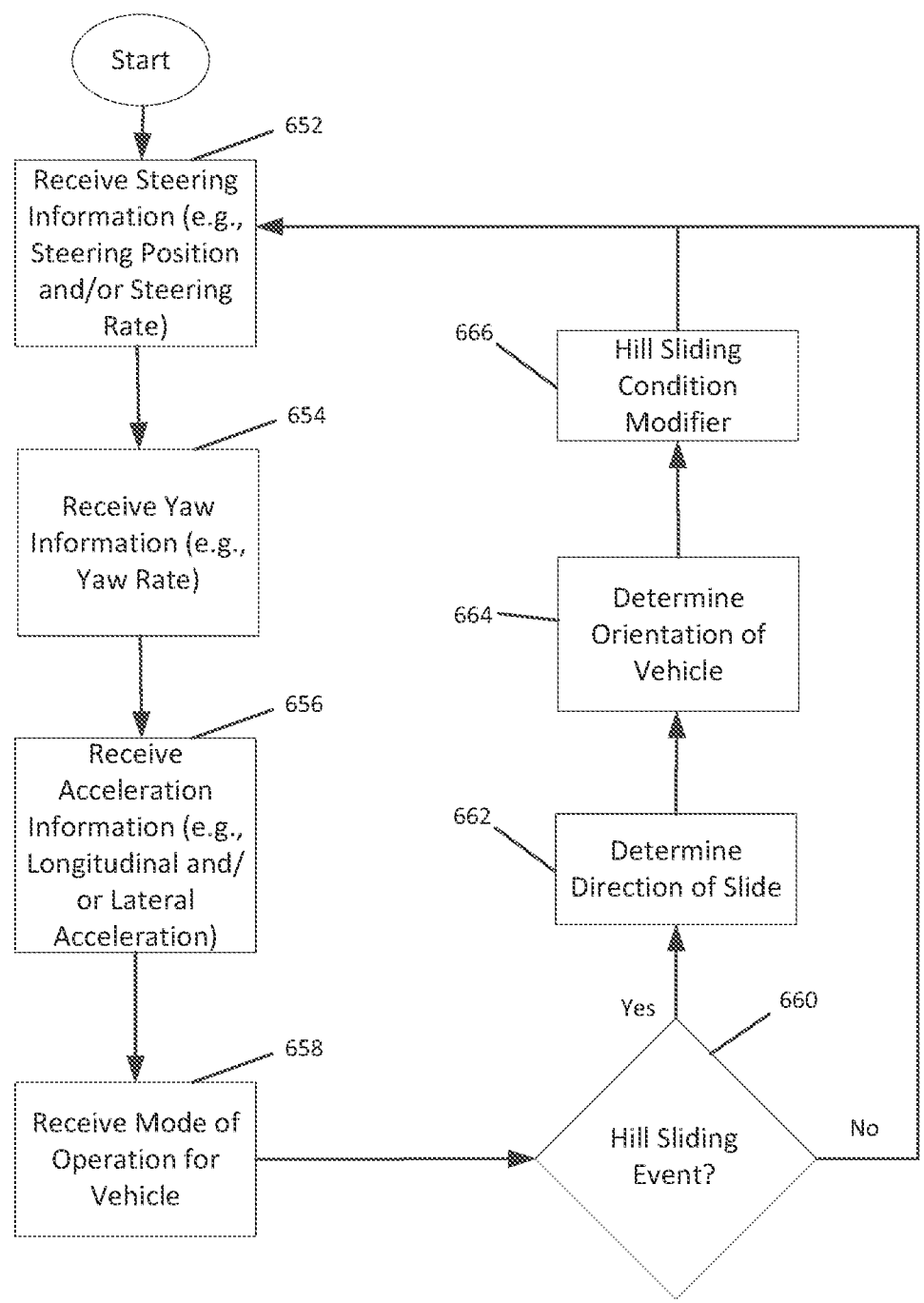
FIG. 21 shows an exemplary flowchart describing the operation of the suspension controller during a sliding event.
Figure 22:
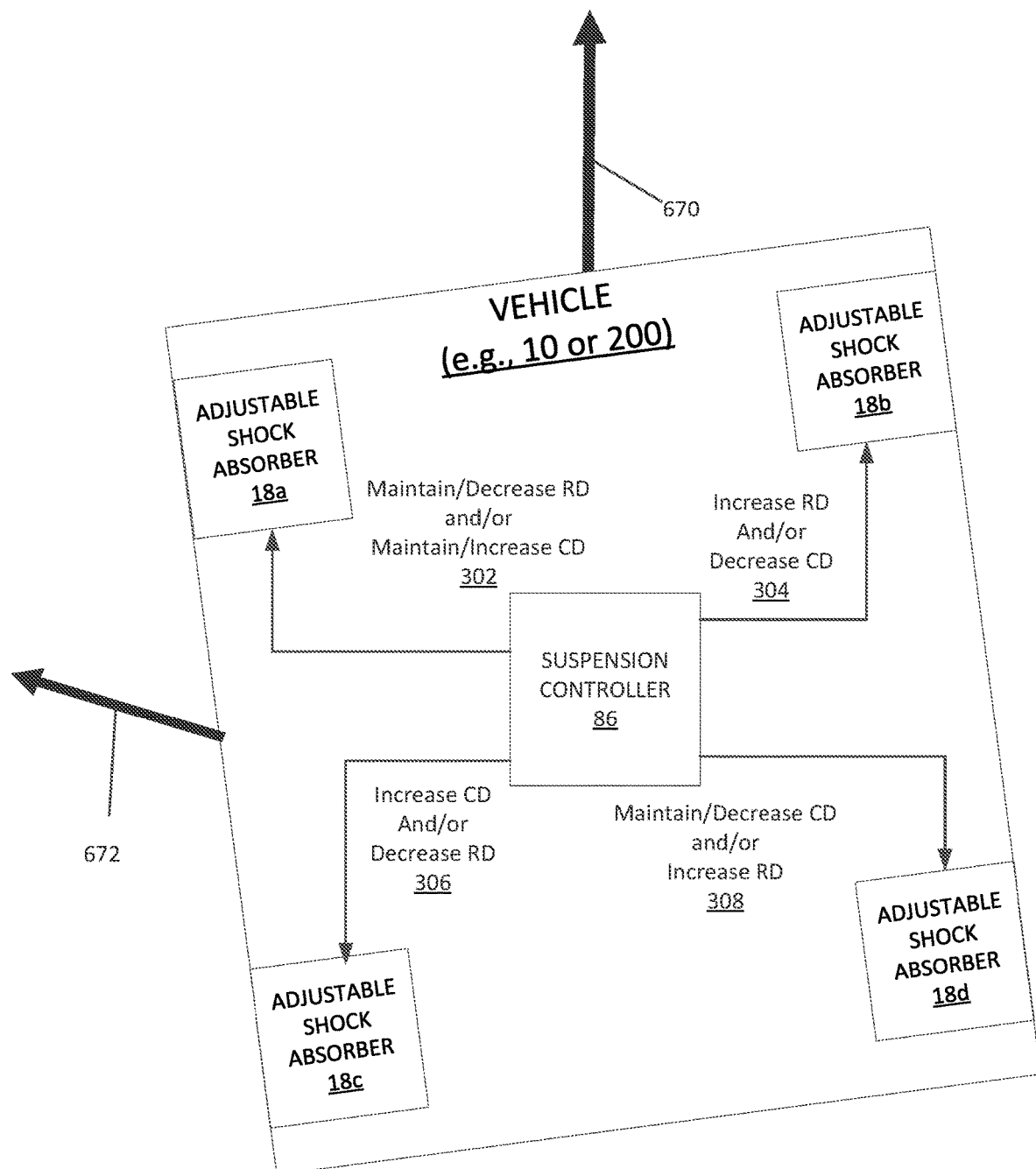
FIG. 22 shows another example of the suspension controller adjusting the adjustable shock absorbers during the sliding event.
Figure 23:
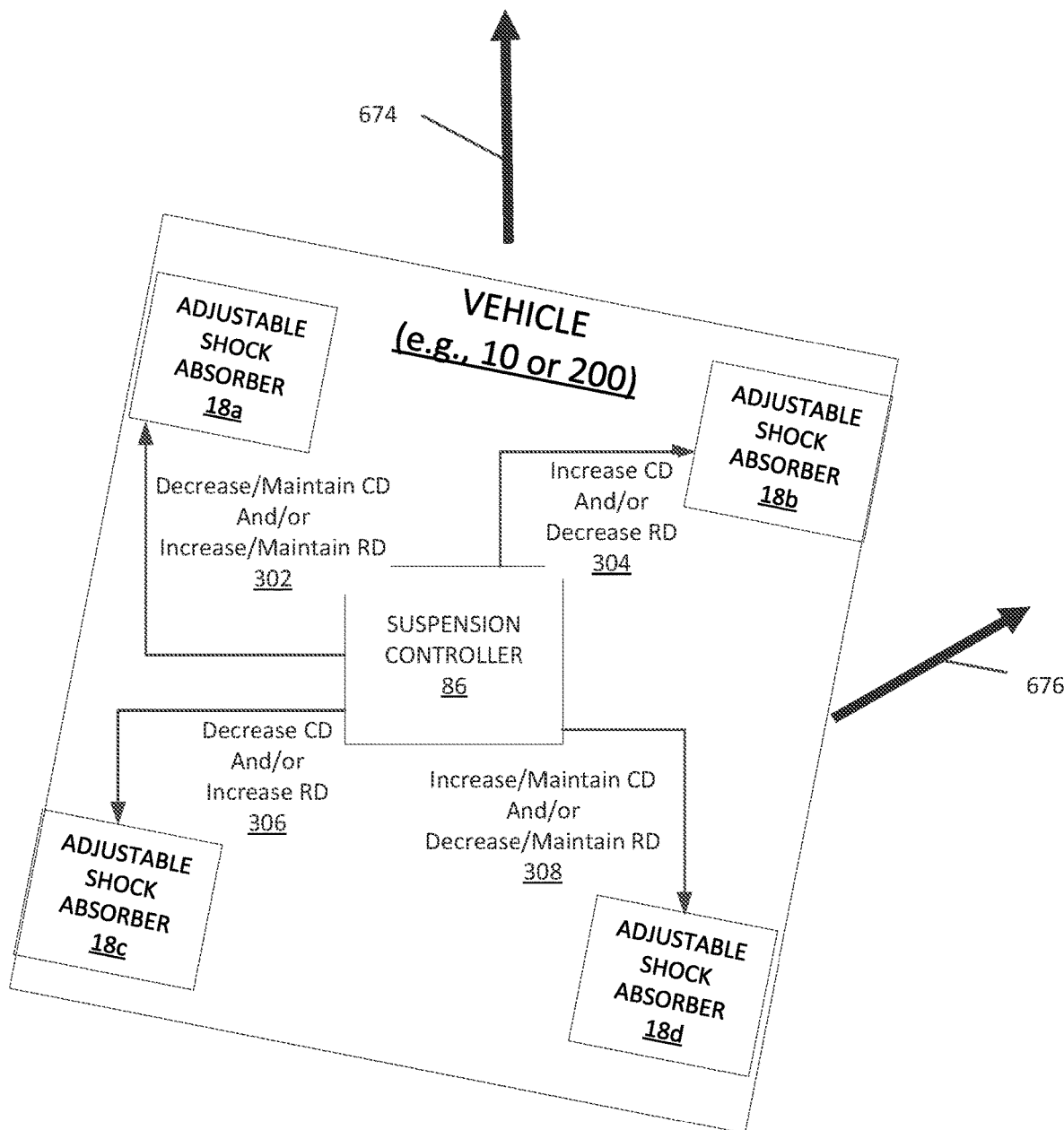
FIG. 23 shows another example of the suspension controller adjusting the adjustable shock absorbers during the sliding event.

FIG. 21 shows an example flowchart describing the operation of the suspension controller 86 during a hill sliding event. FIGS. 22 and 23 show examples of the suspension controller 86 adjusting the adjustable shock absorbers 18 for the vehicle 10 during the hill sliding event. By adjusting the damping during an front uphill sliding event, the vehicle 10 may lean better into the hill or dune, hold onto a steeper slope better, and/or provide a smoother ride (e.g., less chop) to the user when traversing the hill or dune. By adjusting the damping during a front downhill sliding event, the vehicle 10 may lean better into the hill or dune, increase vehicle stability, and/or make it easier to traverse back uphill. A hill sliding event is any event where the vehicle 10 is traversing a slope (e.g., hill, dune, ramp) and begins to slide in at least one direction.

In operation, at step 652, the suspension controller 86 may receive steering information from one or more sensors, such as the steering sensor 28. The steering information may indicate a steering position (e.g., steering angle) of a steering wheel, such as steering wheel 226. The steering position and/or angle may indicate a position and/or an angle of the steering wheel for the vehicle 10. The steering rate may indicate a change of the position and/or angle of the steering wheel over a period of time.

At step 654, the suspension controller 86 may receive yaw rate information from one or more sensors, such as the gyroscope 31 and/or the IMU 37. The yaw information indicates the yaw rate of the vehicle 10.

At step 656, the suspension controller 86 may receive acceleration information indicating an acceleration rate or deceleration rate of the vehicle 10 from one or more sensors, such as the IMU 37 and/or the chassis accelerometer 30. The acceleration information may indicate multi-axis acceleration values of the vehicle, such as a longitudinal acceleration and/or a lateral acceleration. In some examples, the suspension controller 86 may receive information from another sensor, such as the throttle position sensor 34 and/or the accelerator pedal sensor 33. The suspension controller 86 use the information to determine the acceleration rate. For example, the suspension controller 86 may use the throttle position from the throttle position sensor and/or the position of the accelerator pedal 230 from the acceleration pedal sensor to determine whether the vehicle 10 is accelerating and/or decelerating.

At step 658, the suspension controller 86 may receive an operating mode of the vehicle 10 from the operator interface 22 and/or one or more other controllers (e.g., controller 20). Each mode may include a different setting for the rebound and/or compression damping. An operator (e.g., user) may input a mode of operation on the operator interface 22. The operator interface 22 may provide the user input indicating the mode of operation to the controller 20 and/or the suspension controller 86. The suspension controller 86 may use the user input to determine the mode of operation for the vehicle 10.

At step 660, the suspension controller 86 may determine whether a hill sliding event (e.g., whether the vehicle 10 is sliding while traversing a slope) is occurring. For example, the suspension controller 86 may determine the hill sliding event based on the steering information indicating a steering rate, angle, and/or position, yaw rate information indicating a yaw rate, the acceleration information indicating a lateral and/or longitudinal acceleration, and/or other information (e.g., a pitch angle or rate). The suspension controller 86 may compare the steering rate, steering angle, steering position, yaw rate, lateral acceleration, and/or longitudinal acceleration with one or more thresholds (e.g., pre-determined, pre-programmed, and/or user-defined) to determine the hill sliding event. If the suspension controller 86 determines the vehicle 10 is in a hill sliding event, the method 650 may move to step 662. If not, the method may move to step 652.

In some instances, the detection of the hill sliding event may be similar to the detection of the cornering event. Further, the commands to adjust the damping of the shock absorbers 18 based on the detection of the hill sliding event may be similar to the cornering event. For example, the suspension controller 86 may prioritize the steering information, the yaw rate information, and/or the acceleration information to determine the hill sliding event. In other words, the steering position and/or angle, steering rate, yaw rate, and/or lateral acceleration may conflict, and the suspension controller 86 may prioritize the lateral acceleration over the steering position, angle, rate and/or the yaw rate. For example, the suspension controller 86 may determine the hill sliding event is occurring based on the lateral acceleration value exceeding (e.g., above or below) a lateral acceleration threshold even if the yaw rate, steering rate, angle, and/or position do not exceed their corresponding thresholds.

In some examples, the suspension controller 86 may use a vehicle speed and/or an engine speed to determine whether the vehicle 10 is in a hill sliding event. For example, the suspension controller 86 may compare the vehicle speed and/or the engine speed with a threshold. If the suspension controller 86 determines the vehicle speed and/or engine speed is greater than a threshold (e.g., the vehicle 10 is traveling at a high vehicle speed), then the method 650 may move to 662. Otherwise, the method 650 may move back to 652. In other words, the suspension controller 86 may execute the hill sliding condition modifier when the vehicle is moving at a high vehicle speed.

At step 662, the suspension controller 86 may determine a direction of the slide. For example, based on the lateral acceleration, the suspension controller 86 may determine whether the vehicle 10 is hill sliding to the left side or the right side.

At step 664, the suspension controller 86 may determine an orientation of the vehicle 10. For example, similar to step 608, based on the longitudinal and/or lateral acceleration, the suspension controller 86 may determine whether the front of the vehicle 10 is facing uphill, the front of the vehicle 10 is facing downhill, the passenger side of the vehicle 10 is facing downhill, and/or the driver side of the vehicle 10 is facing downhill.

At step 666, the suspension controller 86 may execute a hill sliding condition modifier. For example, based on the direction of the slide and/or the orientation of the vehicle 10, the suspension controller 86 may provide information (e.g., one or more commands) to adjust the compression damping and/or the rebound damping for the one or more shock absorbers 18. For example, based on the direction of the slide, the suspension controller 86 may increase the compression damping and/or decrease the rebound damping on the leading adjustable shock absorbers 18. Additionally, and/or alternatively, the suspension controller 86 may decrease the compression damping and/or increase the rebound damping on the trailing adjustable shock absorbers 18. Also, based on the orientation (e.g., the front of the vehicle 10 facing uphill and/or downhill), the suspension controller 86 may further bias the compression damping and/or rebound damping for the front and rear shock absorbers 18. In other words, the suspension controller 86 may additionally increase the compression damping on the downhill adjustable shock absorbers 18. Additionally, and/or alternatively, the suspension controller 86 may additionally decrease the compression damping and/or additionally increase the rebound damping of the uphill shock absorbers 18. Afterwards, the method 650 may move back to step 652. FIGS. 22 and 23 will describe the hill condition modifier in further detail.

FIG. 22 shows the vehicle 10 traveling uphill and in a left pointed slide. For example, the suspension controller 86 may determine that the vehicle 10 is traveling uphill 670 and sliding left 672 based on the lateral and/or longitudinal acceleration. The suspension controller 86 may adjust the compression and/or rebound damping characteristics for a left pointed slide 672 similar to a right turn during a cornering event. In other words, the suspension controller 86 may increase the compression damping and/or decrease the rebound damping for the leading shock absorbers 18a and 18c (e.g., the outside shock absorbers). Further, the suspension controller 86 may decrease the compression damping and/or increase the rebound damping for the leading shock absorbers 18b and 18d (e.g., the inside shock absorbers). For a right pointed slide, the suspension controller 86 may reverse the compression damping and/or rebound damping for the shock absorbers (e.g., decrease the compression damping and/or increase the rebound damping for the shock absorbers 18a and 18c; increase the compression damping and/or decrease the rebound damping for shock absorbers 18b and 18d).

Additionally, and/or alternatively, the suspension controller 86 may bias the front and/or rear adjustable shock absorbers 18 for the uphill orientation 670 similar to detecting an acceleration during a cornering event. For example, based on the uphill orientation of the vehicle 10, the suspension controller 86 may additionally increase (e.g., by a value or percentage) the compression damping and/or additionally decrease (e.g., by a value or a percentage) the rebound damping of rear adjustable shock absorbers 18c and 18d (e.g., the downhill shock absorbers). Further, the suspension controller 86 may additionally decrease the compression damping and/or additionally increase the rebound damping of the front adjustable shock absorbers 18a and 18b (e.g., the uphill shock absorbers).

After determining the slide 672 and the orientation 670 of the vehicle, the suspension controller 86 may provide information (e.g., one or more commands) to adjust the shock absorbers 18. For example, in an uphill 670 and left pointed slide 672, the suspension controller 86 may provide information 302 to maintain or decrease the rebound damping and/or maintain or increase the compression damping for the adjustable shock absorber 18a. Further, the suspension controller 86 may provide information 304 to increase the rebound damping and/or decrease the compression damping for the adjustable shock absorber 18b. Also, the suspension controller 86 may provide information 306 to increase the compression damping and/or to decrease the rebound damping for the adjustable shock absorber 18c. Additionally, the suspension controller 86 may provide information 308 to maintain or decrease the compression damping and/or increase the rebound damping for the adjustable shock absorber 18d.

FIG. 23 shows the vehicle 10 traveling downhill and in a right pointed slide. For example, the suspension controller 86 may determine that the vehicle 10 is traveling downhill 674 and sliding right 676 based on the lateral and/or longitudinal acceleration. The suspension controller 86 may adjust the compression and/or rebound damping characteristics for a right pointed slide 676 similar to a left turn during a cornering event. In other words, the suspension controller 86 may increase the compression damping and/or decrease the rebound damping for the leading shock absorbers 18b and 18d (e.g., the outside shock absorbers). Further, the suspension controller 86 may decrease the compression damping and/or increase the rebound damping for the trailing shock absorbers 18a and 18c (e.g., the inside shock absorbers). The left pointed slide 672 is described above.

Additionally, and/or alternatively, the suspension controller 86 may bias the front and/or rear adjustable shock absorbers 18 for the downhill orientation 674 similar to detecting a deceleration (e.g., braking) during a cornering event. For example, based on the downhill orientation of the vehicle 10, the suspension controller 86 may additionally increase (e.g., by a value or percentage) the compression damping and/or additionally decrease (e.g., by a value or a percentage) the rebound damping of front adjustable shock absorbers 18a and 18b (e.g., the downhill shock absorbers). Further, the suspension controller 86 may additionally decrease the compression damping and/or additionally increase the rebound damping of the rear adjustable shock absorbers 18c and 18d (e.g., the uphill shock absorbers).

After determining the slide and the orientation of the vehicle 10, the suspension controller 86 may provide information (e.g., one or more commands) to adjust the shock absorbers 18. For example, in a downhill orientation 674 and right pointed slide 676, the suspension controller 86 may provide information 302 to decrease or maintain the compression damping and/or increase or maintain the rebound damping for the adjustable shock absorber 18a. Further, the suspension controller 86 may provide information 304 to increase the compression damping and/or decrease the rebound damping for the adjustable shock absorber 18b. Also, the suspension controller 86 may provide information 306 to decrease the compression damping and/or to increase the rebound damping for the adjustable shock absorber 18c. Additionally, the suspension controller 86 may provide information 308 to maintain or increase the compression damping and/or decrease or maintain the rebound damping for the adjustable shock absorber 18d.

Realtime Correction of Inertial Measurement at a Center of Gravity of a Vehicle

Figure 24:
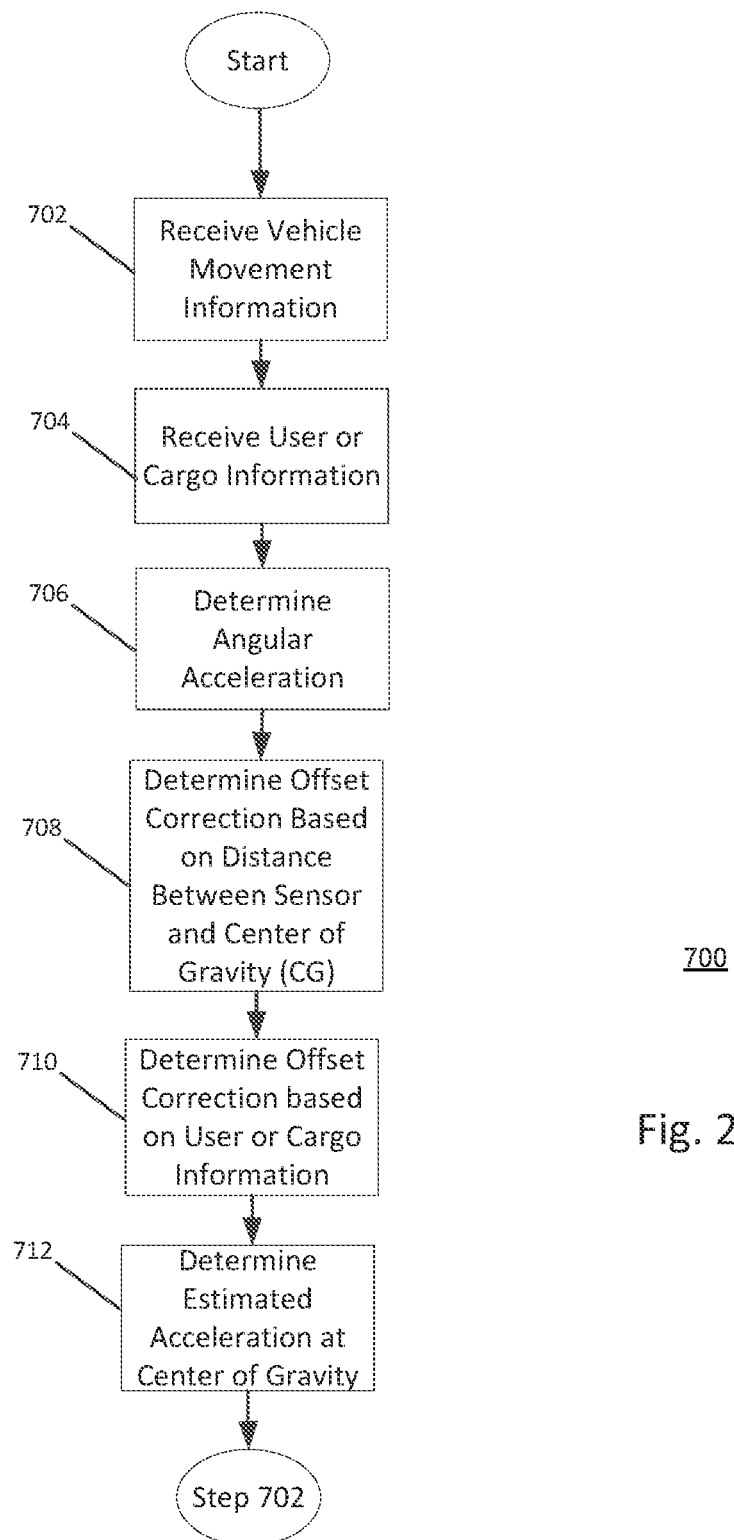
FIG. 24 shows an exemplary flowchart illustrating a method for performing real-time correction of the inertial measurement of a vehicle.

FIG. 24 shows an exemplary flowchart illustrating a method for performing real-time correction of the inertial measurement of a vehicle. For example, the IMU 37, the gyroscope 31, and/or the chassis accelerometer 30 may measure the inertial measurements of the vehicle 10 (e.g., the acceleration and/or angular velocity or rate of the vehicle 10). In some examples, these sensors might not be at the center of gravity (CG) of the vehicle 10, and a kinematic transformation may be used to account for the sensors not being at the CG. For example, a controller, such as the suspension controller 86, may use a distance between a sensor (e.g., the IMU 37, the gyroscope 31, and/or the chassis accelerometer 30) and the CG of the vehicle 10 to determine offset correction information. Using the offset correction information, the suspension controller 86 may transform (e.g., determine and/or calculate) the measured acceleration values to CG acceleration values (e.g., an estimated CG acceleration). Additionally, and/or alternatively, the CG of the vehicle 10 may also be affected by the number of users and/or the cargo. For example, a driver and a passenger may change the CG of the vehicle 10. As such, the suspension controller 86 may receive user and/or cargo information, and use the user and/or cargo information to determine second offset correction information. The suspension controller 86 may use the first and/or second offset corrections to determine the CG acceleration values.

By providing real-time correction of the inertial measurement of the vehicle 10, the suspension controller 86 may allow for the IMU 37 and/or other sensors to reside at a location other than the CG of the vehicle 10 while still providing an accurate vehicle inertial measurement estimation for controls. Additionally, and/or alternatively, the suspension controller 86 may allow for a more accurate estimation given the additional information regarding the weight (e.g., riders) and/or location of the weight (e.g., location of the riders) of the vehicle 10. FIG. 24 will be described below with reference to FIG. 25.

Figure 25:
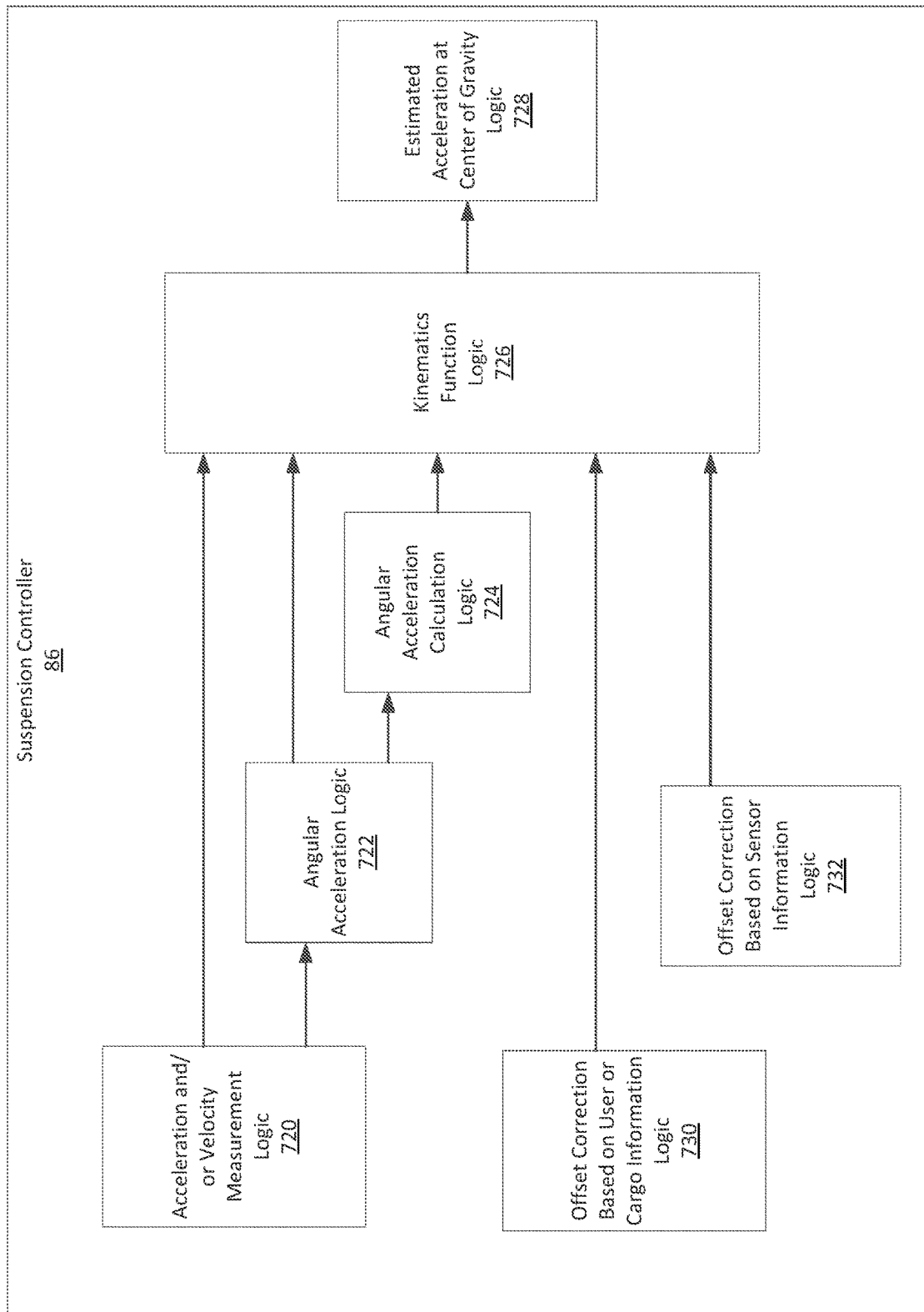
FIG. 25 shows an exemplary schematic block diagram illustrating an example of logic components in the suspension controller.

FIG. 25 shows a schematic block diagram illustrating an example of logic components in the suspension controller 86. For example, the suspension controller 86 includes one or more logic components, such as an acceleration and/or velocity measurement logic 720, angular acceleration logic 722, angular acceleration calculation logic 724, kinematics function logic 726, estimated acceleration at center of gravity (CG) logic 728, offset correction based on user or cargo information logic 730, and/or offset correction based on sensor information logic 732. The logic 720, 722, 724, 726, 728, 730, and/or 732 is any suitable logic configuration including, but not limited to, one or more state machines, processors that execute kernels, and/or other suitable structure as desired.

Further, in some examples, the suspension controller 86 and/or the controller 20 may include memory and one or more processors. The memory may store computer-executable instructions that when executed by the one or more processors cause the processors to implement the method and procedures discussed herein, including the method 700. Additionally, various components (e.g., logic) depicted in FIG. 25 are, in embodiments, integrated with various ones of the other components depicted therein (and/or components not illustrated), all of which are considered to be within the ambit of the present disclosure.

In operation, at step 702, the suspension controller 86 (e.g., logic 720) may receive vehicle movement information from one or more entities (e.g., sensors, devices, and/or subsystems) of vehicle 10. For example, the suspension controller 86 may receive vehicle movement information indicating the acceleration and/or velocity of the vehicle 10 from one or more sensors. For instance, the logic 720 may receive x, y, and/or z acceleration values (e.g., linear acceleration values) from a sensor, such as the IMU 37 and/or the chassis accelerometer 30. The logic 720 may also receive x, y, and/or z angular velocity values from a sensor, such as the IMU 37 and/or the gyroscope 31.

At step 704, the suspension controller 86 (e.g., logic 730) may receive user or cargo information from one or more entities (e.g., sensors, devices, and/or subsystems) of vehicle 10. In some instances, the suspension controller 86 may receive user or cargo information from the operator interface 22. For example, the operator interface 22 may provide, to the suspension controller 86, user information indicating a number of riders in the vehicle 10 and/or a weight or mass corresponding to the riders in the vehicle 10. Additionally, and/or alternatively, the operator interface 22 may provide, to the suspension controller 86, cargo information indicating a weight or mass of cargo that the vehicle 10 is carrying.

In some examples, the suspension controller 86 may receive the user or cargo information from one or more sensors. For example, one or more sensors, such as seat belt sensors, may provide, to the suspension controller 86, information indicating the number of riders in the vehicle 10 (e.g., when a user puts on their seat belt, the seat belt sensor may provide information indicating the seat belt is engaged to the suspension controller 86).

At step 706, the suspension controller 86 (e.g., the logic 722 and/or 724) may determine the angular acceleration for the vehicle 10. For example, the logic 722 may filter the angular velocity and/or rates received from a sensor, such as the IMU 37 and/or gyroscope 31. The logic 724 may differentiate the angular rates to determine the angular acceleration.

At step 708, the suspension controller 86 (e.g., the logic 732) may determine a first offset correction based on a distance between a sensor (e.g., the IMU 37, the chassis accelerometer 30, and/or the gyroscope 31) and the CG of the vehicle 10. The CG of the vehicle 10 may be pre-programmed and/or pre-defined. Additionally, and/or alternatively, the suspension controller 86 (e.g., the logic 732) may determine the first offset correction based on a distance between a sensor (e.g., the IMU 37, the chassis accelerometer 30, and/or the gyroscope 31) and the suspension controller 86.

At step 710, the suspension controller 86 (e.g., the logic 730) may determine a second offset correction based on the user and/or cargo information received at step 704. For example, based on the number of users, weight/mass of users, and/or weight/mass of the cargo, the logic 730 may determine a second offset correction.

At step 712, the suspension controller 86 (e.g., the logic 726 and/or 728) may determine an estimated acceleration at the CG of the vehicle 10. For example, the logic 726 may receive information from the logic 720 (e.g., the linear acceleration values), the logic 724 (e.g., the determined angular acceleration values), the logic 730 (e.g., the second offset based on the user or cargo information), and/or the logic 732 (e.g., the first offset based on the sensor information). The logic 726 may use a kinematics function to determine the 3-axis estimated acceleration at the CG of the vehicle 10. The logic 726 may provide the 3-axis estimated acceleration at the CG of the vehicle 10 to the logic 728. Then, the method 700 may return to step 702, and may repeat continuously.

In some examples, the logic 726 may receive and/or store the 3-axis (e.g., x, y, and/or z-axis) estimated acceleration values at the CG of the vehicle 10. Additionally, and/or alternatively, the methods 400, 500, and/or 700 may use the determined estimated acceleration values at the CG of the vehicle 10 to execute corner condition modifiers (e.g., step 418), brake condition modifiers (e.g., step 412), landing condition modifiers (e.g., step 415), and/or sand dune condition modifiers (e.g., step 608). For example, the suspension controller 86 may use the estimated acceleration values at the CG of the vehicle 10 to determine and/or detect events (e.g., cornering events, braking events, landing events, airborne events). Additionally, and/or alternatively, the suspension controller 86 may use the estimated acceleration values at the CG of the vehicle 10 to adjust the compression damping and/or rebound damping of the adjustable shock absorbers 18.

Figure 26:
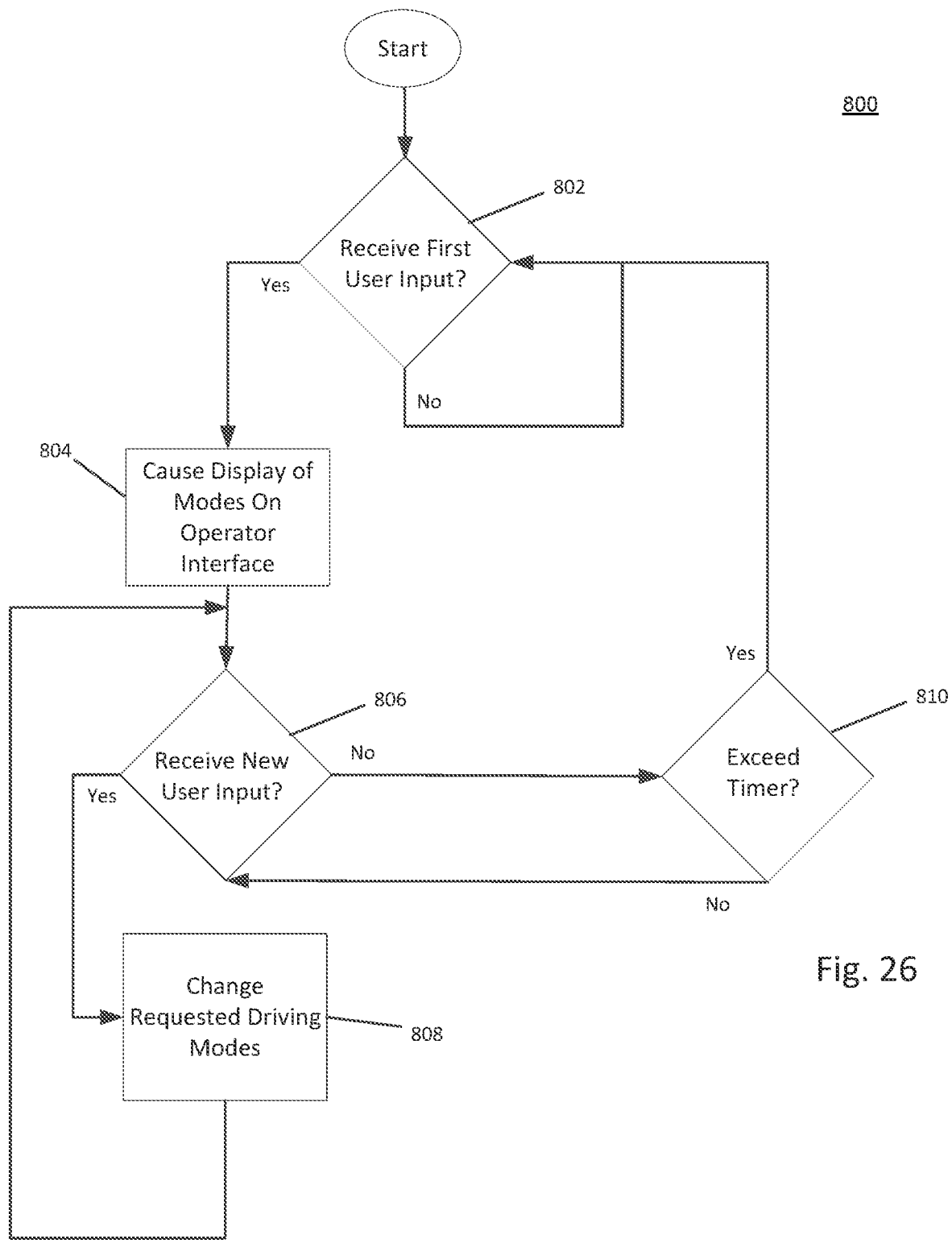
FIG. 26 shows an exemplary flowchart describing the operation of the suspension controller when switching between driver modes.

Changing Drive Modes, Active Vehicle Events, and Suspension Controller Architecture FIG. 26 shows an exemplary flowchart describing the operation of the suspension controller 86 when switching between driver modes. For example, an operator may use the operator interface 22 (e.g., a touch screen) and/or a physical switch to adjust the driving modes. For instance, each driving mode may indicate a different compression and/or rebound damping setting. As will be explained below, the suspension controller 86 may receive one or more user inputs, and based on the user inputs may change the driving modes. In response to changing the driving modes, the suspension controller 86 may provide one or more commands to adjust the compression and/or rebound damping for the adjustable shock absorbers 18. FIG. 26 will be described with reference to FIGS. 27 and 28 below.

Figure 27:
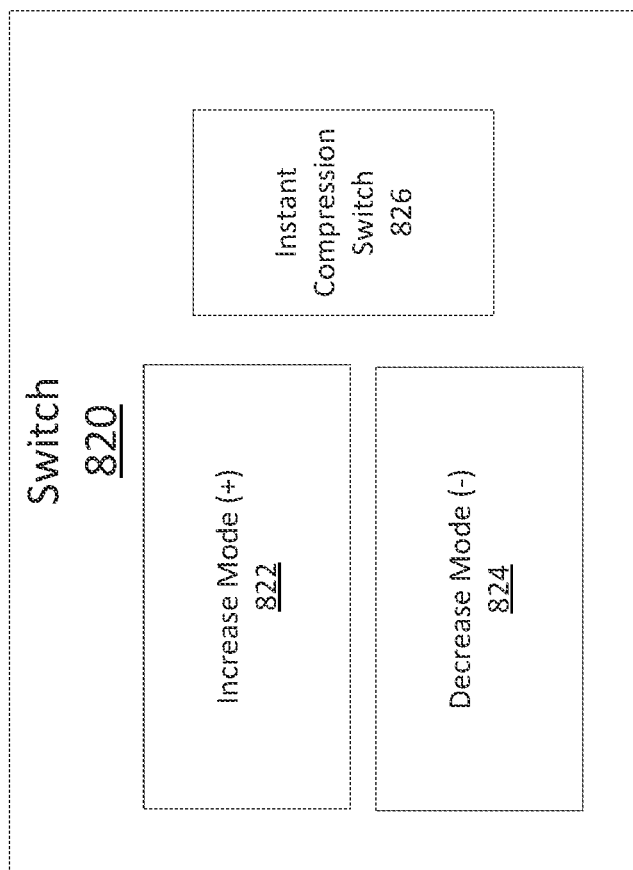
FIG. 27 shows an exemplary physical switch for adjusting driving modes.

FIG. 27 shows an exemplary physical switch 820 for adjusting driving modes. In some examples, the physical switch 820 may be located on a steering wheel, such as the steering wheel 226. The physical switch 820 may be operatively coupled to and/or communicate with the suspension controller 86. For example, the suspension controller 86 may receive user input from the physical switch 820. The switch 820 may include an increase mode (+) button 822 (e.g., a first mode changing input device), a decrease mode (−) button 824 (e.g., a second mode changing input device), and/or an instant compression switch 826. When actuated and/or pressed by a user, the instant compression switch 826 may provide information to the suspension controller 86. Based on the information from the instant compression switch 826, the suspension controller 86 may provide momentary stiffness to the adjustable shock absorbers 18. In other words, the suspension controller 86 may increase and/or significantly increase the compression damping of the adjustable shock absorbers 18 for a brief time duration.

FIG. 28 shows an exemplary graphical user interface 830. The graphical user interface 830 may be displayed on an interface, such as the operator interface 22. For example, the suspension controller 86 may cause display of the graphical user interface 830 on the operator interface 22. The graphical user interface 830 may include one or more modes, such as a first driver mode 832, a second driver mode 834, a third driver mode 836, and/or a fourth driver mode 838. The graphical user interface 830 is merely exemplary, and the suspension controller 86 may include multiple driver modes, including more or less than four driver modes. As will be explained below, the suspension controller 86 may receive multiple user inputs, and may adjust the compression and/or rebound damping characteristics based on the number of received user inputs. Exemplarily driving modes may include, but are not limited to, a comfort mode, a rough trial mode, a handling mode, and/or a rock crawl mode.

In operation, at step 802, the suspension controller 86 may determine whether it has received a first user input from the physical switch 820. For example, a user may press (e.g., actuate) the increase mode (+) button 822 and/or the decrease mode (−) button 824. The physical switch 820 may provide information indicating the actuation of the increase mode (+) button 822 and/or the decrease mode (−) button 824. If the suspension controller 86 has received a first user input, then the method 800 may move to step 804. If not, then the method 800 may remain at step 802.

At step 804, the suspension controller 86 may cause display of the driving modes on an operator interface, such as operator interface 22. For example, based on receiving the first user input from the physical switch 820, the suspension controller 86 may cause display of the graphical user interface 830 on the operator interface 22. Additionally, and/or alternatively, the graphical user interface 830 may indicate a current selected driver mode.

At step 806, the suspension controller 86 may determine whether it has received a new user input. For example, initially, when the suspension controller 86 receives the first user input, the suspension controller 86 might not change the current driving mode, such as the second driver mode 834. Instead, the suspension controller 86 may change the current driving mode if it receives two or more user inputs (e.g., the first user input and one or more new user inputs). For example, at step 802, the suspension controller 86 may receive a first user input indicating an actuation of the increase mode (+) button 822 and/or the decrease mode (−) button 824. At step 806, the suspension controller 86 may receive a new user input indicating a second actuation of the increase mode (+) button 822 and/or the decrease mode (−) button 824.

At step 808, based on the new user input, the suspension controller 86 may change the requested driving mode. For example, after receiving the new user input (e.g., a second actuation of button 822 and/or button 824), the suspension controller 86 may change the requested driving mode to a higher or lower driving mode. For instance, if the current driving mode is the second driver mode 834 and the suspension controller 86 receives an activation of button 822 at step 806, the suspension controller 86 may change the requested driving mode to the third driver mode 836. If the suspension controller 86 receives an activation of button 824, the suspension controller 86 may change the requested driving mode to the first driver mode 832. The method 800 may move back to step 806, and repeat. In the next iteration, the suspension controller 86 may receive another new user input (e.g., a third actuation of the button 822 and/or button 824). At step 808, the suspension controller 86 may change the requested driving mode again based on whether button 822 or button 824 was actuated.

In some instances, prior to changing the driving modes and/or adjusting the adjustable shock absorbers 18, the suspension controller 86 may determine whether an event described above, such as a cornering event, a braking event, an airborne event, and/or a landing event, is occurring. If the suspension controller 86 determines an event is occurring, the suspension controller 86 may delay and/or not change the active driving mode until the event has ended. For example, if the requested driving mode is the second driver mode 834 and an event occurs, the suspension controller 86 may delay and/or not change to the active driver mode (e.g., the second driver mode 834) until the event ends.

Referring back to step 806, if the suspension controller 86 does not receive a new input, the method 800 may move to step 810. At step 810, the suspension controller 86 may determine whether the amount of time that it has not received a new user input exceeds a timer, such as three seconds. If it has not exceeded the timer, then the method 800 may move back to 806. If it has exceeded the timer, then the method may move to step 802, and repeat. In other words, after a period of time (e.g., 3 seconds), the change driving mode feature may time out, and the user may need to provide another first input to begin the process again of switching driver modes.

In some examples, the suspension controller 86 may include a wall for the highest and lowest driving modes (e.g., the first driver mode 832 and fourth driver mode 838). For example, if the current driving mode is the second driver mode 834 and the suspension controller 86 receives more than two user inputs, the suspension controller 86 may change the requested driving mode to the highest driving mode, such as the fourth driver mode 838, and remain at the highest driving mode regardless of additional user inputs. In other words, even if a user actuates the increase mode (+) button 822 ten times, the suspension controller 86 may continue to select the highest driving mode (e.g., the further driver mode 838).

In some examples, the controller 20 may include a steering controller 102 (e.g., a power steering controller). The steering controller 102 may include a plurality of power steering modes for the vehicle 10. Based on the method 800, the suspension controller 86 may determine a driving mode (e.g., a suspension mode and/or a power steering mode) as described above. The suspension controller 86 may adjust the adjustable shock absorbers 18 based on the driving mode. Additionally, and/or alternatively, the suspension controller 86 may provide the driving mode (e.g., the power steering mode) to the steering controller 102. The steering controller 102 may change the power steering characteristics based on the received driving mode from the suspension controller 86. In some instances, each suspension mode corresponds to one or more power steering modes. As such, by the operator selecting a suspension mode (e.g., using method 800), the operator may also select a corresponding power steering mode. Thus, the suspension controller 86 may provide the selected driving mode to the steering controller 102, and the steering controller 102 may implement the power steering mode characteristics.

Push and Pull Instant Compression Button Activation

The vehicle 10 may include a sensor on the steering shaft (e.g., a shaft connecting the steering wheel, such as steering wheel 226, to the vehicle frame). The sensor, such as a strain gauge or a spring-loaded contact sensor, may detect a force (e.g., a push or pull) on the steering wheel 226. The sensor may be operatively coupled to and/or communicate with the suspension controller 86, and may provide information indicating the push or pull on the steering wheel 226 to the suspension controller 86.

The suspension controller 86 may receive the information indicating the push or pull (e.g., the force exerted on the steering wheel 226), and compare the force exerted on the steering with a threshold. Based on the comparison, the suspension controller 86 may provide one or more commands to momentarily increase the compression damping (e.g., set the compression damping to a stiff damping level) for the adjustable shock absorbers 18. In other words, instead of using a button, such as the instant compression switch 826 shown on FIG. 27, an operator may push or pull the steering wheel 226 to cause a momentary stiff compression damping for the adjustable shock absorbers 18.

Egress Aid

Figure 29:
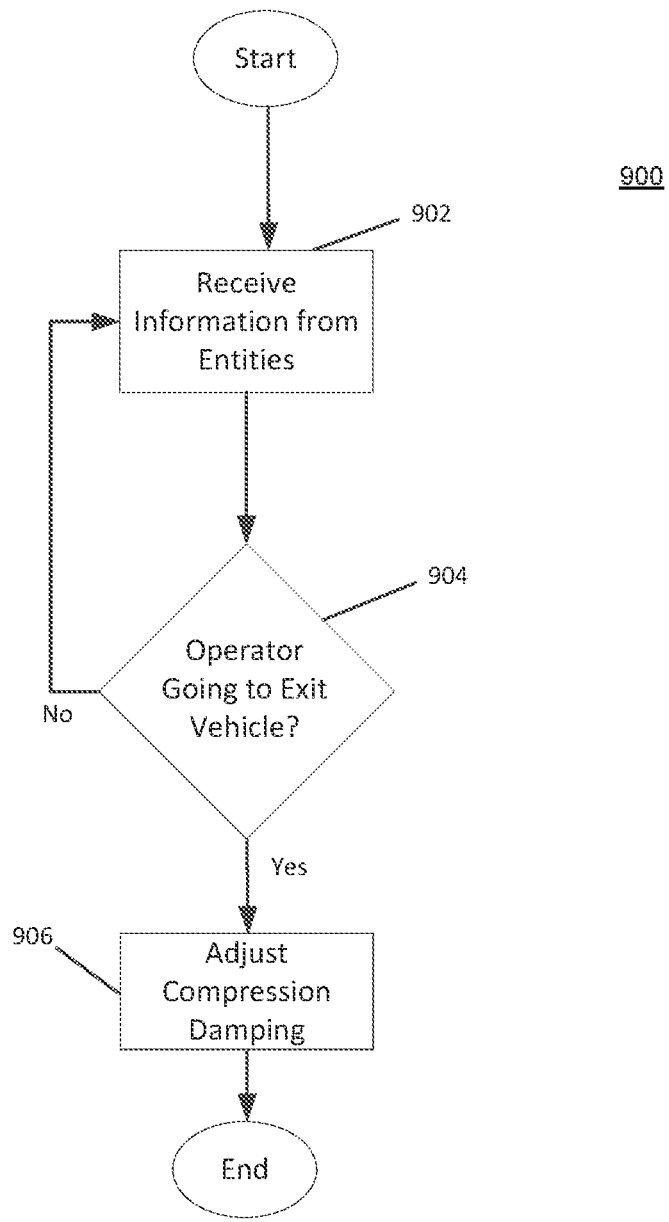
FIG. 29 shows an exemplary flowchart describing a method for implementing egress aid for a vehicle.

FIG. 29 shows an exemplary flowchart describing a method for implementing egress aid for a vehicle. For example, an operator may seek to exit the vehicle, such as vehicle 10. In such examples, the suspension controller 86 may reduce the damping (e.g., the compression damping) for the adjustable shock absorbers 18, causing the vehicle 10 to lower in height. By lowering the vehicle height, the operator may more easily exit the vehicle 10.

In operation, at step 902, the suspension controller 86 may receive information (e.g., inputs) from one or more entities (e.g., sensors, devices, and/or subsystems) of vehicle 10. For example, the suspension controller 86 may receive (e.g., retrieve and/or obtain) information (e.g., data packets and/or signals indicating sensor readings) from the one or more sensors, devices, and/or subsystems.

At step 904, the suspension controller 86 may determine whether the operator is going to (e.g., intending to) exit the vehicle 10. For example, the suspension controller 86 may receive, from the gear selection sensor 38, information indicating the vehicle has shifted to park. Based on the information, the suspension controller 86 may determine the operator is intending to exit the vehicle 10 and the method 900 may move to step 906. If not, the method 900 may move to step 902.

In some instances, the suspension controller 86 may determine the operator is intending to exit the vehicle based on the engine speed. For example, the suspension controller 86 may receive information indicating the engine speed is zero or substantially zero. As such, the suspension controller 86 may determine the operator is intending to exit the vehicle. In some examples, the suspension controller 86 may determine the operator is intending to exit the vehicle based on information indicating a vehicle key in the off position and/or a vehicle speed (e.g., from the vehicle speed sensor 26).

In some variations, the suspension controller 86 may receive information indicating the vehicle 10 is operating in the rock crawling mode described above. In the rock crawling mode, the vehicle speed may be low and/or substantially zero and/or may be over a rock. As such, based on the vehicle 10 operating in the rock crawling mode, the suspension controller 86 may determine to deactivate the egress aid (e.g., to not cause the vehicle 10 to become stuck), and the method 900 may move back to step 902.

At step 906, the suspension controller 86 may adjust the compression damping of the adjustable shock absorbers 18. For example, the suspension controller 86 may reduce the compression damping of the adjustable shock absorbers 18. By reducing the compression damping, the vehicle 10 may provide egress aid to the operator (e.g., based on lowering the height of the vehicle 10).

Sway Bar

Figure 30:
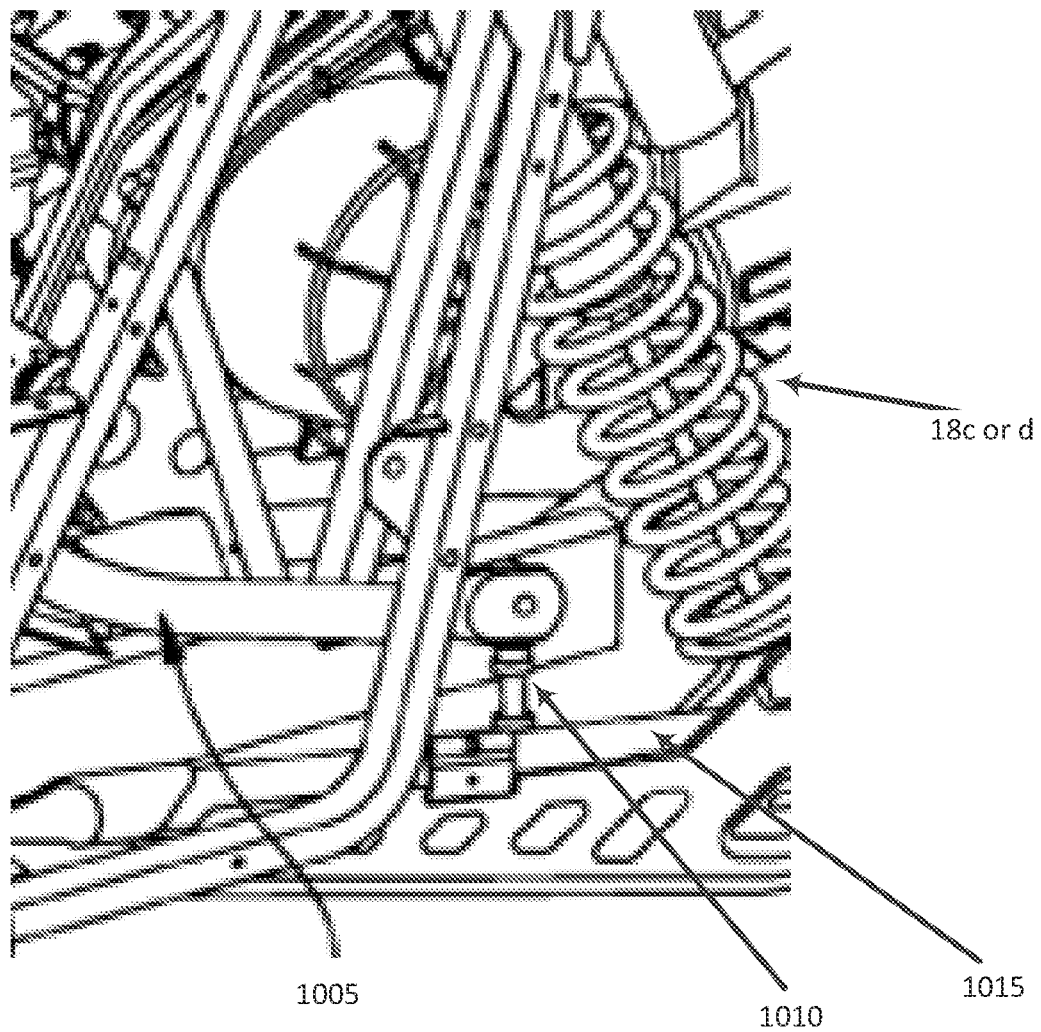
FIG. 30 illustrates a representative view of a sway bar of the vehicle of FIG. 1.

FIG. 30 illustrates a representative view of a sway bar of a vehicle, such as vehicle 10. For example, the vehicle 10 may include a sway bar 1005. Further, the sway bar 1005 may include one or more sway bar adjustable shock absorbers 1010. The sway bar adjustable shock absorber 1010 may be coupled to the sway bar 1005 and a steering bar 1015. The sway bar 1005 may be in the rear of the vehicle, and located close to a rear adjustable shock absorber, such as shock absorber 18c. Further, the vehicle 10 may include more than one sway bar 1005 and/or sway bar adjustable shock absorber 1010. For example, on the other side of the vehicle 10 (e.g., the side with the adjustable shock absorber 18d), the vehicle 10 may include a second sway bar 1005 and/or a second sway bar adjustable shock absorber 1010.

Also, similar to the adjustable shock absorbers 18, the suspension controller 86 may provide one or more commands to adjust the damping characteristics of the sway bar adjustable shock absorbers 1010. For example, referring to FIG. 11, in response to detecting a cornering event, the suspension controller 86 may provide one or more commands to increase and/or engage the compression damping for the sway bar adjustable shock absorbers 1010. Additionally, and/or alternatively, the suspension controller 86 may provide different damping characteristics based on the driving modes. For instance, in some driving modes, the suspension controller 86 may increase and/or engage the compression damping for the sway bar adjustable shock absorbers 1010 in response to detecting events. In other driving modes, the suspension controller 86 might not increase nor engage the compression damping for the sway bar adjustable shock absorbers 1010 in response to detecting events. For example, referring to FIG. 26, based on changing the driving modes, the suspension controller 86 may provide one or more commands to adjust the compression and/or rebound damping for the sway bar adjustable shock absorbers 1010.

Exemplary sway bars are described in U.S. Pat. No. 9,365,251 (filed Jun. 14, 2016, titled Side-by-side vehicle), which is assigned to the present assignee and the entire disclosure is expressly incorporated by reference herein.

FIG. 31 illustrates a view of an exemplary vehicle 1100, such as a snowmobile. Vehicle 1100, as illustrated, includes a plurality of ground engaging members 12. Illustratively, the ground engaging members 12 are the endless track assembly 1108 and a pair of front skis 1112a and 1112b. The endless track assembly 1108 is operatively coupled to power system 60 (see FIG. 4) to power the movement of vehicle 1100. The vehicle may also include a seat 1102 and a seat surface 1104. Also, the vehicle may include handlebars 1106.

Further, the suspensions 1114 and 1116 are coupled to the frame of the vehicle 1100 and the pair of front skis 1112a and 1112b. The suspensions 1114 and 1116 may include adjustable shock absorbers, such as the adjustable shock absorber 1110. Also, the endless track assembly 1108 may also be coupled to one or more suspensions and/or adjustable shock absorbers.

The vehicle 1100 may be the same and/or include components of vehicle 10. For example, the vehicle 1100 may include the plurality of vehicle condition sensors 40 described above, and may also include one or more controllers, such as the suspension controller 86. The suspension controller 86 may receive information from the plurality of vehicle condition sensors 40. Using the received information, the suspension controller 86 may adjust the compression and/or rebound damping of the adjustable shock absorbers, such as adjustable shock absorber 1110 as described above. Additional details regarding vehicle 1100 are provided in U.S. Pat. Nos. 9,809,195 and 8,994,494, assigned to the present assignee, the entire disclosures of which are expressly incorporated by reference herein.

In embodiments, substantially zero is any value which is effectively zero. For example, a substantially zero value does not provide an appreciable difference in the operation compared to when the value is zero.

The above detailed description of the present disclosure and the examples described therein have been presented for the purposes of illustration and description only and not by limitation. It is therefore contemplated that the present disclosure covers any and all modifications, variations or equivalents that fall within the scope of the basic underlying principles disclosed above and claimed herein.

What is claimed is:

1. A vehicle comprising:
a plurality of ground engaging members including a first portion on a left side of a vertical longitudinal centerline plane of the vehicle and a second portion on a right side of the vertical longitudinal centerline plane of the vehicle;
a frame supported by the plurality of ground engaging members;
an operator area including an operator seat supported by the frame;
a left side suspension comprising a first arm moveably coupling a first ground engaging member of the first portion of the plurality of ground engaging members to the frame;
a first electronically controlled shock absorber having a first end moveably coupled to the left side suspension and a second end moveably coupled to the frame;
a right side suspension comprising a second arm moveably coupling a first ground engaging member of the second portion of the plurality of ground engaging members to the frame;
a second electronically controlled shock absorber having a first end moveably coupled to the right side suspension and a second end moveably coupled to the frame;
a sway bar moveably coupled to the frame, the sway bar having a first end moveably coupled to the left side suspension and a second end moveably coupled to the right side suspension;
a third electronically controlled shock absorber positioned to operatively couple to the sway bar on a first end and to one of the first arm of the left side suspension and the second arm of the right side suspension on a second end independent of the respective first electronically controlled shock absorber and the second electronically controlled shock absorber; and
an electronic controller operatively coupled to the first electronically controlled shock absorber, the second electronically controlled shock absorber, and the third electronically controlled shock absorber, the electronic controller setting a first characteristic of the first electronically controlled shock absorber, a second characteristic of the second electronically controlled shock absorber, and a third characteristic of the third electronically controlled shock absorber.

2. The vehicle of claim 1, further comprising at least one sensor supported by the plurality of ground engaging members, wherein the electronic controller based on the at least one sensor adjusts the third characteristic of the third electronically controlled shock absorber to a first setting and adjusts the one of the first characteristic of the first electronically controlled shock absorber and the second characteristic of the second electronically controlled shock absorber that is coupled to the same one of the left side suspension and the right side suspension that the second end of the third adjustable shock absorber is coupled to a first setting.

3. The vehicle of claim 2, wherein the electronic controller further adjusts the other one of the first characteristic of the first electronically controlled shock absorber and the second characteristic of the second electronically controlled shock absorber to a first setting.

4. The vehicle of claim 2, wherein when the electronic controller determines the vehicle is not in the first condition, the electronic controller adjusts the third characteristic of the third electronically controlled shock absorber to a second setting and adjusts the one of the first characteristic of the first electronically controlled shock absorber and the second characteristic of the second electronically controlled shock absorber that is coupled to the same one of the left side suspension and the right side suspension that the second end of the third adjustable shock absorber is coupled to a second setting.

5. The vehicle of claim 2, wherein the first setting of the third electronically controlled shock absorber restricts a compression of the third electronically controlled shock absorber.

6. The vehicle of claim 1, wherein the third electronically controlled shock absorber is positioned rearward of the operator seat.

7. The vehicle of claim 1, wherein the electronic controller controls only a compression damping characteristic of the third electronically controlled shock absorber.

8. The vehicle of claim 1, wherein the electronic controller further monitors a brake pressure sensor to control at least one of the first electronically controlled shock absorber, the second electronically controlled shock absorber, and the third electronically controlled shock absorber.

9. The vehicle of claim 1, wherein the first ground engaging member rotates about a rotational axis and the third electronically controlled shock absorber is positioned forwardly of the rotational axis.

10. A vehicle comprising:
a plurality of ground engaging members including a first portion on a left side of a vertical longitudinal centerline plane of the vehicle and a second portion on a right side of the vertical longitudinal centerline plane of the vehicle;
a frame supported by the plurality of ground engaging members;
an operator area including an operator seat supported by the frame;
at least one sensor supported by the plurality of ground engaging members;
a left side suspension moveably coupling a first ground engaging member of the first portion of the plurality of ground engaging members to the frame;
a first electronically controlled shock absorber having a first end moveably coupled to the left side suspension and a second end moveably coupled to the frame;
a right side suspension moveably coupling a first ground engaging member of the second portion of the plurality of ground engaging members to the frame;
a second electronically controlled shock absorber having a first end moveably coupled to the right side suspension and a second end moveably coupled to the frame;
a sway bar moveably coupled to the frame, the sway bar having a first end moveably coupled to the left side suspension and a second end moveably coupled to the right side suspension;
a third electronically controlled shock absorber positioned to operatively couple the sway bar to one of the left side suspension and the right side suspension; and
an electronic controller operatively coupled to the first electronically controlled shock absorber, the second electronically controlled shock absorber, and the third electronically controlled shock absorber, the electronic controller setting a first characteristic of the first electronically controlled shock absorber, a second characteristic of the second electronically controlled shock absorber, and a third characteristic of the third electronically controlled shock absorber, and the electronic controller based on the at least one sensor adjusts the third characteristic of the third electronically controlled shock absorber and the second characteristic of the second electronically controlled shock absorber that is coupled to the same one of the left side suspension and the right side suspension that the second end of the third adjustable shock absorber is coupled to a first setting.

11. The vehicle of claim 10, wherein the electronic controller further monitors a brake pressure sensor to control at least one of the first electronically controlled shock absorber, the second electronically controlled shock absorber, and the third electronically controlled shock absorber.

12. The vehicle of claim 10, wherein the electronic controller controls only a compression damping characteristic of the third electronically controlled shock absorber.

13. A vehicle comprising:
a plurality of ground engaging members including a first portion on a left side of a vertical longitudinal centerline plane of the vehicle and a second portion on a right side of the vertical longitudinal centerline plane of the vehicle;
a frame supported by the plurality of ground engaging members;
an operator area including an operator seat supported by the frame;
a left side suspension moveably coupling a first ground engaging member of the first portion of the plurality of ground engaging members to the frame;
a first electronically controlled shock absorber having a first end moveably coupled to the left side suspension and a second end moveably coupled to the frame;
a right side suspension moveably coupling a first ground engaging member of the second portion of the plurality of ground engaging members to the frame;
a second electronically controlled shock absorber having a first end moveably coupled to the right side suspension and a second end moveably coupled to the frame;
a sway bar moveably coupled to the frame, the sway bar having a first end moveably coupled to the left side suspension and a second end moveably coupled to the right side suspension;
a third electronically controlled shock absorber positioned to operatively couple the sway bar to one of the left side suspension and the right side suspension; and
an electronic controller operatively coupled to the first electronically controlled shock absorber, the second electronically controlled shock absorber, and the third electronically controlled shock absorber, the electronic controller setting a first characteristic of the first electronically controlled shock absorber, a second characteristic of the second electronically controlled shock absorber, and a third characteristic of the third electronically controlled shock absorber, and the electronic controller controls only a compression damping characteristic of the third electronically controlled shock absorber.

14. The vehicle of claim 13, wherein the electronic controller further monitors a brake pressure sensor to control at least one of the first electronically controlled shock absorber, the second electronically controlled shock absorber, and the third electronically controlled shock absorber.

15. The vehicle of claim 13, wherein the electronic controller controls only a compression damping characteristic of the third electronically controlled shock absorber.

16. The vehicle of claim 13, wherein the third electronically controlled shock absorber is positioned rearward of the operator seat.

17. The vehicle of claim 13, further comprising at least one sensor supported by the plurality of ground engaging members, wherein the electronic controller based on the at least one sensor adjusts the third characteristic of the third electronically controlled shock absorber to a first setting and adjusts the one of the first characteristic of the first electronically controlled shock absorber and the second characteristic of the second electronically controlled shock absorber that is coupled to the same one of the left side suspension and the right side suspension that the second end of the third adjustable shock absorber is coupled to a first setting.

18. The vehicle of claim 17, wherein the electronic controller further adjusts the other one of the first characteristic of the first electronically controlled shock absorber and the second characteristic of the second electronically controlled shock absorber to a first setting.

19. The vehicle of claim 17, wherein when the electronic controller determines the vehicle is not in the first condition, the electronic controller adjusts the third characteristic of the third electronically controlled shock absorber to a second setting and adjusts the one of the first characteristic of the first electronically controlled shock absorber and the second characteristic of the second electronically controlled shock absorber that is coupled to the same one of the left side suspension and the right side suspension that the second end of the third adjustable shock absorber is coupled to a second setting.

20. The vehicle of claim 13, wherein the first ground engaging member rotates about a rotational axis and the third electronically controlled shock absorber is positioned forwardly of the rotational axis.

* * * * *